(12) United States Patent
Murakami et al.

(10) Patent No.: US 7,280,840 B2
(45) Date of Patent: Oct. 9, 2007

(54) RECEIVING APPARATUS, TRANSMITTING APPARATUS, AND RECEPTION METHOD

(75) Inventors: Yutaka Murakami, Yokohama (JP); Katsuaki Abe, Yokohama (JP); Kiyotaka Kobayashi, Tokyo (JP); Masayuki Orihashi, Funabashi (JP); Akihiko Matsuoka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 351 days.

(21) Appl. No.: 10/704,653

(22) Filed: Nov. 12, 2003

(65) Prior Publication Data

US 2004/0121827 A1    Jun. 24, 2004

(30) Foreign Application Priority Data

| Nov. 13, 2002 | (JP) | 2002-329453 |
| Dec. 25, 2002 | (JP) | 2002-374393 |
| Jan. 28, 2003 | (JP) | 2003-018761 |
| Oct. 27, 2003 | (JP) | 2003-366249 |

(51) Int. Cl.
   *H04B 7/005* (2006.01)

(52) U.S. Cl. ............... 455/522; 455/127.2; 455/245.1; 375/296; 375/345

(58) Field of Classification Search ............... 455/504, 455/303, 272, 278.1, 226.3, 226.1, 296, 522, 455/67.11, 65, 116, 127.1, 230, 232.1, 234.1, 455/245.1, 273; 375/267, 144, 260, 299, 375/346, 347, 296, 345

See application file for complete search history.

(56) References Cited

U.S. PATENT DOCUMENTS 6,144,711 A * 11/2000 Raleigh et al. ............. 375/347

| 6,175,558 | B1 | 1/2001 | Miya |
| 6,252,864 | B1 | 6/2001 | Hayashi |
| 6,473,467 | B1 * | 10/2002 | Wallace et al. ............. 375/267 |
| 6,771,706 | B2 * | 8/2004 | Ling et al. .................. 375/267 |
| 2002/0154705 | A1 * | 10/2002 | Walton et al. .............. 375/267 |
| 2003/0003863 | A1 * | 1/2003 | Thielecke et al. ............ 455/39 |
| 2003/0003880 | A1 * | 1/2003 | Ling et al. .................... 455/92 |
| 2003/0104831 | A1 * | 6/2003 | Razavilar et al. ........... 455/522 |

(Continued)

OTHER PUBLICATIONS

Alamouti, "A Simple Transmit Diversity Technique for Wireless Communications," *IEEE Journal on Select Areas in Communications*, vol. 16, No. 8, p. 1451-1458, Oct. 1998.

(Continued)

*Primary Examiner*—Edward F. Urban
*Assistant Examiner*—Blane J. Jackson
(74) *Attorney, Agent, or Firm*—Greenblum & Bernstein, P.L.C.

(57) ABSTRACT

Channel fluctuation values on propagation paths of modulated signals transmitted from a plurality of antennas are estimated, an eigenvalue of a channel fluctuation matrix created with the above-mentioned channel fluctuation values as elements is found in order to relate antenna received signals to modulated signals, and using that eigenvalue, receiving antenna selection, combining of modulated signals, and weighting processing on soft decision decoded values, are performed, and modulated signals are demodulated. By this means, it is possible to perform demodulation processing based on the effective reception power of a modulated signal (that is to say, the essential reception power, of the reception power obtained by a receiving apparatus, that can be effectively used when demodulating a modulated signal), enabling the precision of demodulation of modulated signals to be improved.

15 Claims, 48 Drawing Sheets

U.S. PATENT DOCUMENTS

| | | | |
|---|---|---|---|
| 2004/0023621 A1* | 2/2004 | Sugar et al. | 455/103 |
| 2004/0038650 A1* | 2/2004 | Yang | 455/130 |
| 2004/0082356 A1* | 4/2004 | Walton et al. | 455/522 |
| 2004/0171387 A1* | 9/2004 | Miyoshi et al. | 455/452.2 |
| 2005/0170783 A1* | 8/2005 | Krishnan et al. | 455/67.11 |
| 2006/0023666 A1* | 2/2006 | Jalali et al. | 370/334 |

OTHER PUBLICATIONS

Tarokh et al., "Space-Time Block Codes from Orthogonal Designs," *IEEE Transactions on Information Theory*, vol. 45, No. 5, p. 1456-1467, Jul. 1999.

* cited by examiner

RECEIVING APPARATUS, TRANSMITTING APPARATUS, AND RECEPTION METHOD

BACKGROUND OF THE INVENTION

1. Field of the Invention

The present invention relates to a receiving apparatus, transmitting apparatus, and reception method, and more particularly to a receiving apparatus, transmitting apparatus, and reception method applied to a radio communication system that uses multiple antennas.

2. Description of the Related Art

To date, intense research and development has been carried out on radio communication systems that use multiple antennas to allow transmission and reception of a greater amount of data in a limited frequency band. Examples of radio communication systems that use multiple antennas are a MIMO (Multiple-Input Multiple-Output) system in which both the transmitting apparatus and receiving apparatus are equipped with a plurality of antennas, and a MISO (Multiple-Input Single-Output) system in which the transmitting apparatus is equipped with a plurality of antennas and the receiving apparatus is equipped with a single antenna.

In a radio communication system that uses this kind of multi-antenna technology, since modulated signals transmitted from a plurality of antennas are multiplexed on a propagation path and received by an antenna at the receiving end, if demodulation processing including signal separation processing cannot be carried out with high precision the receive data error rate characteristics degrade, and as a result, it is not possible to achieve the original aim of increasing the data transmission speed.

Possible ways of improving the precision of separation and demodulation of each modulated signal include increasing the pilot symbols inserted in each modulated signal, but when pilot symbols are increased, propagation efficiency degrades proportionally, with the result that it is not in fact possible to achieve the original aim of increasing the data transmission speed.

SUMMARY OF THE INVENTION

It is an object of the present invention to provide a receiving apparatus, transmitting apparatus, and reception method that make it possible to improve the precision of demodulation including separation processing of each modulated signal and improve receive data error rate characteristics in a radio communication system that uses multiple antennas.

The present invention estimates a channel fluctuation value on a propagation path of each modulated signal transmitted from a plurality of antennas, finds an eigenvalue of a channel fluctuation matrix formed as an above channel fluctuation value element for relating each antenna received signal to each modulated signal, and using that eigenvalue, performs receiving antenna selection, combining of modulated signals, and weighting processing on a soft decision decoded value, and demodulates each modulated signal. By this means, it is possible to perform demodulation processing based on the effective reception power of a modulated signal (that is, the essential reception power, of the reception power obtained by the receiving apparatus, that can be effectively used when demodulating each modulated signal), thereby enabling the precision of demodulation of each modulated signal to be improved.

Also, in a receiving apparatus of the present invention, a further technique is provided whereby an eigenvalue is found by equalizing the power of each element (channel fluctuation value) of the above-mentioned channel fluctuation matrix. This means make it possible to suppress disruption of the relationship between an eigenvalue and effective reception power occurring due to signal amplification processing or analog-digital conversion processing in the radio section, and to find an eigenvalue that reflects effective reception power far more accurately. The processing that equalizes the power of each element of this channel fluctuation matrix also corresponds to finding eigenvalue approximation using only phase of the channel fluctuation matrix, so that an eigenvalue can be found that accurately reflects effective power with a small amount of computation.

Furthermore, a transmitting apparatus of the present invention provides independent control for each antenna of the transmission power of the modulated signal transmitted from each antenna based on information such as a channel fluctuation value and received field strength of each modulated signal fed back from the receiving apparatus. By this means, the effective reception power of each modulated signal can be changed more accurately, enabling the precision of demodulation of each modulated signal in the receiving apparatus to be greatly improved.

BRIEF DESCRIPTION OF THE DRAWINGS

The above and other objects and features of the present invention will appear more fully hereinafter from a consideration of the following description taken in connection with the accompanying drawings wherein one example is illustrated by way of example, in which.

DETAILED DESCRIPTION OF THE PREFERRED EMBODIMENTS

Figure 1:
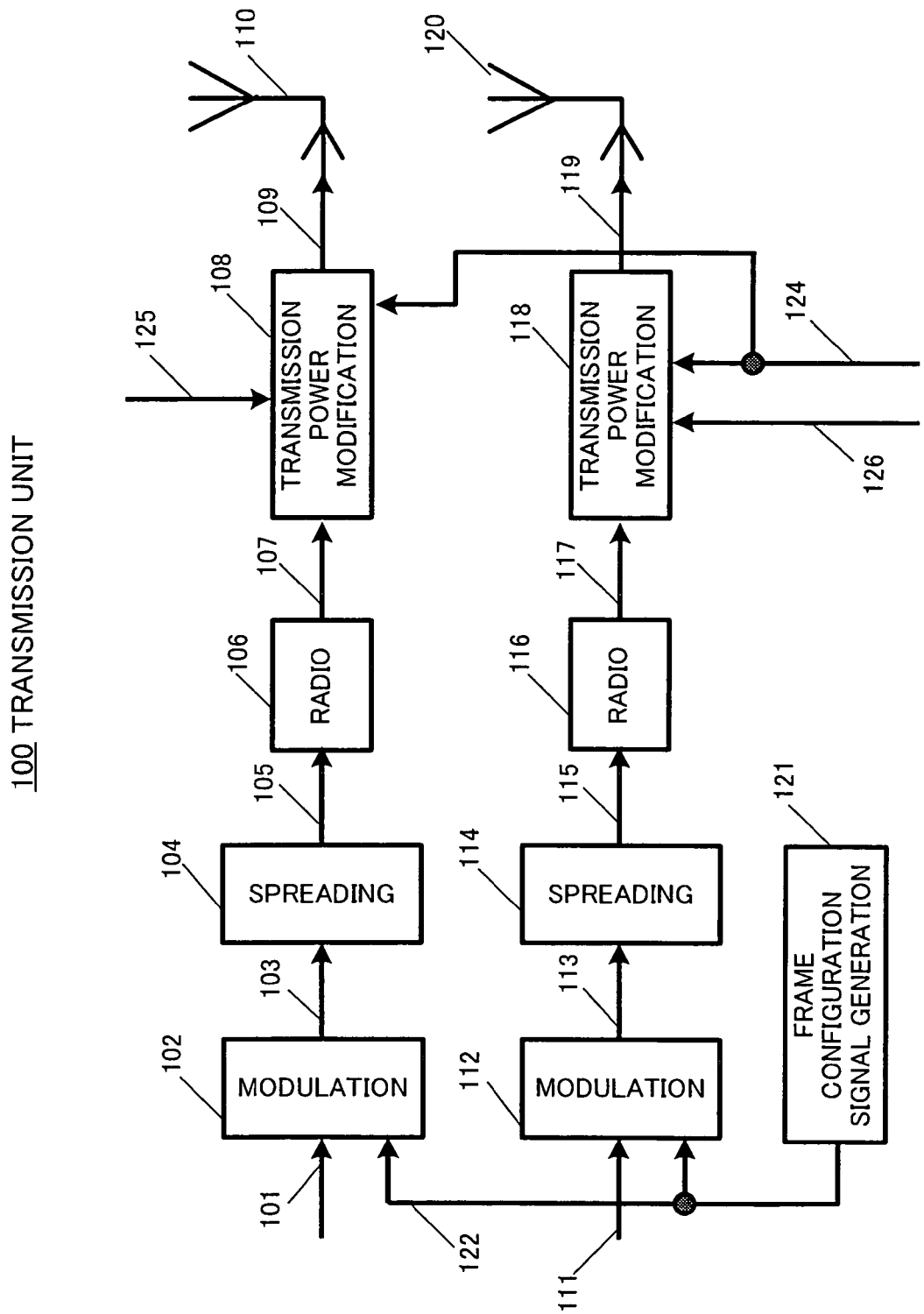
FIG. 1 is a block diagram showing a configuration of a transmission unit of a transmitting apparatus of Embodiment 1 of the present invention.

The inventors of the present invention arrived at the present invention by considering that, in a radio communication system that uses multiple antennas, the demodulation precision of each modulated signal can be improved by not simply performing separation and demodulation of each modulated signal, but performing demodulation processing and transmission processing that takes account of the effective reception power of a received modulated signal (that is, the essential reception power, of the reception power obtained by the receiving apparatus, that can be effectively used when demodulating each modulated signal).

In the present invention, an eigenvalue of a channel fluctuation matrix is used as an effective reception power index. A channel fluctuation matrix relates each antenna received signal to each modulated signal, with channel fluctuation values as elements. Generally, a receiving apparatus used in multi-antenna communications finds the inverse matrix of the channel fluctuation matrix and separates each modulated signal from the received signal.

In the present invention, an eigenvalue is found from a generally used channel fluctuation matrix in this way, and this is used as an effective reception power index, so that it is possible to find the effective reception power with comparatively little computation and comparatively few configuration additions.

In the following embodiments, the following kinds of modes of the present invention are chiefly described.

In one mode of the present invention, a transmitting apparatus that transmits a plurality of modulated signals from a plurality of antennas performs modification of the transmission power of the transmitted plurality of modulated signals independently for each antenna. Also, transmission power control is performed using received field strength and channel fluctuation estimated by the communicating party. By this means, data transmission quality can be improved. Specifically, it is possible to perform modulated signal transmission power control so that effective reception power is optimized, thereby enabling the demodulation precision of each modulated signal on the receiving side to be improved.

In another mode of the present invention, a receiving apparatus that receives a modulated signal transmitted by an above-described transmitting apparatus is equipped with a received field strength estimation section that estimates the received field strength from the received signal, and feeds back estimated received field strength information to the transmitting apparatus. The receiving apparatus is also equipped with a channel fluctuation estimation section that estimates channel fluctuation of each modulated signal from a received signal, and feeds back estimated channel fluctuation information to the transmitting apparatus. By this means, a transmitting apparatus can perform modulated signal transmission power control based on received field strength information and channel fluctuation information so that effective reception power actually becomes optimal on the receiving side.

In yet another mode of the present invention, a transmitting apparatus that transmits modulated signals from a plurality of antennas using a multi-antenna system performs modification of the transmission power of the transmitted plurality of modulated signals independently for each antenna and independently for each carrier. Also, the transmitting apparatus performs this transmission power control using per-carrier received field strength and per-carrier channel fluctuation estimated by the communicating party. By this means, it is possible to perform modulated signal transmission power control so that effective reception power becomes optimal independently for each antenna and independently for each carrier.

In yet another mode of the present invention, a receiving apparatus that receives a modulated signal transmitted by an above-described multicarrier transmitting apparatus is equipped with a received field strength estimation section that estimates per-carrier received field strength from the received signal, and feeds back estimated per-carrier received field strength information to the multicarrier transmitting apparatus. The receiving apparatus is also equipped with a channel fluctuation estimation section that estimates channel fluctuation for each carrier from a received signal, and feeds back estimated per-carrier channel fluctuation information to the multicarrier transmitting apparatus. By this means, a multicarrier transmitting apparatus can perform modulated signal transmission power control for each carrier based on per-carrier received field strength information and channel fluctuation information so that effective reception power actually becomes optimal on the receiving side.

In yet another mode of the present invention, a receiving apparatus that receives a plurality of modulated signals transmitted from a plurality of antennas with a plurality of receiving antennas greater than the plurality of transmitting antennas, creates a a channel fluctuation matrix for each combination, creates a channel fluctuation matrix eigenvalue for each combination, selects the antenna received signals of the combination whose eigenvalue minimum power is the greatest, and performs demodulation processing. By this means, each modulated signal can be demodulated using the antenna received signal combination with the greatest modulated signal effective reception power, thereby enabling modulated signal demodulation precision to be improved compared with the case where each modulated signal is demodulated using all antenna received signals.

In yet another mode of the present invention, a receiving apparatus that receives a plurality of modulated signals transmitted from a plurality of antennas with a plurality of receiving antennas greater than the plurality of transmitting antennas, creates a plurality of antenna received signal combinations, forms a channel fluctuation matrix for each combination, and calculates creates a channel fluctuation matrix eigenvalue for each combination. The receiving apparatus then separates each modulated signal using each combination of antenna received signals and the channel fluctuation matrix corresponding to that combination, and also weights and combines modulated signals separated in each combination using the channel fluctuation matrix eigenvalues used at the time of separation. By this means, it is possible to perform weighting and combining of each modulated signal according to the modulated signal effective reception power, thereby enabling modulated signal demodulation precision to be improved.

In yet another mode of the present invention, a receiving apparatus that receives a plurality of modulated signals subjected to error correction coding and transmitted from a plurality of antennas is equipped with a soft decision value calculation section that finds a channel fluctuation matrix eigenvalue, and finds a soft decision value from this eigenvalue and a received quadrature baseband signal.

In yet another mode of the present invention, a receiving apparatus that receives a plurality of modulated signals subjected to error correction coding and transmitted from a plurality of antennas is equipped with a soft decision value calculation section that finds an effective reception level from a reception level and a channel fluctuation matrix eigenvalue, and finds a soft decision value from this effective reception level and a received quadrature baseband signal.

By performing calculation by weighting a soft decision value with an effective reception level in this way, it is possible to give a soft decision value an appropriate likelihood, and modulated signal demodulation precision can be improved.

In yet another mode of the present invention, when demodulation processing is performed using a channel fluctuation matrix eigenvalue, control of the reception level of the received signal received at each antenna is carried out in common for each antenna. By this means, an eigenvalue is found more exactly, so that demodulation processing can be performed based on an eigenvalue that reflects effective reception power much more accurately, thereby enabling the demodulation precision of each modulated signal to be greatly improved.

With reference now to the accompanying drawings, embodiments of the present invention will be explained in detail below.

Embodiment 1

In Embodiment 1, a transmitting apparatus is described that independently modifies the transmission power of a modulated signal transmitted from each antenna.

FIG. 1 shows a sample configuration of the transmission unit of a transmitting apparatus according to this embodiment, as provided in a radio base station (hereinafter referred to simply as "base station"), for example. Modulation section 102 of transmission unit 100 has a transmit digital signal 101 and timing signal 122 as input, forms a transmit quadrature baseband signal 103 by executing orthogonal modulation processing such as QPSK (Quadrature Phase Shift Keying) or 16QAM (Quadrature Amplitude Modulation) on transmit digital signal 101 and performing frame configuration in accordance with timing signal 122 (FIG. 3(A)), and outputs this transmit quadrature baseband signal 103. A signal 103 as input, forms a spread signal 105 by executing spreading processing on this transmit quadrature baseband signal 103 using a predetermined spreading code, and outputs this spread signal 105. A radio section 106 has spread signal 105 as input, forms a modulated signal 107 by executing predetermined radio processing such as digital-analog conversion processing and up-conversion on spread signal 105, and outputs this modulated signal 107.

A transmission power modification section 108 has modulated signal 107, a coefficient 125 found from the reception power, and a coefficient 124 found from an eigenvalue as input, obtains a transmit signal 109 by multiplying modulated signal 107 by coefficients 125 and 124, and outputs this transmit signal 109. By this means, the transmission power of modulated signal 107 is determined based on the reception power and eigenvalue. Transmit signal 109 is output as a radio wave from an antenna 110.

Modulation section 112 has a transmit digital signal 111 and timing signal 122 as input, forms a transmit quadrature baseband signal 113 by executing orthogonal modulation processing such as QPSK or 16QAM on transmit digital signal 111 and performing frame configuration in accordance with timing signal 122 (FIG. 3(B)), and outputs this transmit quadrature baseband signal 113. A spreading section 114 has transmit quadrature baseband signal 113 as input, forms a spread signal 115 by executing spreading processing on this transmit quadrature baseband signal 113 using a predetermined, spreading code, and outputs this spread signal 115. Spreading section 114 performs spreading processing using a different spreading code from that used by spreading section 104. A radio section 116 has spread signal 115 as input, forms a modulated signal 117 by executing predetermined radio processing such as digital-analog conversion processing and up-conversion on spread signal 115, and outputs this modulated signal 117.

A transmission power modification section 118 has modulated signal 117, a coefficient 126 found from the reception power, and coefficient 124 found from an eigenvalue as input, obtains a transmit signal 119 by multiplying modulated signal 117 by coefficients 125 and 124, and outputs this transmit signal 119. By this means, the transmission power of modulated signal 117 is determined based on the reception power and eigenvalue. Transmit signal 119 is output as a radio wave from an antenna 120.

Thus, in transmission unit 100 provided in a transmitting apparatus according to this embodiment, it is possible to modify independently the transmission power of modulated signals transmitted from antennas 110 and 120.

Figure 2:
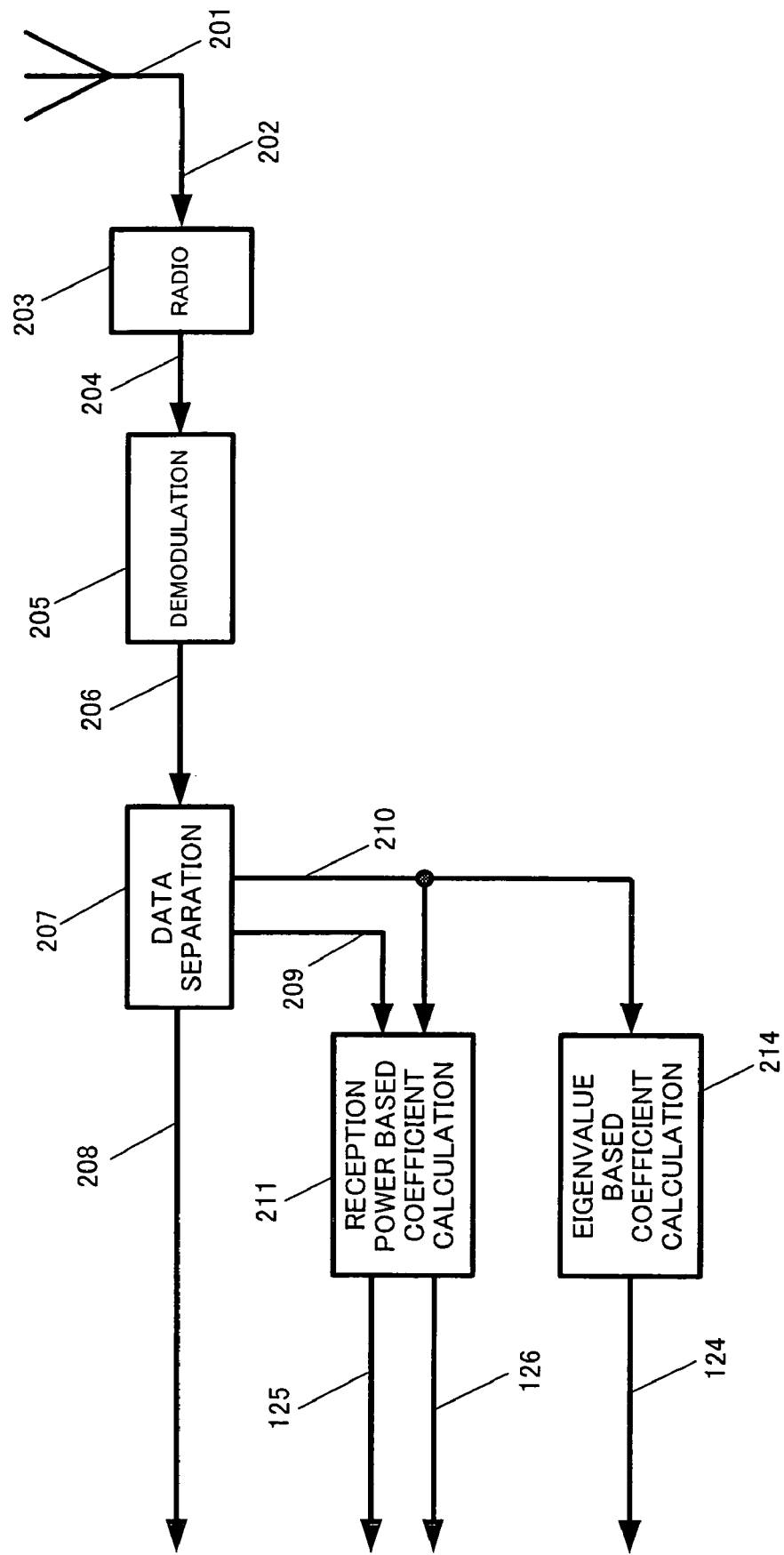
FIG. 2 is a block diagram showing a configuration of a reception unit of a transmitting apparatus of Embodiment 1.

FIG. 2 shows a sample configuration of the reception unit of a transmitting apparatus according to this embodiment. Reception unit 200 is provided in the same base station as transmission unit 100 shown in FIG. 1. Radio section 203 of reception unit 200 has a received signal 202 received by an antenna 201 as input, forms a received quadrature baseband signal 204 by executing predetermined radio processing such as down-conversion and analog-digital conversion on received signal 202, and outputs this received quadrature baseband signal 204. A demodulation section 205 has received quadrature baseband signal 204 as input, forms a received digital signal 206 by executing orthogonal demodulation processing such as QPSK demodulation or 16QAM demodulation on received quadrature baseband signal 204, and outputs this received digital signal 206.

A data separation section 207 has received digital signal 206 as input, separates received digital signal 206 into data 208, field strength estimation information 209, and channel fluctuation estimation information 210, and outputs this data 208, field strength estimation information 209, and channel fluctuation estimation information 210.

A reception power based coefficient calculation section 211 has field strength estimation information 209 as input, calculates coefficients 125 and 126 to be used by transmission power modification sections 108 and 118 of transmission unit 100 based on this field strength estimation information 209, and sends coefficients 125 and 126 to transmission power modification sections 108 and 118. The method of finding these coefficients 125 and 126 will be described in detail later herein.

An eigenvalue based coefficient calculation section 214 has channel fluctuation estimation information 210 as input, calculates coefficient 124 to be used by transmission power modification sections 108 and 118 of transmission unit 100 based on this channel fluctuation estimation information 210, and sends coefficient 124 to transmission power modification sections 108 and 118. The method of finding this coefficient 124 will be described in detail later herein.

Figure 3:
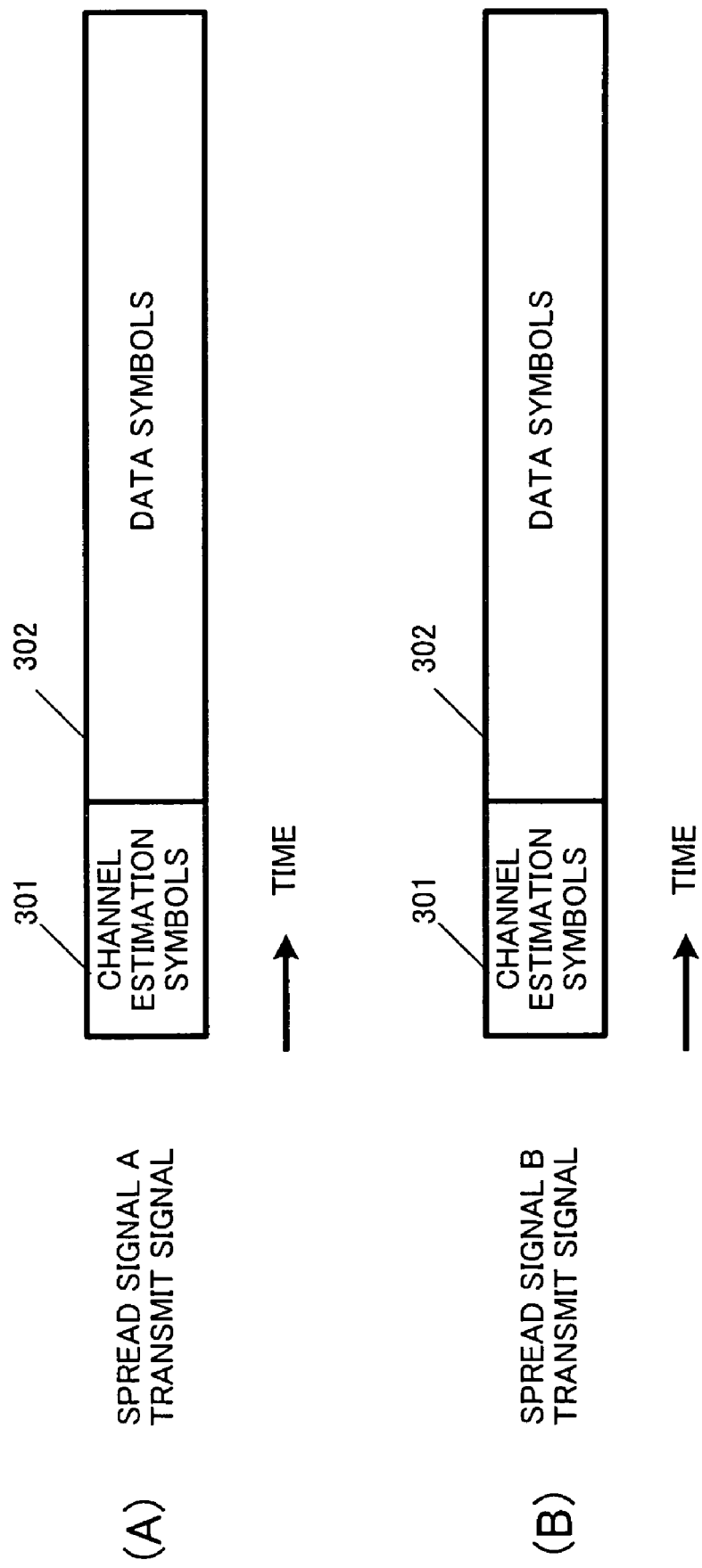
FIGS. 3A and 3B are drawings showing frame configurations of transmit signals transmitted from a transmission unit of a transmitting apparatus.

FIG. 3 shows sample frame configurations on the time axis of transmit signals 109 (spread signal A) and 119 (spread signal B) transmitted from antennas 110 and 120 of transmission unit 100. Spread signal A shown in FIG. 3(A) and spread signal B shown in FIG. 3(B) are transmitted from antennas 110 and 120 simultaneously. Channel estimation symbols 301 of spread signal A and channel estimation symbols 301 of spread signal B are, for example, mutually orthogonalized codes, and items that can be separated in the reception unit of a terminal are used for this purpose. By this means, a terminal reception unit can estimate channel fluctuation of signals transmitted from antennas 110 and 120 based on channel estimation symbols 301 contained in spread signals A and B.

Figure 4:
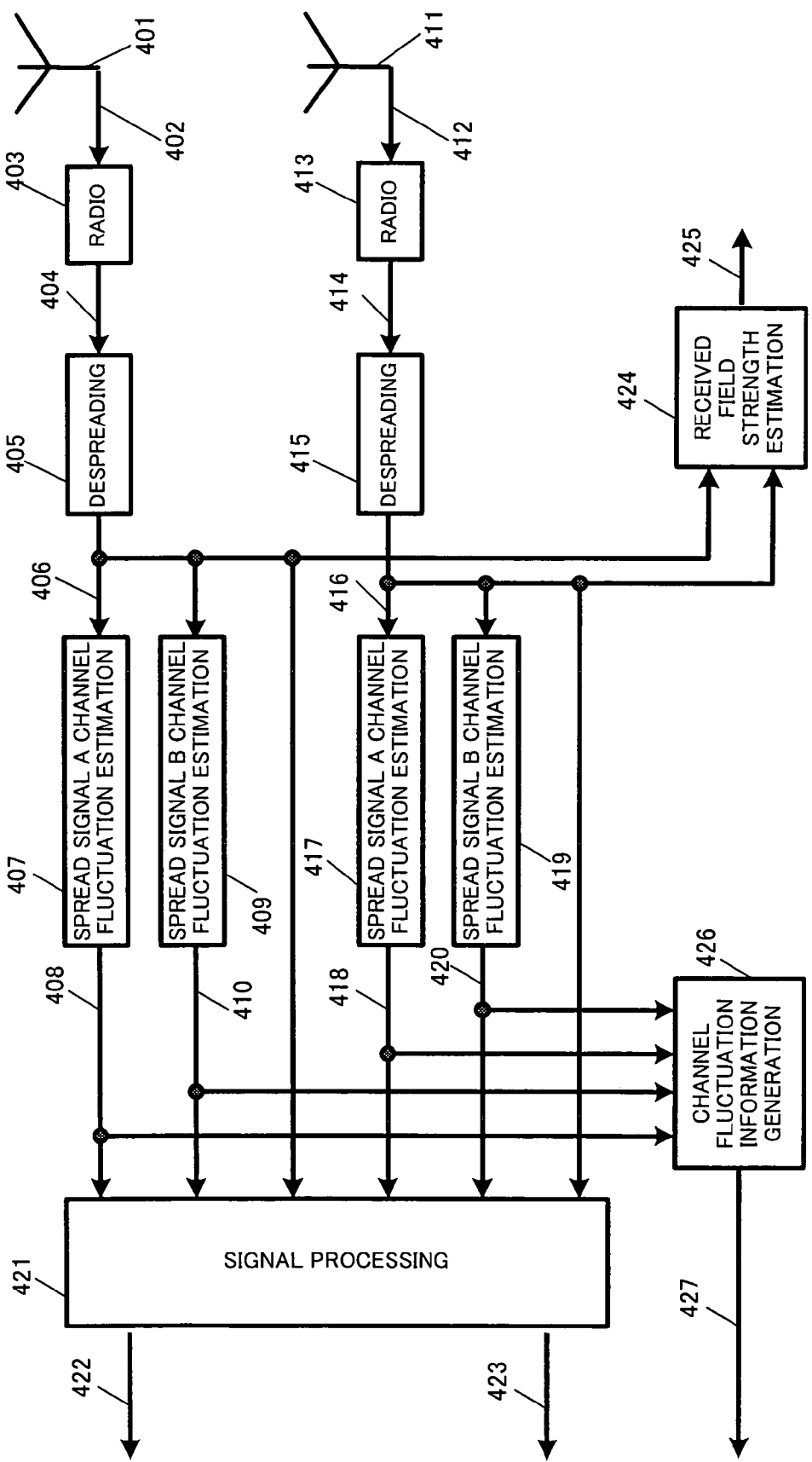
FIG. 4 is a block diagram showing a configuration of a reception unit of a receiving apparatus of Embodiment 1.

FIG. 4 shows a sample configuration of the reception unit of a receiving apparatus according to this embodiment. Reception unit 400 is provided in a communication terminal, and receives and demodulates a signal transmitted from transmission unit 100 in FIG. 1. Radio section 403 of reception unit 400 has a received signal 402 received by an antenna 401 as input, forms a received quadrature baseband signal 404 by executing predetermined radio processing such as down-conversion and analog-digital conversion on received signal 402, and outputs this received quadrature baseband signal 404. A despreading section 405 has received quadrature baseband signal 404 as input, forms a despread received quadrature baseband signal 406 by executing despreading processing using the same spreading code as that used by spreading section 104 and spreading section 114 in FIG. 1 on received quadrature baseband signal 404, and outputs this despread received quadrature baseband signal 406.

A spread signal A channel fluctuation estimation section 407 has despread received quadrature baseband signal 406 as input, estimates channel fluctuation of spread signal A (the spread signal transmitted from antenna 110) based on the channel estimation symbols, and outputs a channel fluctuation estimation signal 408. By this means, channel fluctuation between antenna 110 and antenna 401 is estimated. A spread signal B channel fluctuation estimation section 409 has despread received quadrature baseband signal 406 as input, estimates channel fluctuation of spread signal B (the spread signal transmitted from antenna 120) based on the channel estimation symbols, and outputs a channel fluctuation estimation signal 410. By this means, channel fluctuation between antenna 120 and antenna 401 is estimated.

Radio section 413 has a received signal 412 received by an antenna 411 as input, forms a received quadrature baseband signal 414 by executing predetermined radio processing such as down-conversion and analog-digital conversion on received signal 412, and outputs this received quadrature baseband signal 414. A despreading section 415 has received quadrature baseband signal 414 as input, forms a despread received quadrature baseband signal 416 by executing despreading processing using the same spreading code as that used by spreading section 104 and spreading section 114 in FIG. 1 on received quadrature baseband signal 414, and outputs this despread received quadrature baseband signal 416.

A spread signal A channel fluctuation estimation section 417 has despread received quadrature baseband signal 416 as input, estimates channel fluctuation of spread signal A (the spread signal transmitted from antenna 110) based on the channel estimation symbols, and outputs a channel fluctuation estimation signal 418. By this means, channel fluctuation between antenna 110 and antenna 411 is estimated. A spread signal B channel fluctuation estimation section 419 has despread received quadrature baseband signal 416 as input, estimates channel fluctuation of spread signal B (the spread signal transmitted from antenna 120) based on the channel estimation symbols, and outputs a channel fluctuation estimation signal 420. By this means, channel fluctuation between antenna 120 and antenna 411 is estimated.

A signal processing section 421 has received quadrature baseband signals 406 and 416, spread signal A channel fluctuation estimation signals 408 and 418, and spread signal B channel fluctuation estimation signals 410 and 420 as input, and outputs a spread signal A received quadrature baseband signal 422 and spread signal B received quadrature baseband signal 423 by performing computation using an inverse matrix of a channel fluctuation matrix with channel fluctuation estimation values 408, 410, 418, and 420 as elements. Details of this channel fluctuation matrix will be given later herein.

A received field strength estimation section 424 has received quadrature baseband signals 406 and 416 as input, finds the received field strength of these signals, and outputs received field strength estimation information 425. In this embodiment, the received field strength is found from received quadrature baseband signals, but this is not a limitation, and the received field strength may also be found from a received signal. Also, the received field strength may be found separately for spread signal A and spread signal B, or the combined wave received field strength may be found.

A channel fluctuation information generation section 426 has spread signal A channel fluctuation estimation signals 408 and 418, and spread signal B channel fluctuation estimation signals 410 and 420, as input, and forms and outputs channel fluctuation estimation information 427.

Figure 5:
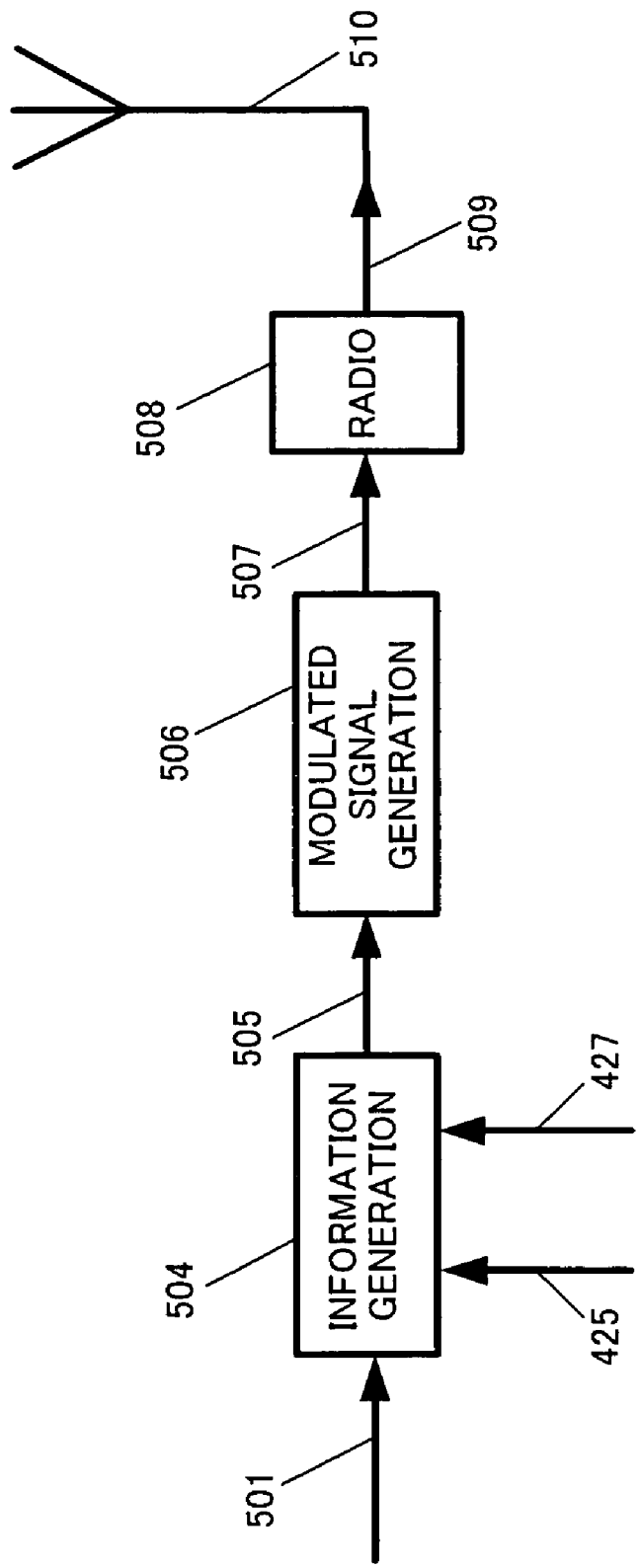
FIG. 5 is a block diagram showing a configuration of a transmission unit of a receiving apparatus of Embodiment 1.

FIG. 5 shows a sample configuration of the transmission unit of a receiving apparatus according to this embodiment. Transmission unit 500 is provided in the same communication terminal as reception unit 400. Information generation section 504 of transmission unit 500 has data 501, received field strength estimation information 425, and channel fluctuation estimation information 427 as input, arranges these in a predetermined sequence, and outputs a transmit digital signal 505. A modulated signal generation section 506 has transmit digital signal 505 as input, forms a modulated signal 507 by executing modulation processing on transmit digital signal 505, and outputs this modulated signal 507. A radio section 508 has modulated signal 507 as input, forms a transmit signal 509 by executing predetermined radio processing such as digital-analog conversion processing and up-conversion on modulated signal 507, and outputs this transmit signal 509. Transmit signal 509 is output as a radio wave from an antenna 510.

Figure 6:
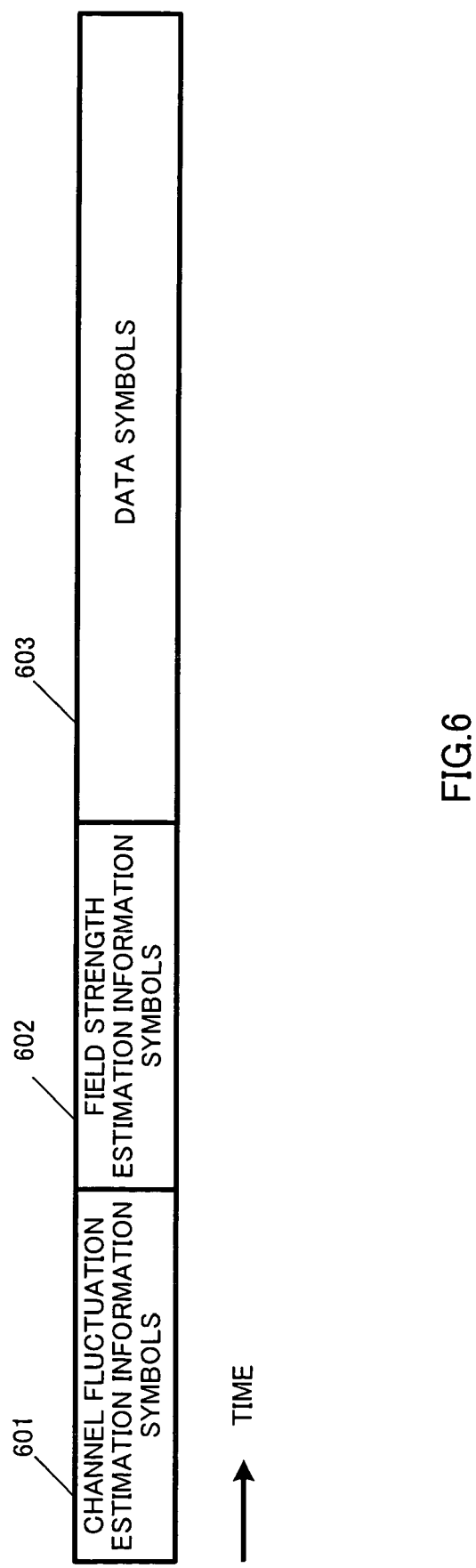
FIG. 6 is a drawing showing a frame configuration of a transmit signal transmitted from a transmission unit of a transmitting apparatus.

FIG. 6 shows a sample frame configuration of a transmit signal transmitted from transmission unit 500. In FIG. 6, reference numeral 601 denotes channel fluctuation estimation information symbols, reference numeral 602 denotes field strength estimation information symbols, and reference numeral 603 denotes data symbols.

Figure 7:
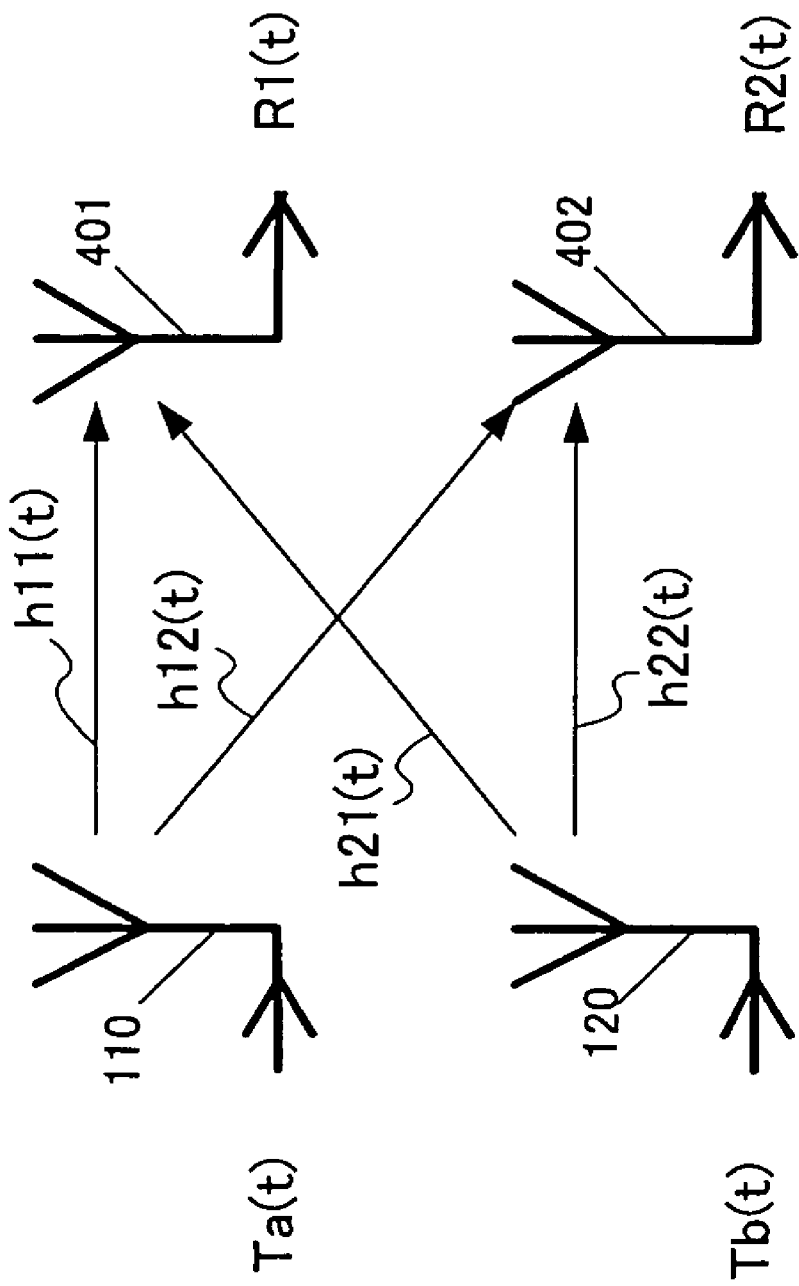
FIG. 7 is a drawing illustrating channel fluctuation between antennas of a transmitting apparatus and receiving apparatus.

FIG. 7 shows an example of the relationship between transmit signals and received signals. Modulated signal Ta(t) transmitted from transmitting antenna 110 is received by antennas 401 and 402 after being subjected to channel fluctuations h11(t) and h12(t). Modulated signal Tb(t) transmitted from transmitting antenna 120 is received by antennas 401 and 402 after being subjected to channel fluctuations h21(t) and h22(t).

The operation of a transmitting apparatus and receiving apparatus according to this embodiment will now be described in detail using FIG. 1 through FIG. 7.

First, the transmission operation of a base station (transmitting apparatus) will be described. An important operation by transmission unit 100 of the base station apparatus shown in FIG. 1 is to control the transmission power of modulated signals transmitted from antennas 110 and 120 independently at antennas 110 and 120. For this purpose, transmit signals are multiplied by a coefficient in transmission power modification sections 108 and 118 in transmission unit 100.

The operation of transmission power modification section 108 will be described in detail here. If the value of multiplication coefficient 125 found from the reception power is designated Ca, modulated signal 107 is designated Xa(t), and coefficient 124 found from an eigenvalue is designated D, transmission power modification section 108 controls transmission power Xa'(t) of transmit signal 109 as shown by the following equation.

[Equation 1]

$$Xa'(t) = Ca \times D \times Xa(t) \quad (1)$$

Similarly, if the value of multiplication coefficient 126 found from the reception power is designated Cb, modulated signal 117 is designated Xb(t), and coefficient 124 found from an eigenvalue is designated D, transmission power modification section 118 controls transmission power Xb'(t) of transmit signal 119 as shown by the following equation.

[Equation 2]

$$Xb'(t) = Cb \times D \times Xb(t) \quad (2)$$

Performing transmission power control independently for each transmitting antenna in this way enables reception quality to be improved. Also, reception quality can be much more effectively improved by performing multiplication by coefficient 124 value D found from an eigenvalue in common in transmission power modification sections 108 and 118 of both transmitting antennas. This is because a coefficient obtained from an eigenvalue corresponds to the effective received field strength of a receiving terminal (the actual reception field strength, of the reception field strength obtained by a terminal, that can be effectively used).

Moreover, reception quality can be much more effectively improved by performing multiplication independently by a coefficient found from reception power in transmission power modification sections 108 and 118 of both transmitting antennas. This is because a coefficient obtained from reception power corresponds to transmission power control for improving the received field strength of each modulated signal at an antenna of a receiving terminal.

Next, the reception operation of a base station (transmitting apparatus) will be described. If, as shown in FIG. 7, t indicates time, the modulated signal from antenna 110 is designated Ta(t), the modulated signal from antenna 120 is designated Tb(t), the received signal at antenna 401 is designated R1(t), the received signal at antenna 402 is designated R2(*t*), and channel fluctuations are designated h11(*t*), h12(*t*), h21(*t*), and h22(*t*), the relationship shown by the following equation applies. That is to say, antenna received signals R1(*t*) and R2(*t*), and modulated signals Ta(t) and Tb(t), can be related by means of a channel fluctuation matrix with channel fluctuation values h11(*t*), h12(*t*), h21(*t*), and h22(*t*) as elements.

[Equation 3]

$$\begin{pmatrix} R1(t) \\ R2(t) \end{pmatrix} = \begin{pmatrix} h11(t) & h12(t) \\ h21(t) & h22(t) \end{pmatrix} \begin{pmatrix} Ta(t) \\ Tb(t) \end{pmatrix} \quad (3)$$

Reception power based coefficient calculation section 211 provided in reception unit 200 of the base station (transmitting apparatus) in FIG. 2 determines coefficients 125 and 126 using field strength estimation information 209 received from the terminal—that is, the received field strengths of R1(*t*) and R2(*t*)—and channel fluctuation estimation information 210—that is, h11(*t*), h12(*t*), h21(*t*), and h22(*t*).

For example, coefficient 125 is found from h11(*t*) and h21(*t*) estimates. This is because h11(*t*) and h12(*t*) are fluctuation values determined by the transmission power of the signal output from antenna 110 in FIG. 1. Similarly, coefficient 126 is found from h12(*t*) and h22(*t*) estimates, because h12(*t*) and h22(*t*) are fluctuation values determined by the transmission power of the signal output from antenna 120 in FIG. 1.

That is to say, the received field strength of R1(*t*) and R2(*t*) is the field strength of a signal in which both the signal from antenna 110 and the signal from antenna 120 are combined, and therefore if coefficients 125 and 126 are determined based only on that received field strength, this will be insufficient to adjust the signal power from each antenna appropriately. Thus, in this embodiment, in addition to the received field strength, coefficients 125 and 126 for controlling the signal power transmitted from antennas 110 and 120 are determined using channel fluctuation values h11(*t*), h12(*t*), h21(*t*), and h22(*t*) at the time of reception of each transmit signal. By this means, the power at the time of reception of each signal transmitted from antennas 110 and 120 can be made appropriate.

To given an explanation in concrete terms, when the received field strength is low, the values of coefficients 125 and 126 are naturally made larger so that transmission power increases. Also, the smaller the magnitude of channel fluctuation values h11(*t*) and h21(*t*), the larger the value of coefficient 125 used by antenna 110 is made. Similarly, the smaller the magnitude of channel fluctuation values h12(*t*) and h22(*t*), the larger the value of coefficient 126 used by antenna 120 is made.

Eigenvalue based coefficient calculation section 214 calculates an eigenvalue of the Equation (3) channel fluctuation matrix with channel fluctuation values h11(*t*), h12(*t*), h21(*t*), and h22(*t*) received from the terminal as elements, and finds coefficient 124 based on the value with the lowest power among the eigenvalue power figures.

Calculation methods for finding an eigenvalue here include, for example, the Jacobi method, Givens method, Housefolde method, QR method, QL method, QL method with implicit shift, and inverse iteration method, any of which may be used in the present invention. Also, eigenvalue power is a value expressed by $a^2+b^2$ when an eigenvalue is expressed in the form a+bj (where a and b are real numbers and j is an imaginary number). The same applies to other embodiments described hereinafter.

Next, the reception operation of a communication terminal (receiving apparatus) will be described. Spread signal A channel fluctuation estimation section 407 of reception unit 400 in FIG. 4 estimates spread signal A channel fluctuation—that is, h11(*t*) in Equation (3)—from spread signal A channel estimation symbols 301 shown in FIG. 3(A), and outputs the estimation result as spread signal A channel fluctuation estimation signal 408. Spread signal B channel fluctuation estimation section 409 estimates spread signal B channel fluctuation—that is, h12(*t*) in Equation (3)—from spread signal B channel estimation symbols 301 shown in FIG. 3(B), and outputs the estimation result as spread signal B channel fluctuation estimation signal 410.

Spread signal A channel fluctuation estimation section 417 estimates spread signal A channel fluctuation—that is, h21(*t*) in Equation (3)—from spread signal A channel estimation symbols 301 shown in FIG. 3(A), and outputs the estimation result as spread signal A channel fluctuation estimation signal 418. Spread signal B channel fluctuation estimation section 419 estimates spread signal B channel fluctuation—that is, h22(*t*) in Equation (3)—from spread signal B channel estimation symbols 301 shown in FIG. 3(B), and outputs the estimation result as spread signal B channel fluctuation estimation signal 420.

Signal processing section 421 finds spread signal A and B received quadrature baseband signals 422 and 423 by performing an inverse matrix operation that multiplies the inverse matrix of the channel fluctuation matrix by both sides in Equation (3). By this means, received quadrature baseband signal 422 and received quadrature baseband signal 423 are separated. Channel fluctuation information generation section 426 has spread signal A channel fluctuation estimation signals 408 and 418, spread signal B channel fluctuation estimation signals 410 and 420, and estimated channel fluctuations h11(*t*), h12(*t*), h21(*t*), and h22(*t*) as input, and outputs these as channel fluctuation estimation information 427.

Thus, according to the above configuration, in a transmitting apparatus that performs multi-antenna transmission it is possible to make the received field strength at the time of reception of each modulated signal appropriate, and thus improve the reception quality of each modulated signal, by receiving from the communicating station channel fluctuation values h11(*t*), h12(*t*), h21(*t*), and h22(*t*) at the time of reception of each modulated signal transmitted from antennas 110 and 120, and independently controlling at antennas 110 and 120 the transmission power of modulated signals transmitted from antennas 110 and 120 based on these channel fluctuation values h11(*t*), h12(*t*), h21(*t*), and h22(*t*).

In addition, by controlling transmission power in consideration of an eigenvalue of a channel fluctuation matrix with channel fluctuation values h11(*t*), h12(*t*), h21(*t*), and h22(*t*) as elements, the effective received field strength can be increased, enabling the reception quality of each modulated signal to be greatly improved.

In the above-described embodiment, a case has been described in which coefficients 124, 125, and 126 for controlling the transmission power of antennas 110 and 120 are decided by a base station—that is, on the transmitting side—but the present invention is not limited to this, and it is also possible for coefficients 124, 125, and 126 to be decided by a terminal—that is, on the receiving side—and for the decided coefficients to be fed back to the transmitting side. This also applies to other embodiments described hereinafter.

Also, in the above-described embodiment, a case has been described in which the number of antennas is two and the number of multiplexed modulated signals is two, but the present invention is not limited to this, and the present invention can be widely applied to cases where a plurality of antennas are used and a different modulated signal is transmitted from each antenna. It is also possible, for example, for one antenna (for example, antenna 110) that transmits a modulated signal to be configured from a plurality of antennas, as with an adaptive array antenna. This also applies to other embodiments described hereinafter.

Moreover, in the above-described embodiment, received field strength has been mentioned, but the present invention may also be similarly implemented with reception level, reception strength, reception power, reception amplitude, carrier power to noise power, or the like, substituted for received field strength. This also applies to other embodiments described hereinafter.

Furthermore, in the above-described embodiment, symbols transmitted for estimating channel fluctuation are referred to as channel estimation symbols 301 (FIG. 3), but channel estimation symbols 301 may also be referred to as pilot symbols, a preamble, control symbols, known symbols, or a unique word, or may be referred to by another name. Also, channel fluctuation estimation information symbols 601 and field strength estimation information symbols 602 in FIG. 6 may also be referred to as control symbols, or may be referred to by another name. In other words, the present invention can be implemented in the same way as in the above-described embodiment even if these symbols are used. This also applies to other embodiments described hereinafter.

Moreover, in the above-described embodiment, a spread spectrum communication system has been described by way of example, but this is not a limitation, and the present invention can be similarly implemented in a single-carrier system that does not have a spreading section, or an OFDM system, for example. In the case of a single-carrier system, the configuration does not include spreading sections 104 and 114 (FIG. 1) or despreading sections 405 and 415 (FIG. 4). A case in which the present invention is applied to an OFDM system is described in detail in Embodiment 2.

Furthermore, the configurations of a transmitting apparatus and receiving apparatus of the present invention are not limited to the configurations in FIG. 1, FIG. 2, FIG. 4, and FIG. 5. For example, in the above-described embodiment a case has been described in which transmission power modification sections 108 and 118 are provided, and transmission power of modulated signals transmitted from antennas 110 and 120 is controlled independently by these transmission power modification sections at antennas 110 and 120 based on coefficient 124 found from an eigenvalue and coefficients 125 and 126 found from reception power, but it is essential only that the modulated signal of each antenna be controlled independently, and the configuration is not limited to that shown in FIG. 1.

Figure 8:
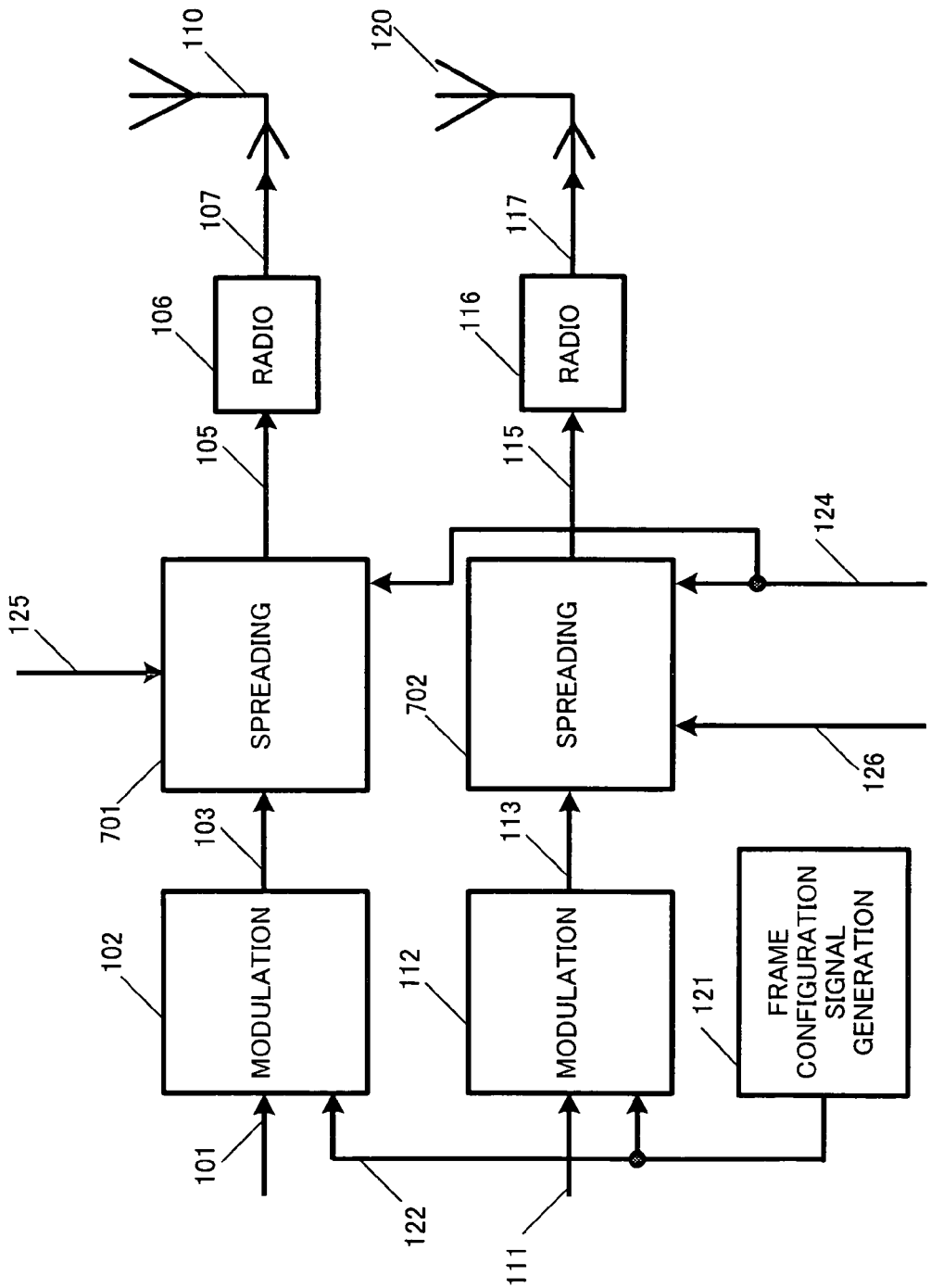
FIG. 8 is a block diagram showing another sample configuration of a transmission unit of a transmitting apparatus.

FIG. 8 shows another sample configuration of the transmission unit of a base station according to this embodiment. In FIG. 8, parts that operate in the same way as in transmission unit 100 in FIG. 1 are assigned the same codes as in FIG. 1. The difference between transmission unit 700 in FIG. 8 and transmission unit 100 in FIG. 1 is that, whereas transmission unit 100 in FIG. 1 controls the power of modulated signals transmitted from each antenna by means of transmission power modification sections 108 and 118, transmission unit 700 in FIG. 8 controls the power of modulated signals transmitted from each antenna by means of spreading sections 701 and 702.

Specifically, spreading section 701 has transmit quadrature baseband signal 103, coefficient 125 found from reception power, and coefficient 124 found from an eigenvalue as input, and outputs spread signal 105 of power in accordance with these coefficients 125 and 124. Similarly, spreading section 702 has transmit quadrature baseband signal 113, coefficient 126 found from reception power, and coefficient 124 found from an eigenvalue as input, and outputs spread signal 115 of power in accordance with these coefficients 126 and 124.

Figure 9:
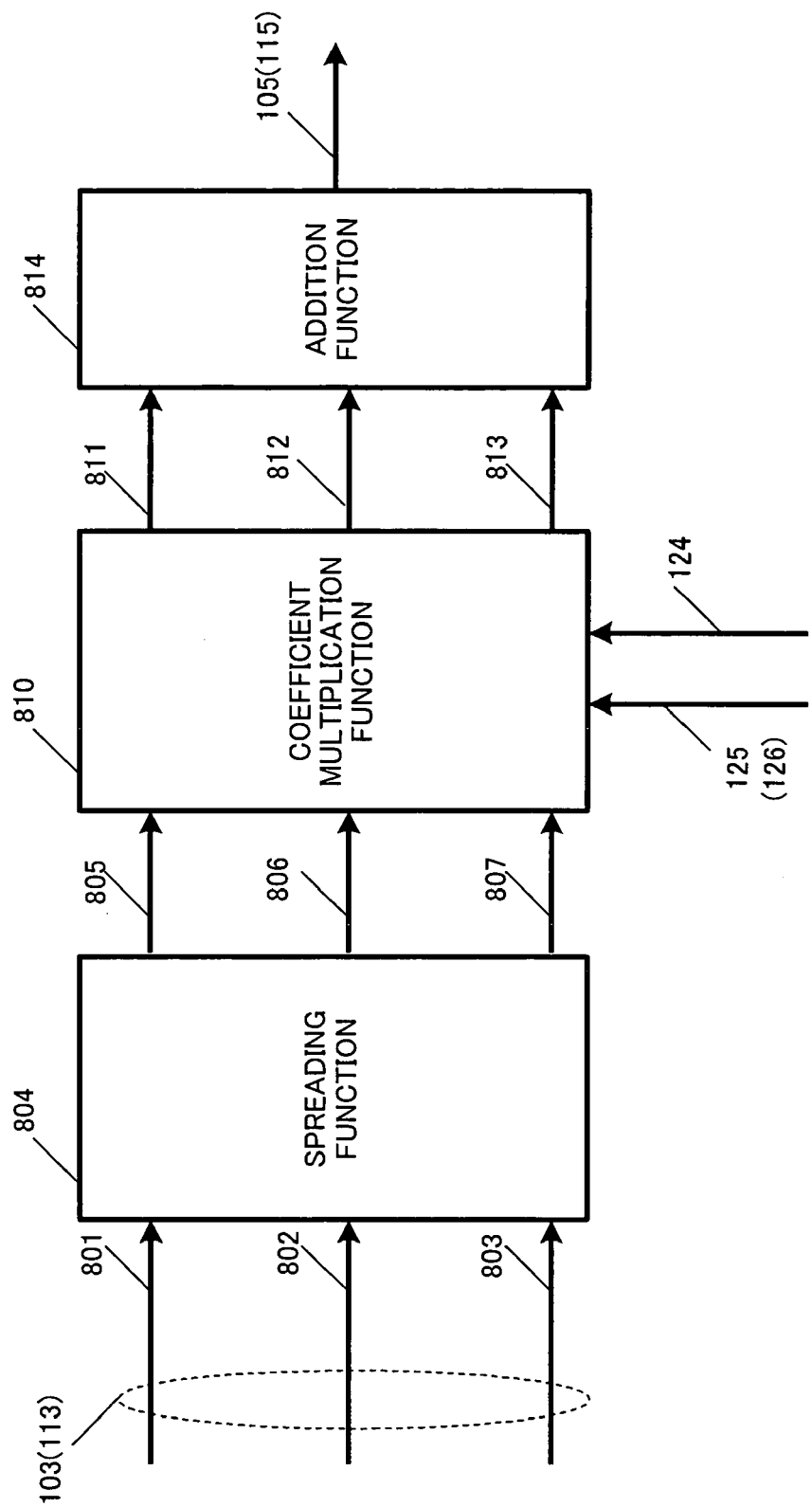
FIG. 9 is a block diagram showing a configuration of the spreading section in FIG. 8.

FIG. 9 shows a sample configuration of spreading sections 701 and 702. A spreading function section 804 has channel X transmit quadrature baseband signal 801, channel Y transmit quadrature baseband signal 802, and channel Z transmit quadrature baseband signal 803 as input, forms a channel X spread signal 805, channel Y spread signal 806, and channel Z spread signal 807 by performing spreading processing on these signals using different spreading codes, and outputs spread signals 805, 806, and 807. Here, a channel X signal denotes a signal destined for terminal X, a channel Y signal denotes a signal destined for terminal Y, and a channel Z signal denotes a signal destined for terminal Z. That is to say, transmission unit 700 outputs spread modulated signals destined for three terminals, X, Y, and Z, respectively from antennas 110 and 120.

A coefficient multiplication function section 810 has channel X spread signal 805, channel Y spread signal 806, channel Z spread signal 807, coefficient 125 (126) found from reception power, and coefficient 124 found from an eigenvalue as input, forms a post-coefficient-multiplication channel X spread signal 811, post-coefficient-multiplication channel Y spread signal 812, and post-coefficient-multiplication channel Z spread signal 813 by performing coefficient multiplication in accordance with these coefficients 125 (126) and 124, and outputs these signals 811, 812, and 813.

Here, coefficient 125 (126) found from reception power and coefficient 124 found from an eigenvalue multiplied by channel X spread signal 805 are found based on received field strength estimation information and channel fluctuation estimation information sent from terminal X; coefficient 125 (126) found from reception power and coefficient 124 found from an eigenvalue multiplied by channel Y spread signal 806 are found based on received field strength estimation information and channel fluctuation estimation information sent from terminal Y; and coefficient 125 (126) found from reception power and coefficient 124 found from an eigenvalue multiplied by channel Z spread signal 807 are found based on received field strength estimation information and channel fluctuation estimation information sent from terminal Z.

An addition function section 814 adds post-coefficient-multiplication channel X spread signal 811, post-coefficient-multiplication channel Y spread signal 812, and post-coefficient-multiplication channel Z spread signal 813, and outputs the result as spread signal 105 (115).

In this way, transmission unit 700 simultaneously generates transmit signals destined for a plurality of terminals. At this time, transmission unit 700 can control transmission power independently for each antenna and independently for the modulated signals destined for each terminal by receiving field strength estimation information and channel fluctuation estimation information from each terminal, finding a coefficient found from reception power and a coefficient found from an eigenvalue for each terminal, and multiplying these coefficients differing for each terminal by the spread modulated signal destined for each terminal. As a result, when modulated signals destined for a plurality of terminals are transmitted from a plurality of antennas, it is possible to optimize the effective reception power at all of the plurality of terminals, and improve the reception quality of all of the plurality of terminals without reducing transmission speed.

Thus, according to this embodiment, by receiving information constituting an effective reception power index such as channel fluctuation information and received field strength information from a receiving apparatus as feedback information, and modifying the reception power of the modulated signal transmitted from each antenna independently for each antenna based on this information, it is possible to increase the effective reception power of the modulated signal transmitted from each antenna, and to implement a transmitting apparatus that enables modulated signal reception quality to be improved.

Embodiment 2

In this embodiment, a transmitting apparatus is described that modifies the transmission power of a modulated signal transmitted from each antenna independently at each antenna and independently for each carrier.

Figure 10:
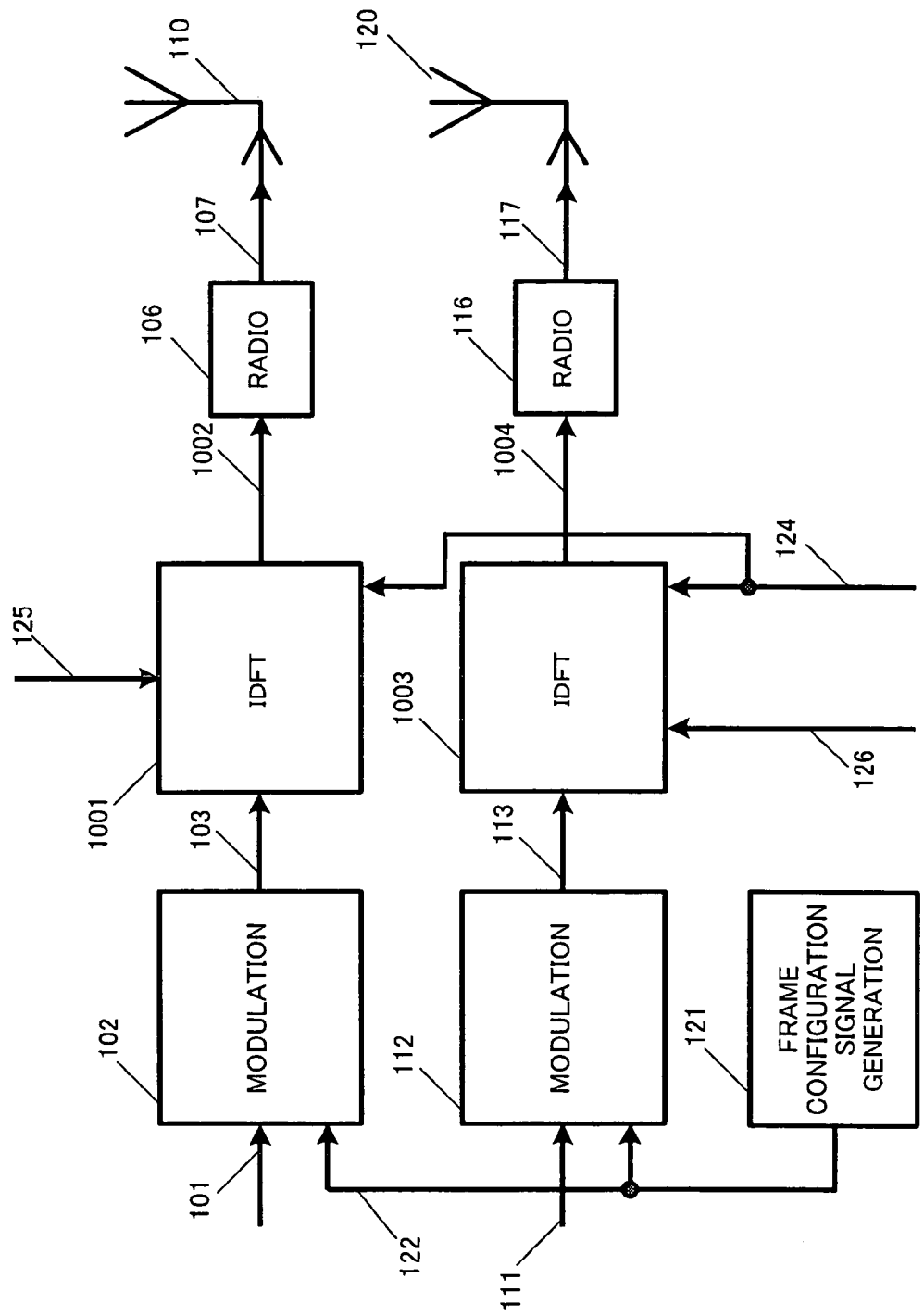
FIG. 10 is a block diagram showing a configuration of a transmission unit of a transmitting apparatus of Embodiment 2.

FIG. 10 shows a sample configuration of the transmission unit of a transmitting apparatus according to this embodiment. Transmission unit 1000 is provided in a base station apparatus, for example. The base station reception unit is configured as shown in FIG. 2, for example, the transmission unit of a terminal that performs communication with the base station is configured as shown in FIG. 5, for example, and the frame configuration of a transmit signal transmitted from the terminal transmission unit is as shown in FIG. 6, for example. As these have already been described in Embodiment 1, a description thereof is omitted here.

In transmission unit 1000, transmit digital signal 101 and timing signal 122 are input to modulation section 102, a transmit quadrature baseband signal group 103 is formed by executing orthogonal modulation processing such as QPSK or 16 QAM on transmit digital signal 101 and performing frame configuration in accordance with timing signal 122 (FIG. 11(A)), and transmit orthogonal baseband group 103 is output. An IDFT 1001 has transmit orthogonal baseband group 103, coefficient 125 found from reception power, and coefficient 124 found from an eigenvalue as input, modifies the transmission power based on coefficients 125 and 124 and also performs an inverse Fourier transform, and outputs a post-inverse-Fourier-transform signal 1002.

Similarly, in transmission unit 1000, transmit digital signal 111 and timing signal 122 are input to modulation section 112, a transmit quadrature baseband signal group 113 is formed by executing orthogonal modulation processing such as QPSK or 16QAM on transmit digital signal 111 and performing frame configuration in accordance with timing signal 122 (FIG. 11(B)), and transmit orthogonal baseband group 113 is output. An IDFT 1003 has transmit orthogonal baseband group 113, coefficient 126 found from reception power, and coefficient 124 found from an eigenvalue as input, modifies the transmission power based on coefficients 126 and 124 and also performs an inverse Fourier transform, and outputs a post-inverse-Fourier-transform signal 1004.

Figure 11:
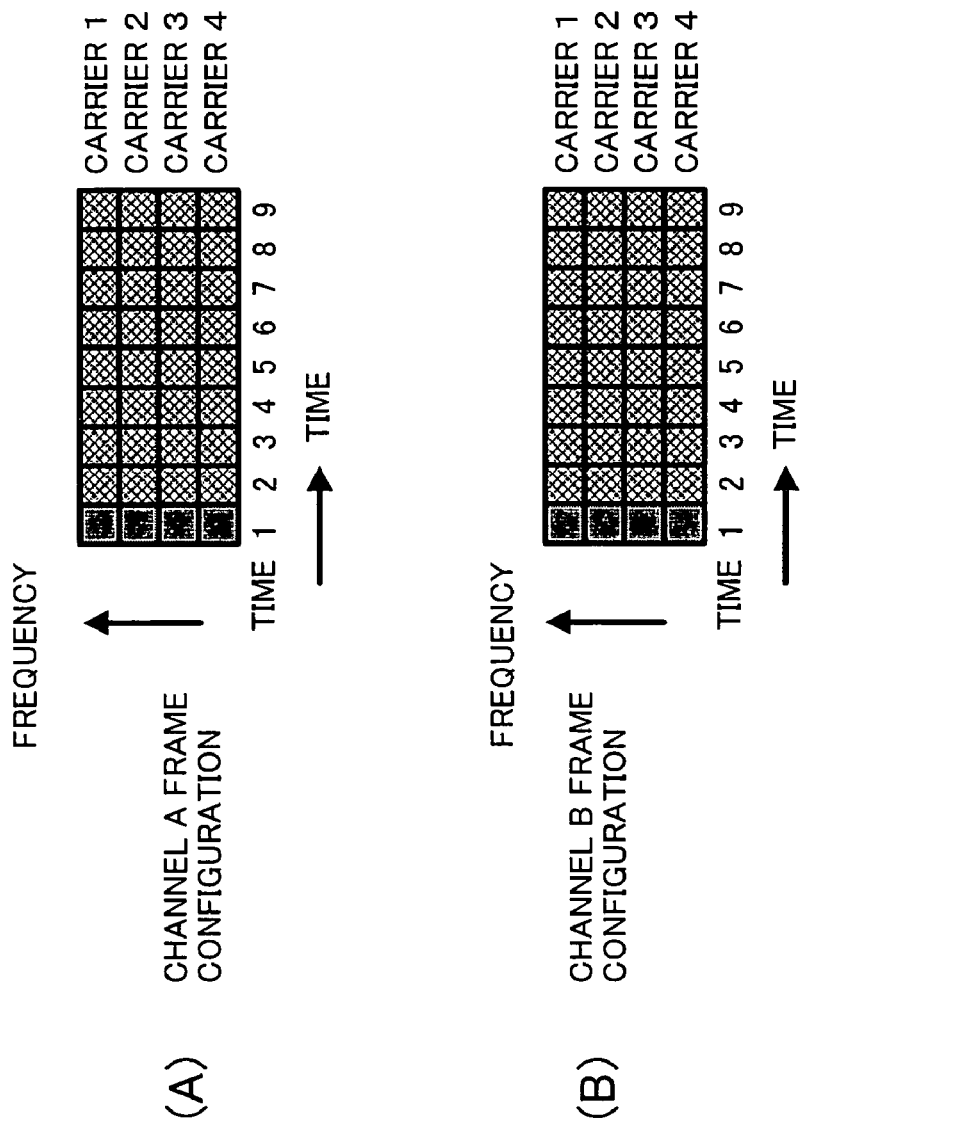
FIGS. 11A and 11B are drawings showing frame configurations of transmit signals transmitted from the transmission unit in FIG. 10.

FIG. 11 shows sample frame configurations of modulated signals transmitted from transmission unit 1000. FIG. 11(A) shows the frame configuration of a signal transmitted from antenna 110 (channel A), and FIG. 11(B) shows the frame configuration of a signal transmitted from antenna 120 (channel B). In this example, estimation symbols 1101 are transmitted at specific time 1 arranged on all subcarriers, and information symbols 1102 are transmitted at other times 2 through 9.

Figure 12:
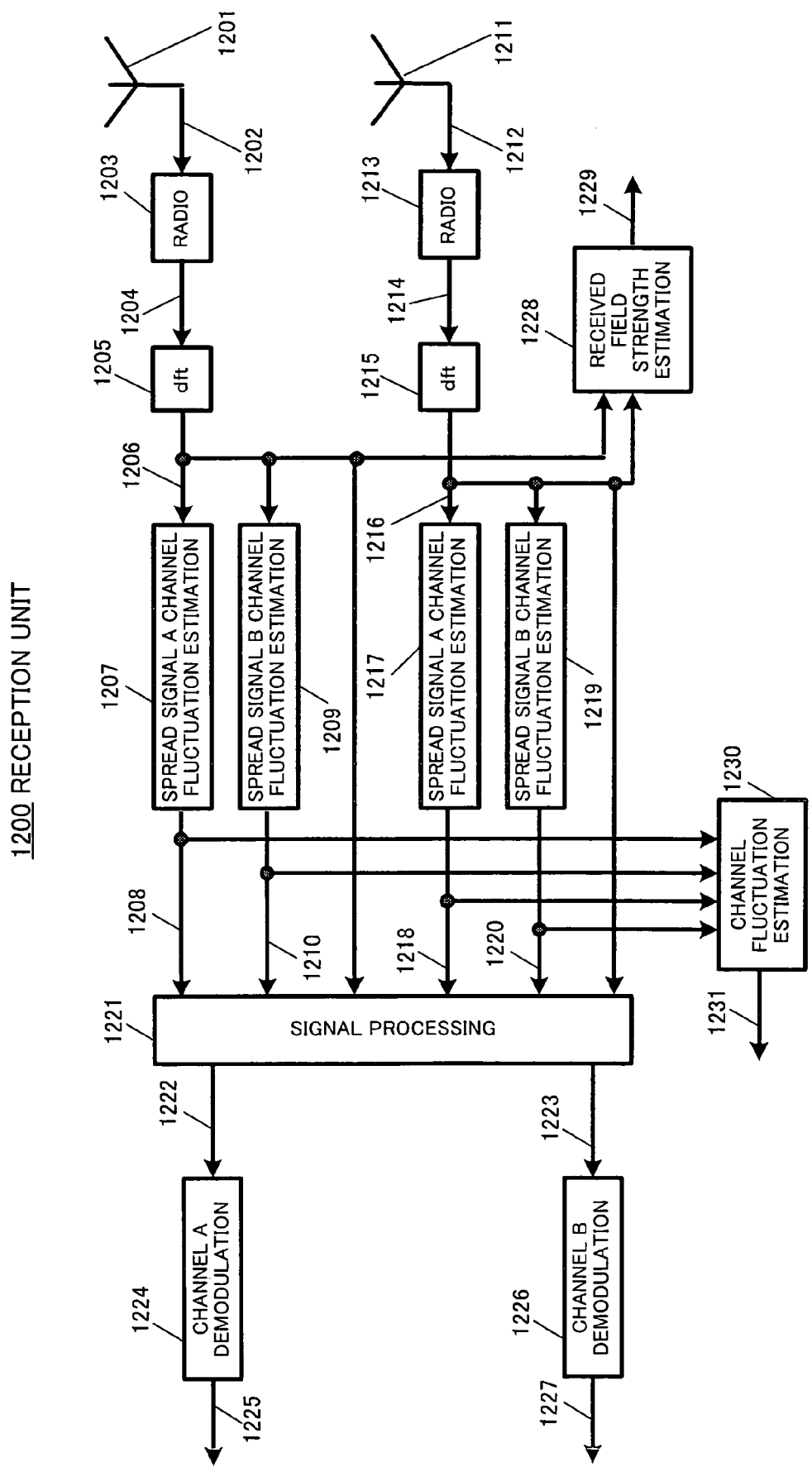
FIG. 12 is a block diagram showing a configuration of a reception unit of a receiving apparatus of Embodiment 2.

FIG. 12 shows a sample configuration of the reception unit of a receiving apparatus according to this embodiment. Reception unit 1200 is provided in a communication terminal, and receives and demodulates signals transmitted from transmission unit 1000 in FIG. 10. Radio section 1203 of reception unit 1200 has a received signal 1202 received by an antenna 1201 as input, forms a received quadrature baseband signal 1204 by executing predetermined radio processing such as down-conversion and analog-digital conversion on received signal 1202, and outputs this received quadrature baseband signal 1204. A Fourier transform section (dft) 1205 has received quadrature baseband signal 1204 as input, forms a post-Fourier-transform signal 1206 by executing Fourier transform processing on received quadrature baseband signal 1204, and outputs this post-Fourier-transform signal 1206.

A channel A channel fluctuation estimation section 1207 has post-Fourier-transform signal 1206 as input, estimates channel fluctuation of the channel A signal (the OFDM signal transmitted from antenna 110) based on the channel A channel estimation symbols, and outputs a channel fluctuation estimation group signal 1208. By this means, channel fluctuation between antenna 110 and antenna 1201 is estimated. A channel B channel fluctuation estimation section 1209 has post-Fourier-transform signal 1206 as input, estimates channel fluctuation of the channel B signal (the OFDM signal transmitted from antenna 120) based on the channel B channel estimation symbols, and outputs a channel fluctuation estimation group signal 1210. By this means, channel fluctuation between antenna 120 and antenna 1201 is estimated.

A radio section 1213 has a received signal 1212 received by an antenna 1211 as input, forms a received quadrature baseband signal 1214 by executing predetermined radio processing such as down-conversion and analog-digital conversion on received signal 1212, and outputs this received quadrature baseband signal 1214. A Fourier transform section (dft) 1215 has received quadrature baseband signal 1214 as input, forms a post-Fourier-transform signal 1216 by executing Fourier transform processing on received quadrature baseband signal 1214, and outputs this post-Fourier-transform signal 1216.

A channel A channel fluctuation estimation section 1217 has post-Fourier-transform signal 1216 as input, estimates channel fluctuation of the channel A signal (the OFDM signal transmitted from antenna 110) based on the channel A channel estimation symbols, and outputs a channel fluctuation estimation group signal 1218. By this means, channel fluctuation between antenna 110 and antenna 1211 is estimated. A channel B channel fluctuation estimation section 1219 has post-Fourier-transform signal 1216 as input, estimates channel fluctuation of the channel B signal (the OFDM signal transmitted from antenna 120) based on the channel B channel estimation symbols, and outputs a channel fluctuation estimation group signal 1220. By this means, channel fluctuation between antenna 120 and antenna 1211 is estimated.

A signal processing section 1221 has post-Fourier-transform signals 1206 and 1216, channel fluctuation estimation group signals 1208 and 1218, and channel fluctuation estimation group signals 1210 and 1220 as input, and outputs a channel A received quadrature baseband signal group 1222 and channel B received quadrature baseband signal group 1223 by performing computation using an inverse matrix of a channel fluctuation matrix with channel fluctuation estimation values 1208, 1218, 1210, and 1220 as elements.

A channel A demodulation section 1224 has channel A received quadrature baseband signal group 1222 as input, forms a received digital signal 1225 by executing demodulation processing corresponding to modulation section 102 of transmission unit 1000 (FIG. 10) on that signal, and outputs received digital signal 1225. A channel B demodulation section 1226 has channel B received quadrature baseband signal group 1223 as input, forms a received digital signal 1227 by executing demodulation processing corresponding to modulation section 112 of transmission unit 1000 on that signal, and outputs received digital signal 1227.

A received field strength estimation section 1228 has post-Fourier-transform signals 1206 and 1216 as input, finds the received field strength of these signals, and outputs received field strength estimation information 1229.

A channel fluctuation estimation section 1230 has channel A channel fluctuation estimation signal groups 1208 and 1218, and channel B channel fluctuation estimation signal groups 1210 and 1220, as input, and forms and outputs channel fluctuation estimation information 1231.

Figure 13:
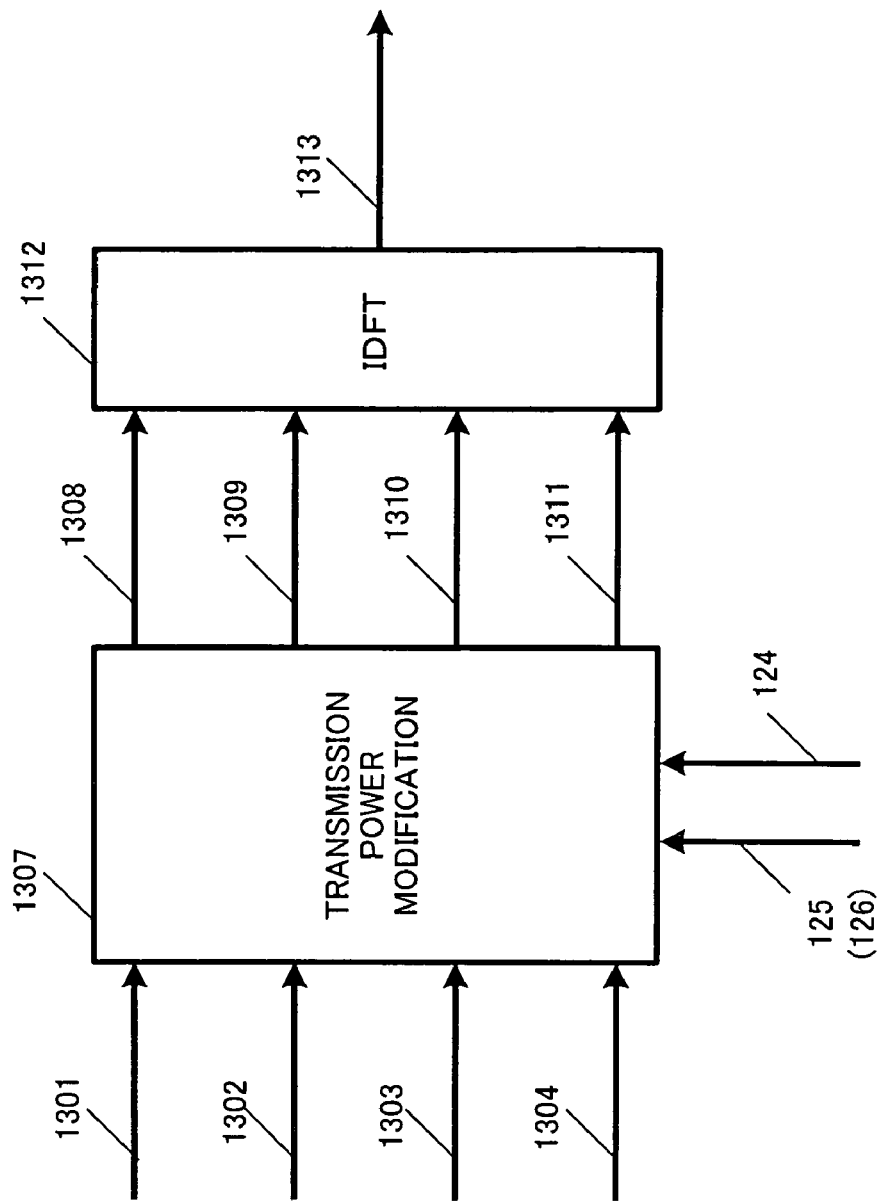
FIG. 13 is a drawing showing a configuration of the inverse Fourier transform section in FIG. 10.

FIG. 13 shows a sample configuration of IDFTs 1001 and 1003 provided in transmission unit 1000 in FIG. 10. As IDFT 1001 and IDFT 1003 have the same configuration, IDFT 1001 will be described here.

IDFT 1001 has a transmission power modification section 1307. Transmission power modification section 1307 has a carrier 1 transmit quadrature baseband signal 1301, carrier 2 transmit quadrature baseband signal 1302, carrier 3 transmit quadrature baseband signal 1303, carrier 4 transmit quadrature baseband signal 1304, coefficient 125 found from reception power, and coefficient 124 found from an eigenvalue as input, and by multiplying carrier transmit quadrature baseband signals 1301 through 1304 by coefficients 125 and 124, obtains post-coefficient-multiplication carrier 1 transmit quadrature baseband signal 1308, post-coefficient-multiplication carrier 2 transmit quadrature baseband signal 1309, post-coefficient-multiplication carrier 3 transmit quadrature baseband signal 1310, and post-coefficient-multiplication carrier 4 transmit quadrature baseband signal 1311, and outputs these signals.

Coefficient 125 found from reception power and coefficient 124 found from an eigenvalue in this embodiment are found for each carrier. Then transmission power modification section 1307 modifies the transmission power on a carrier-by-carrier basis by multiplying the respective corresponding carrier transmit quadrature baseband signals by coefficients 125 and 124.

An inverse Fourier transform section (IDFT section) 1312 has post-coefficient-multiplication carrier 1 transmit quadrature baseband signal 1308, post-coefficient-multiplication carrier 2 transmit quadrature baseband signal 1309, post-coefficient-multiplication carrier 3 transmit quadrature baseband signal 1310, and post-coefficient-multiplication carrier 4 transmit quadrature baseband signal 1311 as input, obtains a post-inverse-Fourier-transform signal 1313 by executing inverse Fourier transform processing on these signals, and outputs post-inverse-Fourier-transform signal 1313.

The operation of a transmitting apparatus and receiving apparatus according to this embodiment will now be described in detail. To simplify the explanation, the drawings used in Embodiment 1 (FIG. 2 and FIG. 6) will be used again here.

First, the transmission operation of a base station (transmitting apparatus) will be described. Important operations by transmission unit 1000 of the base station apparatus shown in FIG. 10 are, firstly, to control the transmission power of OFDM signals transmitted from antennas 110 and 120 independently at antennas 110 and 120, and secondly, to control transmission power on a carrier-by-carrier basis. For this purpose, transmission unit 1000 performs multiplication by coefficients in IDFTs 1001 and 1003 in order to modify the transmission power of transmit quadrature baseband signal groups 103 and 113.

Details of these operations will be described using FIG. 13. FIG. 13 shows the detailed configuration of IDFTs 1001 and 1003 in FIG. 10. Transmit orthogonal baseband groups 103 and 113 in FIG. 10 correspond to carrier 1 transmit quadrature baseband signal 1301, carrier 2 transmit quadrature baseband signal 1302, carrier 3 transmit quadrature baseband signal 1303, and carrier 4 transmit quadrature baseband signal 1304 in FIG. 13, and there is an quadrature baseband signal for each subcarrier.

Transmission power modification section 1307 modifies transmission power on a carrier-by-carrier basis by multiplying respective corresponding carrier transmit quadrature baseband signals by coefficients 125 and 124. That is to say, coefficient 125 found from reception power and eigenvalue 126 comprise coefficients for each carrier. The coefficient multiplication method used by transmission power modification section 1307 is basically as described in Embodiment 1, differing only in that coefficient multiplication is performed on a carrier-by-carrier basis.

Next, the reception operation of a base station (transmitting apparatus) will be described. In this embodiment, reception unit 200 in FIG. 2 receives field strength estimation information 209 for each carrier from a communication terminal (receiving apparatus). Then coefficients 125 and 126 for each carrier are found by reception power based coefficient calculation section 211, and coefficient 124 for each carrier is found by eigenvalue based coefficient calculation section 214. Thus, coefficients 124, 125, and 126 for each carrier are found based on field strength estimation information 209 and channel fluctuation estimation information 210 for each carrier sent from a communication terminal (receiving apparatus). The coefficient calculation methods used by reception power based coefficient calculation section 211 and eigenvalue based coefficient calculation section 214 are basically as described in Embodiment 1, differing only in that coefficients are calculated on a carrier-by-carrier basis.

Next, the reception operation of a communication terminal (receiving apparatus) will be described. Post-Fourier-transform signals 1206 and 1216 output from Fourier transform sections (dft's) 1205 and 1215 of reception unit 1200 in FIG. 12 comprise signals for each carrier.

Channel A channel fluctuation estimation section 1207 detects estimation symbols 1101 in FIG. 11(A) and estimates channel fluctuation on a carrier-by-carrier basis. That is to say, $h11(t)$ in Equation (3) is estimated for each carrier, and output as channel A channel fluctuation estimation signal group 1208. Channel B channel fluctuation estimation section 1209 detects estimation symbols 1101 in FIG. 11(B) and estimates channel fluctuation on a carrier-by-carrier basis. That is to say, $h12(t)$ in Equation (3) is estimated for each carrier, and output as channel B channel fluctuation estimation signal group 1210.

Channel A channel fluctuation estimation section 1217 detects estimation symbols 1101 in FIG. 11(A) and estimates channel fluctuation on a carrier-by-carrier basis. That is to say, $h21(t)$ in Equation (3) is estimated for each carrier, and output as channel A channel fluctuation estimation signal group 1218. Channel B channel fluctuation estimation section 1219 detects estimation symbols 1101 in FIG. 11(B) and estimates channel fluctuation on a carrier-by-carrier basis. That is to say, h22(t) in Equation (3) is estimated for each carrier, and output as channel B channel fluctuation estimation signal group 1219.

Received field strength estimation section 1228 has post-Fourier-transform signals 1206 and 1216 as input, finds the received field strength on a carrier-by-carrier basis, and outputs received field strength estimation signal 1229.

Channel fluctuation estimation section 1230 has channel fluctuation estimation signal groups 1208 and 1218, and channel fluctuation estimation signal groups 1210 and 1220, as input, generates channel fluctuation estimation information for each carrier, and outputs this as channel fluctuation estimation information 1231.

Per-carrier received field strength estimation information and per-carrier channel fluctuation estimation information formed in this way is sent to the base station as feedback information by a transmission unit 500 such as shown in FIG. 5. Received field strength estimation information 425 in FIG. 5 corresponds to received field strength estimation information 1229 in FIG. 12, and channel fluctuation estimation information 427 in FIG. 5 corresponds to channel fluctuation estimation information 1231 in FIG. 12.

Thus, according to this embodiment, when a multicarrier signal is transmitted from a plurality of antennas, by receiving information constituting an effective reception power index such as per-carrier channel fluctuation information and per-carrier received field strength information from a receiving apparatus as feedback information, and modifying the reception power of the multicarrier signal transmitted from each antenna independently for each antenna and independently for each carrier based on this information, it is possible to increase on a carrier-by-carrier basis the effective reception power of the multicarrier signal transmitted from each antenna, and to implement a transmitting apparatus that enables multicarrier signal reception quality to be improved across all carriers.

In this embodiment, a case has been described in which transmission power of each carrier is changed by IDFTs 1001 and 1003, but transmission power need not be modified by IDFTs 1001 and 1003, but may instead be modified by modulation sections 102 and 112, or radio sections 106 and 116, for example.

Also, this embodiment has been described taking OFDM as an example, but the present invention can be similarly implemented for a method that combines OFDM processing and spreading processing (such as OFDM-CDMA, for example).

Embodiment 3

In this embodiment, a transmitting apparatus is described that receives at a plurality of antennas a plurality of modulated signals transmitted from a plurality of antennas, selects a receiving antenna, and performs received signal demodulation using only a received signal from the selected receiving antenna.

Specifically, a plurality of antenna received signal combinations are created, a channel fluctuation matrix is created for each combination, channel fluctuation matrix eigenvalues are calculated for each combination, and antenna received signals of the combination for which the eigenvalue minimum power is greatest are selected, and undergo demodulation processing.

Figure 14:
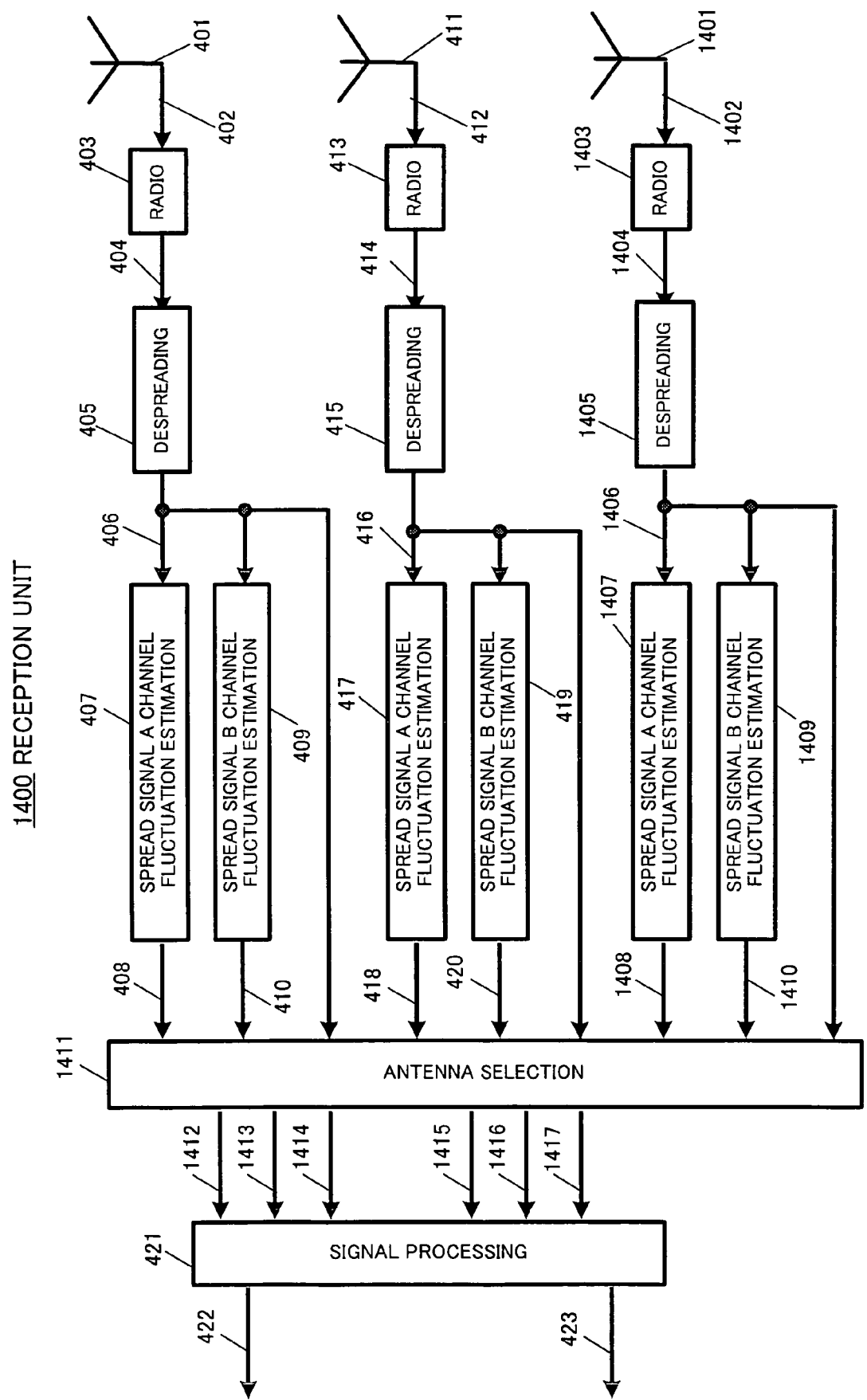
FIG. 14 is a block diagram showing a configuration of a reception unit of a receiving apparatus of Embodiment 3.

FIG. 14 shows a sample configuration of the reception unit of a receiving apparatus according to this embodiment. Parts in FIG. 14 corresponding to those in FIG. 4 are assigned the same codes as in FIG. 4 and detailed descriptions of these parts are omitted. Reception unit 1400 is provided in a communication terminal, for example. Here, it is assumed that the transmission unit of a base station that performs communication with a communication terminal equipped with reception unit 1400 is configured as shown in FIG. 1, for example, and signals transmitted from the base station are configured as shown in FIG. 3.

Reception unit 1400 has three antennas 401, 411, and 1401, and two modulated signals (spread signal A and spread signal B) transmitted from transmission unit 100 are received by each of antennas 401, 411, and 1401.

Radio section 1403 of reception unit 1400 has a received signal 1402 received by antenna 1401 as input, forms a received quadrature baseband signal 1404 by executing predetermined radio processing such as down-conversion and analog-digital conversion on received signal 1402, and outputs this received quadrature baseband signal 1404. A despreading section 1405 has received quadrature baseband signal 1404 as input, forms a despread received quadrature baseband signal 1406 by executing despreading processing using the same spreading code as that used by spreading section 104 and spreading section 114 in FIG. 1 on received quadrature baseband signal 1404, and outputs this despread received quadrature baseband signal 1406.

A spread signal A channel fluctuation estimation section 1407 has despread received quadrature baseband signal 1406 as input, estimates channel fluctuation of spread signal A (the spread signal transmitted from antenna 110) based on the channel estimation symbols, and outputs a channel fluctuation estimation signal 1408. By this means, channel fluctuation between antenna 110 and antenna 1401 is estimated. A spread signal B channel fluctuation estimation section 1409 has despread received quadrature baseband signal 1406 as input, estimates channel fluctuation of spread signal B (the spread signal transmitted from antenna 120) based on the channel estimation symbols, and outputs a channel fluctuation estimation signal 1410. By this means, channel fluctuation between antenna 120 and antenna 1401 is estimated.

An antenna selection section 1411 has channel A channel fluctuation estimation signals 408, 418, and 1408, channel B channel fluctuation estimation signals 410, 420, and 1410, and despread received quadrature baseband signals 406, 416, and 1406 as input, and selects from among these the optimal antenna received signal combination for demodulation. The selection method will be described later herein. Antenna selection section 1411 outputs selected spread signal A channel fluctuation estimation signals 1412 and 1415, selected spread signal B channel fluctuation estimation signals 1413 and 1416, and selected despread received quadrature baseband signals 1414 and 1417.

Figure 15:
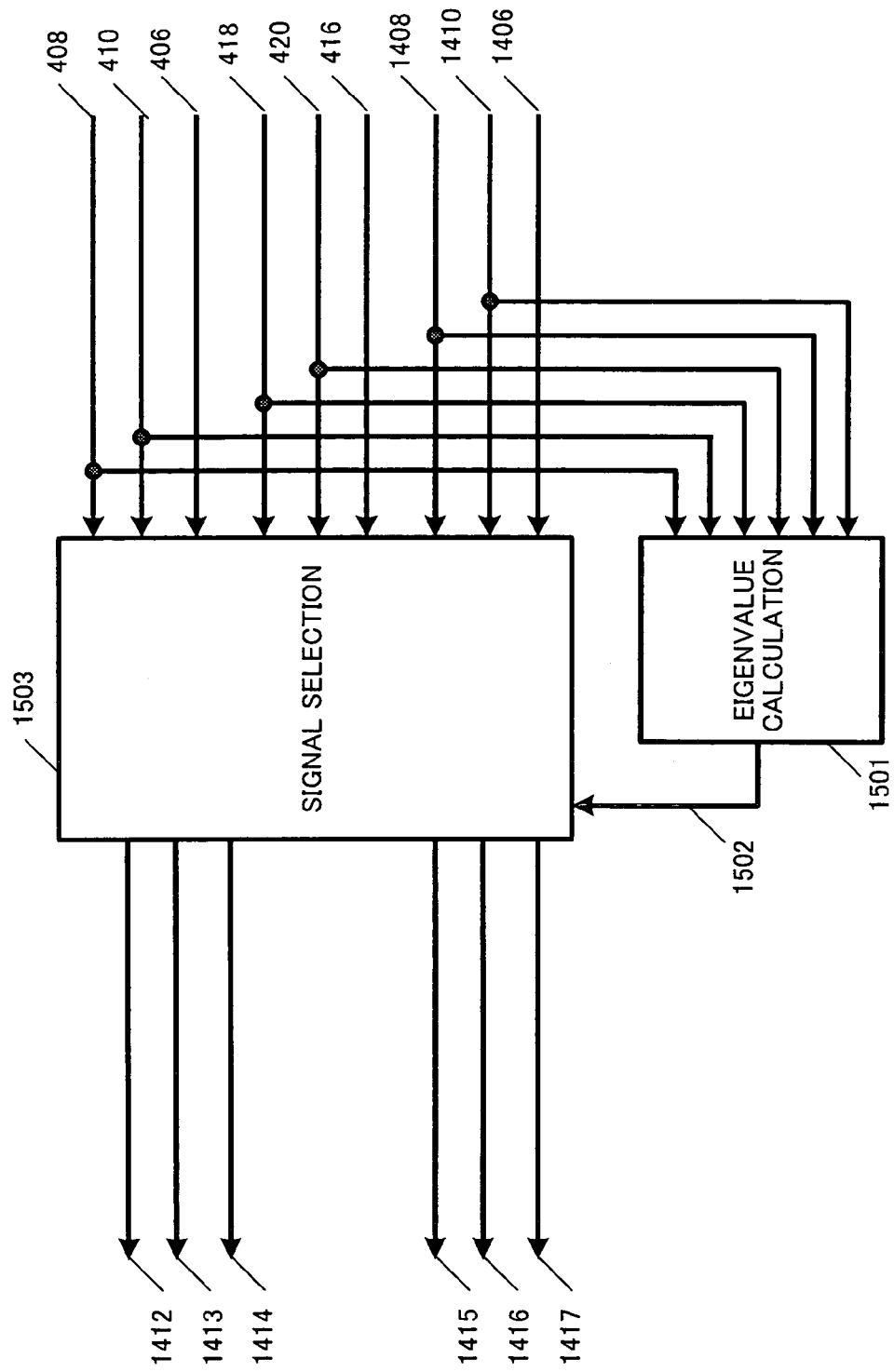
FIG. 15 is a block diagram showing a configuration of the antenna selection section in FIG. 14.

FIG. 15 shows a sample configuration of antenna selection section 1411. Antenna selection section 1411 has an eigenvalue calculation section 1501 and a signal selection section 1503. Eigenvalue calculation section 1501 has channel A channel fluctuation estimation signals 408, 418, and 1408, and channel B channel fluctuation estimation signals 410, 420, and 1410, as input. That is to say, since three antennas are provided in this embodiment, three sets of channel fluctuation values are input. Then combinations of two sets of the three sets of channel fluctuation values are created (in this embodiment, three combinations), a channel fluctuation matrix is created for each of those combinations, and eigenvalues of each channel fluctuation matrix are calculated. Two sets of signals for inverse matrix calculation are then selected based on the eigenvalue calculation results, and a control signal 1502 indicating which two sets have been selected is output.

Signal selection section 1503 has channel A channel fluctuation estimation signals 408, 418, and 1408, channel B channel fluctuation estimation signals 410, 420, and 1410, despread received quadrature baseband signals 406, 416, and 1406, and control signal 1502 as input, and outputs selected spread signal A channel fluctuation estimation signals 1412 and 1415, selected spread signal B channel fluctuation estimation signals 1413 and 1416, and selected despread received quadrature baseband signals 1414 and 1417.

The operation of a transmitting apparatus and receiving apparatus according to this embodiment will now be described in detail.

The operation of a base station (transmitting apparatus) is the same as that described in Embodiment 1, transmitting transmit signals in accordance with the frame configurations shown in FIG. 3.

A communication terminal (receiving apparatus) receives transmit signals at three antennas provided on reception unit 1400 in FIG. 14. A special feature here is that the number of antennas is made larger than the number of channels transmitted by the transmitting apparatus, and antenna selection is performed. That is to say, antenna selection section 1411 selects two signal groups from signal groups 406, 408, and 410 obtained by antenna 401, signal groups 416, 418, and 420 obtained by antenna 411, and signal groups 1406, 1408, and 1410 obtained by antenna 1401, and performs separation and demodulation using only the selected signal groups.

The signal group selection method at this time will now be described. First, eigenvalue calculation section 1501 shown in FIG. 15 creates a channel fluctuation matrix as shown in Equation (3) using channel fluctuation estimation signals 408, 410, 418, and 420 in the relationship in FIG. 7, and finds value P1 with the smallest power among those eigenvalues. Eigenvalue calculation section 1501 also creates a channel fluctuation matrix as shown in Equation (3) using channel fluctuation estimation signals 408, 410, 1408, and 1410 in the relationship in FIG. 7, and finds value P2 with the smallest power among those eigenvalues. Eigenvalue calculation section 1501 further creates a channel fluctuation matrix as shown in Equation (3) using channel fluctuation estimation signals 418, 420, 1408, and 1410 in the relationship in FIG. 7, and finds value P3 with the smallest power among those eigenvalues.

Eigenvalue calculation section 1501 then searches for the largest value among P1, P2, and P3. If P1 is the largest, eigenvalue calculation section 1501 outputs a control signal 1502 indicating that signals 408, 410, 406, 418, 420, and 416 are to be selected. That is to say, eigenvalue calculation section 1501 instructs signal selection section 1503 to select the signal groups obtained from antennas 401 and 411 in FIG. 14.

At this time, signal selection section 1503 outputs signal 408 as signal 1412, signal 410 as signal 1413, signal 406 as signal 1414, signal 418 as signal 1415, signal 420 as signal 1416, and signal 416 as signal 1417. Similarly, if P2 is the largest the signal groups obtained from antennas 401 and 1401 are selected, and if P3 is the largest the signal groups obtained from antennas 411 and 1401 are selected.

Signal processing section 421 in FIG. 14 sets up Equation (3) in the relationship in FIG. 7 using input signals 1412, 1413, 1414, 1415, 1416, and 1417, and by performing the inverse matrix operation of that equation, separates the signals of each channel and outputs separated channel signals 422 and 423.

By switching receiving antennas based on the channel fluctuation matrix eigenvalue for which power is smallest in this way, it is possible to select the antenna with the best reception quality. By this means, the error rate characteristics of demodulated data can be improved.

Eigenvalue minimum power corresponds to the effective reception power of a modulated signal contained in an antenna received signal used to obtain that eigenvalue, and therefore selecting an antenna received signal for which eigenvalue minimum power is greatest is equivalent to selecting an antenna received signal combination for which modulated signal effective reception power is greatest. It is therefore possible to demodulate each modulated signal using a combination of antenna received signals for which modulated signal effective reception power is greatest, enabling modulated signal demodulation precision to be greatly improved compared with the case where each modulated signal is demodulated using all antenna received signals.

Thus, according to this embodiment, by creating a plurality of antenna received signal combinations, creating a channel fluctuation matrix for each combination, calculating channel fluctuation matrix eigenvalues for each combination, selecting antenna received signals of the combination for which the eigenvalue minimum power is greatest, and performing demodulation processing, it is possible to implement a receiving apparatus that enables the error rate characteristics of a received plurality of channel signals to be improved.

In this embodiment a case has been described in which modulated signals of two channels transmitted from two antennas are received by three antennas, but the number of transmitting antennas and number of receiving antennas are not limited to these numbers. The present invention can be widely applied to cases where a plurality of transmitting antennas are provided, a greater number of receiving antennas are provided, and receiving antennas equal to the number of channels are selected from the plurality of receiving antenna signals.

Also, in the above-described embodiment, a spread spectrum communication system has been described by way of example, but this is not a limitation, and the present invention can be similarly implemented in a single-carrier system that does not have a spreading section, or an OFDM system, for example. A case in which the present invention is applied to an OFDM system is described in detail in Embodiment 4.

Embodiment 4

In this embodiment, a case is described in which the processing described in Embodiment 3 is applied to OFDM communications. A special feature of this embodiment is that the following processing is performed for each subcarrier: a plurality of antenna received signal combinations are created, a channel fluctuation matrix is created for each combination, channel fluctuation matrix eigenvalues are calculated for each combination, and antenna received signals of the combination for which the eigenvalue minimum power is greatest are selected, and undergo demodulation processing.

Figure 16:
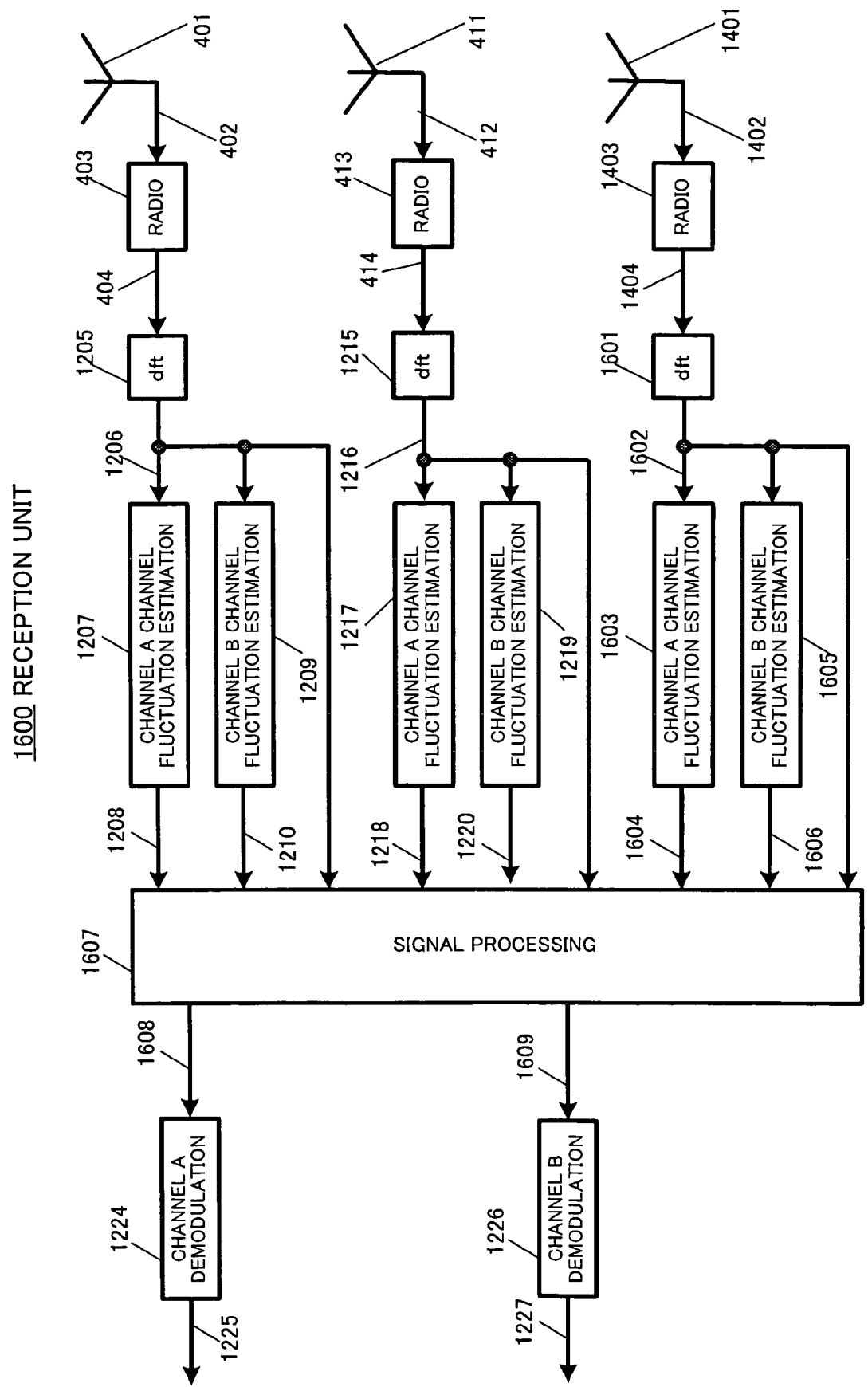
FIG. 16 is a block diagram showing a configuration of a reception unit of a receiving apparatus of Embodiment 4.

FIG. 16 shows a sample configuration of the reception unit of a receiving apparatus according to this embodiment. Reception unit 1600 of this embodiment has many parts combining Embodiment 2 and Embodiment 3, and therefore parts corresponding to parts in FIG. 12 described in Embodiment 2 are assigned the same codes as in FIG. 12, parts corresponding to parts in FIG. 14 described in Embodiment 3 are assigned the same codes as in FIG. 14, and descriptions of these parts are omitted.

Reception unit 1600 is provided in a communication terminal, for example. Here, it is assumed that the transmission unit of a base station that performs communication with a communication terminal equipped with reception unit 1600 is configured as shown in FIG. 10, for example, and signals transmitted from the base station are configured as shown in FIG. 11.

Reception unit 1600 has three antennas 401, 411, and 1401, and two OFDM signals transmitted from transmission unit 1000 are received by each of antennas 401, 411, and 1401. A special feature of reception unit 1600 here is that the number of antennas (in this embodiment three) is greater than the number of channels of signals transmitted by transmission unit 1000 (in this embodiment, two).

Received signals 402, 412, and 1402 of antennas 401, 411, and 1401 become received quadrature baseband signals 404, 414, and 1404 by undergoing predetermined radio processing such as down-conversion and analog-digital conversion by radio sections 403, 413, and 1403, respectively. Received quadrature baseband signals 404, 414, and 1404 become post-Fourier-transform signals 1206, 1216, and 1602 by undergoing Fourier transform processing by Fourier transform sections (dft's) 1205, 1215, and 1601, respectively.

Post-Fourier-transform signals 1206, 1216, and 1602 obtained for each antenna are sent to channel A channel fluctuation estimation sections 1207, 1217, and 1603, and channel B channel fluctuation estimation sections 1209, 1219, and 1605, provided for each antenna. Channel A channel fluctuation estimation sections 1207, 1217, and 1603 obtain per-carrier channel fluctuation estimation signal groups 1208, 1218, and 1604 for channel A, and send these to a signal processing section 1607.

Signal processing section 1607 performs processing combining antenna selection section 1411 and signal processing section 421 in FIG. 14. That is to say, signal processing section 1607 performs antenna signal selection based on eigenvalue power, and also performs channel signal separation processing using the selected antenna signals. However, signal processing section 1607 of this embodiment differs from reception unit 1400 in FIG. 14 in that the above antenna signal selection processing and channel signal separation processing are performed on a carrier-by-carrier basis. Signal processing section 1607 has channel A channel fluctuation estimation signal groups 1208, 1218, and 1604, channel B channel fluctuation estimation signal groups 1210, 1220, and 1606, and post-Fourier-transform signals 1206, 1216, and 1602 as input, and outputs a channel A received quadrature baseband signal 1608 and channel B received quadrature baseband signal 1609 on which selection processing and separation processing have been executed on a carrier-by-carrier basis.

Figure 17:
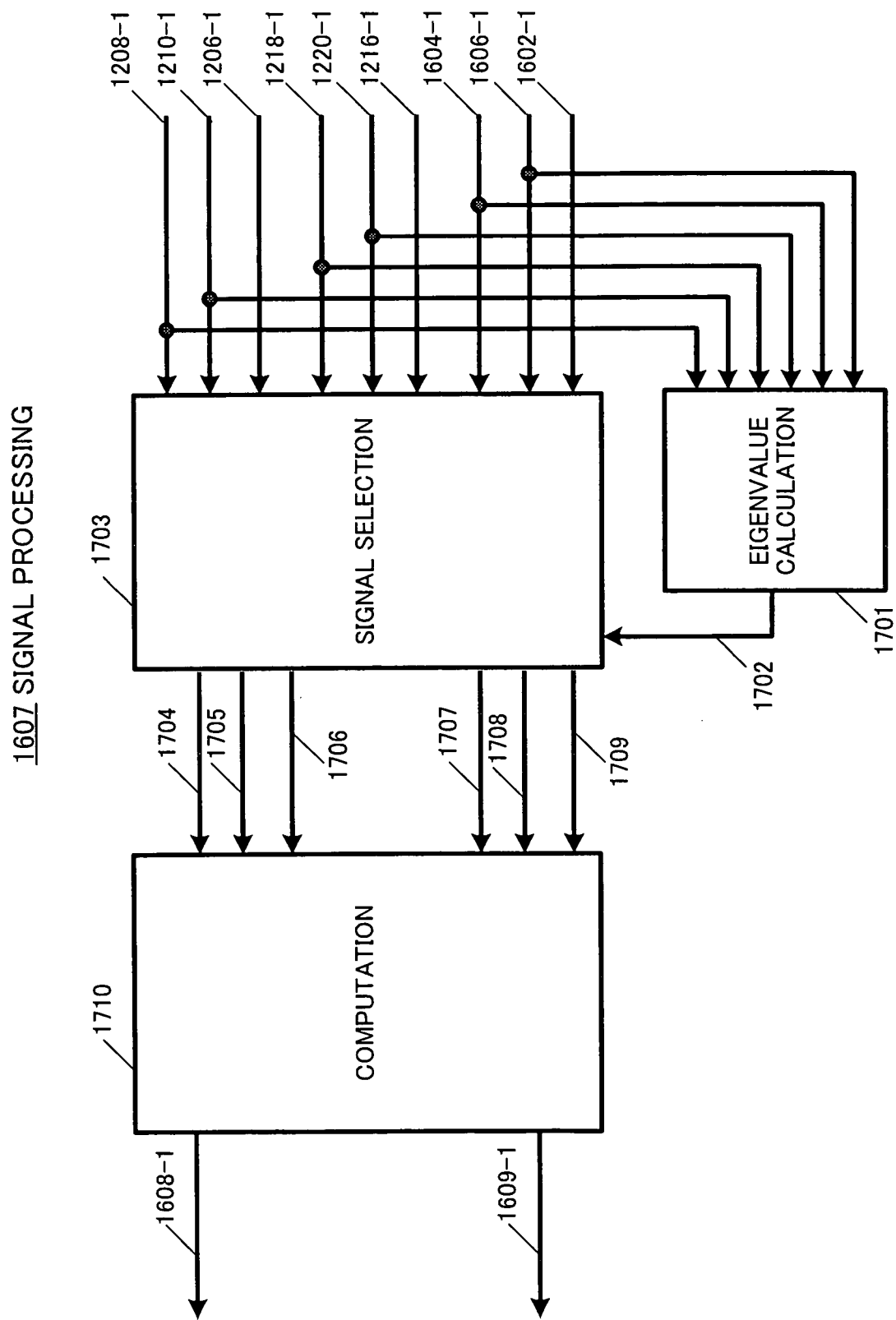
FIG. 17 is a block diagram showing a configuration of the signal processing section in FIG. 16.

FIG. 17 shows the detailed configuration of signal processing section 1607. The signal processing section configuration shown in FIG. 17 is the configuration for performing processing for one carrier, and signal processing section 1607 in FIG. 16 is actually provided with a circuit as shown in FIG. 17 for each carrier.

Eigenvalue calculation section 1701 has the same function as eigenvalue calculation section 1501 in FIG. 15 described in Embodiment 3. That is to say, eigenvalue calculation section 1701 creates a channel fluctuation matrix as shown in Equation (3) using channel fluctuation estimation signals 1208-1, 1210-1, 1218-1, and 1220-1 for carrier 1 in FIG. 11 from among channel fluctuation estimation signal groups 1208, 1210, 1218, and 1220, and finds value P1 with the smallest power among those eigenvalues. Eigenvalue calculation section 1701 also creates a channel fluctuation matrix as shown in Equation (3) using channel fluctuation estimation signals 1208-1, 1210-1, 1604-1, and 1606-1 for carrier 1 from among channel fluctuation estimation signal groups 1208, 1210, 1604, and 1606, and finds value P2 with the smallest power among those eigenvalues. Eigenvalue calculation section 1701 further creates a channel fluctuation matrix as shown in Equation (3) using channel fluctuation estimation signals 1218-1, 1220-1, 1604-1, and 1606-1 for carrier 1 from among channel fluctuation estimation signal groups 1218, 1220, 1604, and 1606, and finds value P3 with the smallest power among those eigenvalues.

Eigenvalue calculation section 1701 then searches for the largest value among P1, P2, and P3. If P1 is the largest, eigenvalue calculation section 1701 outputs a control signal 1702 indicating that signals 1208-1, 1210-1, 1206-1, 1218-1, 1220-1, and 1216-1 are to be selected. That is to say, eigenvalue calculation section 1701 instructs signal selection section 1703 to select the signal groups obtained from antennas 401 and 411 in FIG. 16.

At this time, signal selection section 1703 outputs signal 1208-1 as signal 1704, signal 1210-1 as signal 1705, signal 1206-1 as signal 1706, signal 1218-1 as signal 1707, signal 1220-1 as signal 1708, and signal 1216-1 as signal 1709. Similarly, if P2 is the largest the signal groups obtained from antennas 401 and 1401 are selected, and if P3 is the largest the signal groups obtained from antennas 411 and 1401 are selected.

A computation section 1710 sets up Equation (3) in the relationship in FIG. 7 using input signals 1704 through 1709, and by performing the inverse matrix operation of that equation, separates the signals of each channel and outputs separated channel A carrier 1 quadrature baseband signal 1608-1 and channel B carrier 1 quadrature baseband signal 1609-1.

The operation of a transmitting apparatus and receiving apparatus according to this embodiment will now be described in detail.

The operation of a base station (transmitting apparatus) is the same as that described in Embodiment 2, transmitting transmit signals in accordance with the frame configurations shown in FIG. 11.

A communication terminal (receiving apparatus) receives two channels of OFDM signals at three antennas provided on reception unit 1600 in FIG. 16. Reception unit 1600 then estimates channel fluctuation on a channel-by-channel basis and on a carrier-by-carrier basis for reception at each antenna.

Reception unit 1600 then performs the following processing for each carrier: creation of a plurality of antenna received signal combinations, creation of a channel fluctuation matrix for each combination, channel fluctuation matrix eigenvalue calculation for each combination, and selection of antenna received signals of the combination for which the eigenvalue minimum power is greatest. In this embodiment, as the number of received OFDM signal channels is two and the number of receiving antennas is three, three combinations are created, and one combination is selected from among these three combinations.

Next, reception unit 1600 separates the signals of each channel multiplexed on the propagation path by performing an inverse matrix operation using the selected combination of antenna received signals (channel fluctuation estimation and quadrature baseband signals) Then, lastly, receive data is obtained by demodulating the separated channel signals.

As reception unit 1600 selects an antenna received signal for which channel fluctuation matrix eigenvalue minimum power is greatest, separates modulated signals (that is, signals transmitted from different antennas) multiplexed on the propagation path using the selected antenna received signal, and performs demodulation processing in this way on a carrier-by-carrier basis, it is possible to perform signal separation and demodulation processing using the antenna received signal with the greatest effective reception power.

With OFDM signals in particular, effective reception power differs greatly from carrier to carrier due to the effects of frequency selective fading, etc. In this embodiment this is taken into consideration, and the optimal antenna received signal combination is selected on a carrier-by-carrier basis by performing antenna selection based on eigenvalues for each carrier. By this means, error rate characteristics can be improved across all carriers.

Thus, according to this embodiment, by performing, on a carrier-by-carrier basis, creation of a plurality of antenna received signal combinations, creation of a channel fluctuation matrix for each combination, channel fluctuation matrix eigenvalue calculation for each combination, selection of antenna received signals of the combination for which the eigenvalue minimum power is greatest, and demodulation processing, it is possible to implement a receiving apparatus that enables the error rate characteristics of received OFDM signals of a plurality of channels to be improved across all carriers.

In this embodiment a case has been described in which OFDM signals of two channels transmitted from two antennas are received by three antennas, but the number of transmitting antennas and number of receiving antennas are not limited to these numbers. The present invention can be widely applied to cases where a plurality of transmitting antennas are provided, a greater number of receiving antennas are provided, and receiving antennas equal to the number of channels are selected from the plurality of receiving antenna signals.

Also, in this embodiment, an OFDM system has been described by way of example, but the present invention can be similarly implemented in a system combining an spread spectrum system as described in Embodiment 3 and an OFDM system, and can also be similarly implemented in a multicarrier system other than OFDM.

Embodiment 5

In this embodiment, a receiving apparatus is described that receives at a plurality of antennas a plurality of modulated signals transmitted from a plurality of antennas, and performs weighting and combining of received signals received at each receiving antenna based on channel fluctuation matrix eigenvalues.

To be specific, firstly, a plurality of antenna received signal combinations are created, a channel fluctuation matrix is created for each combination, and channel fluctuation matrix eigenvalues are calculated for each combination. Then, modulated signals are separated using the antenna received signals of each combination and the channel fluctuation matrix corresponding to that combination, and modulated signals separated in each combination are weighted and combined using the channel fluctuation estimation matrix eigenvalues used at the time of separation.

Figure 18:
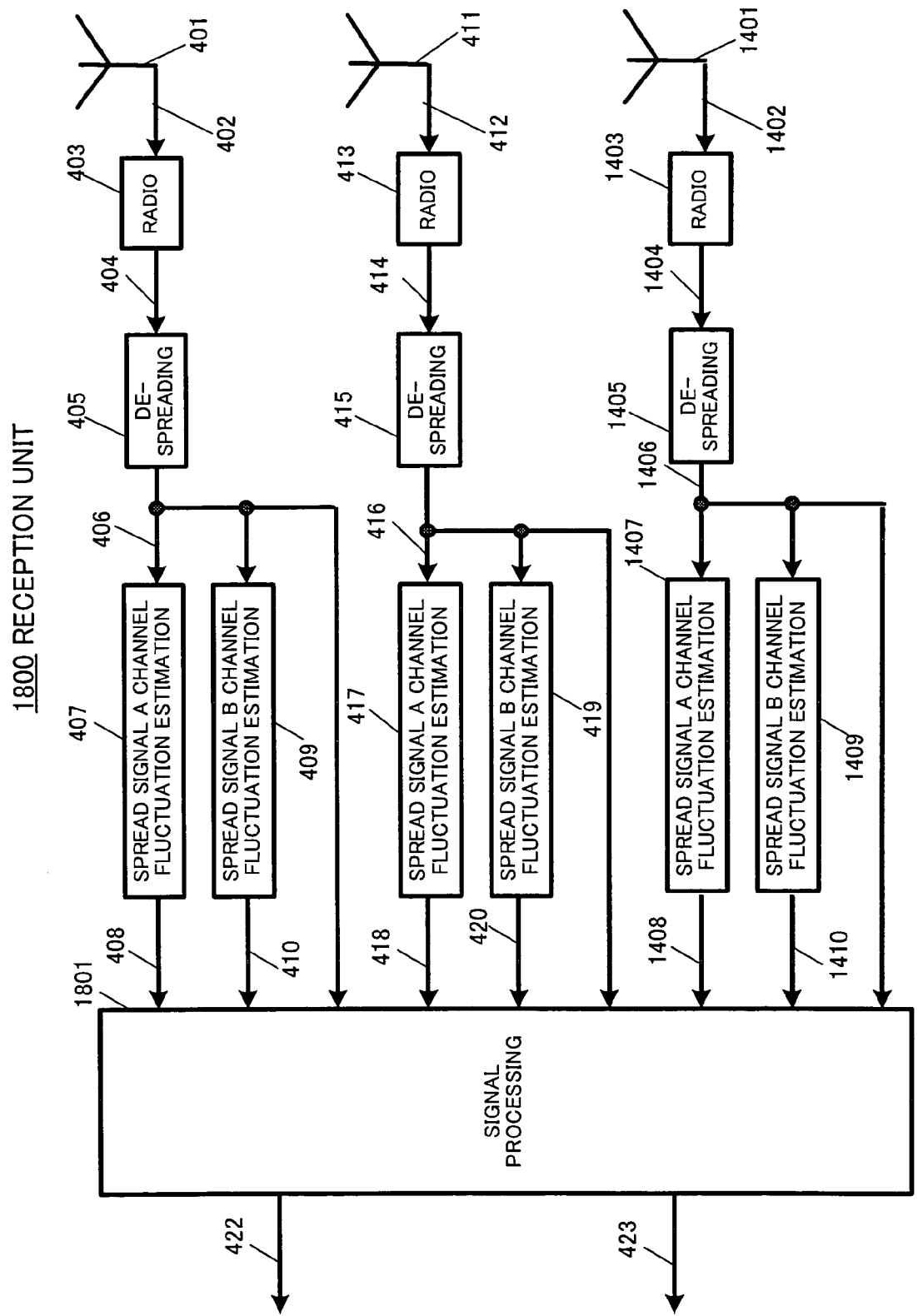
FIG. 18 is a block diagram showing a configuration of a reception unit of a receiving apparatus of Embodiment 5.

FIG. 18 shows a sample configuration of the reception unit of a receiving apparatus according to this embodiment. Parts in FIG. 18 corresponding to parts in FIG. 14 are assigned the same codes as in FIG. 14, and descriptions of these parts are omitted. Reception unit 1800 is provided in a communication terminal, for example. Here, it is assumed that the transmission unit of a base station that performs communication with a communication terminal equipped with reception unit 1800 is configured as shown in FIG. 1, for example, and signals transmitted from the base station are configured as shown in FIG. 3.

The difference between reception unit 1400 in FIG. 14 described in Embodiment 3 and reception unit 1800 of this embodiment is that, whereas reception unit 1400 selects an antenna signal using separation and demodulation based on channel fluctuation matrix eigenvalues, reception unit 1800 of this embodiment weights and combines antenna received signals based on channel fluctuation matrix eigenvalues. Therefore, reception unit 1800 has a signal processing section 1801 instead of antenna selection section 1411 and signal processing section 421 of reception unit 1400, and performs weighting and combining processing on antenna received signals based on channel fluctuation matrix eigenvalues by means of signal processing section 1801.

That is to say, signal processing section 1801 has three sets of antenna signals—spread signal A channel fluctuation estimation signals 408, 418, and 1408, spread signal B channel fluctuation estimation signals 410, 420, and 1410, and despread received quadrature baseband signals 406,416, and 1406—as input, creates combinations each of two sets of signals in the same way as in Embodiment 3, creates a channel fluctuation matrix for each combination, and calculates the eigenvalue thereof for each combination. Signal processing section 1801 also separates channel A and channel B signals for each combination by performing channel fluctuation matrix inverse matrix computations for each combination. The channel signals separated on a combination-by-combination basis then undergo weighting and combining using the eigenvalues corresponding to each combination. Signal processing section 1801 then outputs weighted and combined channel signals 422 and 423.

Figure 19:
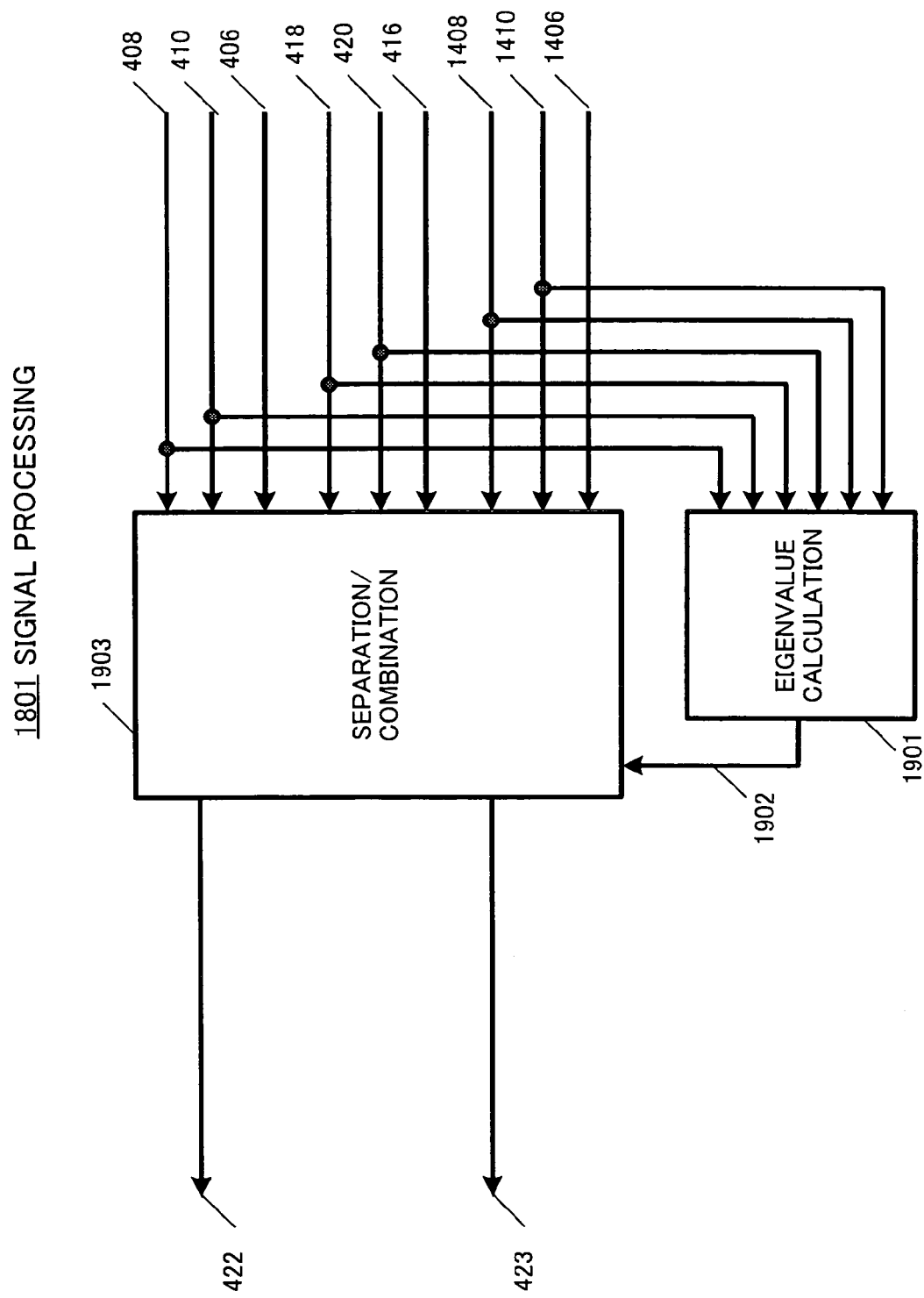
FIG. 19 is a block diagram showing a configuration of the signal processing section in FIG. 18.

FIG. 19 shows a sample configuration of signal processing section 1801. Signal processing section 1801 has an eigenvalue calculation section 1901 and a separation/combination section 1903. Eigenvalue calculation section 1901 has spread signal A channel fluctuation estimation signals 408, 418, and 1408, and spread signal B channel fluctuation estimation signals 410, 420, and 1410, as input. That is to say, since three antennas are provided in this embodiment, three sets of channel fluctuation values are input. Then combinations of two sets of the three sets of channel fluctuation values are created (in this embodiment, three combinations), a channel fluctuation matrix is created for each of those combinations, and eigenvalues of each channel fluctuation matrix are calculated. Eigenvalues for each combination are then output as an eigenvalue estimation signal 1902.

Separation/combination section 1903 has spread signal A channel fluctuation estimation signals 408, 418, and 1408, spread signal B channel fluctuation estimation signals 410, 420, and 1410, despread received quadrature baseband signals 406, 416, and 1406, and eigenvalue estimation signal 1902 as input, performs channel signal separation processing on a combination-by-combination basis, and also performs weighting and combining processing on the antenna received signals using eigenvalue estimation signal 1902.

By this means, separation/combination section 1903 obtains spread signal A received quadrature baseband signal 422 and spread signal B received quadrature baseband signal 423, which it outputs.

The operation of a transmitting apparatus and receiving apparatus according to this embodiment will now be described in detail.

The operation of a base station (transmitting apparatus) is the same as that described in Embodiment 1, transmitting transmit signals in accordance with the frame configurations shown in FIG. 3.

A communication terminal (receiving apparatus) receives transmit signals at three antennas provided on reception unit 1800 in FIG. 18. Reception unit 1800 then estimates channel fluctuation on a channel-by-channel basis for reception at each antenna by means of channel fluctuation estimation sections 407, 409, 417, 419, 1407, and 1409.

Next, reception unit 1800 creates a plurality of antenna received signal combinations, forms a channel fluctuation matrix for each combination, and calculates channel fluctuation matrix eigenvalues for each combination. Reception unit 1800 performs this per-combination eigenvalue calculation processing by means of eigenvalue calculation section 1901.

Specifically, eigenvalue calculation section 1901 creates a channel fluctuation matrix as shown in Equation (3) using channel fluctuation estimation signals 408, 410, 418, and 420 in the relationship in FIG. 7, and finds value P1 with the smallest power among those eigenvalues. Eigenvalue calculation section 1901 also creates a channel fluctuation matrix as shown in Equation (3) using channel fluctuation estimation signals 408, 410, 1408, and 1410 in the relationship in FIG. 7, and finds value P2 with the smallest power among those eigenvalues. Eigenvalue calculation section 1901 further creates a channel fluctuation matrix as shown in Equation (3) using channel fluctuation estimation signals 418, 420, 1408, and 1410 in the relationship in FIG. 7, and finds value P3 with the smallest power among those eigenvalues. Then eigenvalue calculation section 1901 sends obtained values P1, P2, and P3 to separation/combination section 1903 as an eigenvalue estimation signal 1902.

Separation/combination section 1903 first performs channel signal separation processing for each antenna received signal combination. In this embodiment, separation processing is performed for three sets of antenna received signals. That is to say, for the first set, separation/combination section 1903 sets up Equation (3) in the relationship in FIG. 7 using input signals 408, 410, 406, 418, 420, and 416, and performs the inverse matrix operation of that equation. The spread signal A received quadrature baseband signal and spread signal B received quadrature baseband signal thus obtained are designated Ra1 and Rb1 respectively. For the second set, separation/combination section 1903 sets up Equation (3) in the relationship in FIG. 7 using input signals 408, 410, 406, 1408, 1410, and 1406, and performs the inverse matrix operation of that equation. The spread signal A received quadrature baseband signal and spread signal B received quadrature baseband signal thus obtained are designated Ra2 and Rb2 respectively. For the third set, separation/combination section 1903 sets up Equation (3) in the relationship in FIG. 7 using input signals 418, 420, 416, 1408, 1410, and 1406, and performs the inverse matrix operation of that equation. The spread signal A received quadrature baseband signal and spread signal B received quadrature baseband signal thus obtained are designated Ra3 and Rb3 respectively.

Separation/combination section 1903 performs the weighting and combining operations of the following equations using the thus obtained sets of received quadrature baseband signals Ra1, Rb1, Ra2, Rb2, Ra3, and Rb3, and eigenvalues P1, P2, and P3 corresponding to each set, thereby obtaining weighted and combined spread signal A received quadrature baseband signal Ra (422) and spread signal B received quadrature baseband signal Rb (423).

[Equations 4]

$$Ra = \frac{1}{3(P1+P2+P3)}(P1 \times Ra1 + P2 \times Ra2 + P3 \times Ra3) \quad (4)$$

$$Rb = \frac{1}{3(P1+P2+P3)}(P1 \times Rb1 + P2 \times Rb2 + P3 \times Rb3)$$

By thus performing weighting to find the received quadrature baseband signal of each channel, more precise spread signal A and B received quadrature baseband signals 422 and 423 are obtained. This is because eigenvalue power is a value corresponding to effective reception power. Thus, in reception processing of this embodiment, effective use is made of reception levels using channel fluctuation matrix eigenvalue power—that is to say, effective reception levels are found and signal combination is performed based on these effective reception levels.

Spread signal A and B received quadrature baseband signals 422 and 423 output from separation/combination section 1903 each undergo orthogonal demodulation processing by a demodulation section (not shown) to become receive data. As a result, it is possible to obtain receive data of each channel with good error rate characteristics.

Thus, according to this embodiment, in a receiving apparatus that receives at a plurality of antennas a plurality of modulated signals transmitted from a plurality of antennas, by weighting and combining received signals obtained at each receiving antenna based on channel fluctuation matrix eigenvalues it is possible to weight more heavily an antenna received signal with greater effective reception power, enabling the error rate characteristics of a received plurality of channel signals to be improved.

In this embodiment a case has been described in which modulated signals of two channels transmitted from two antennas are received by three antennas, but the number of transmitting antennas and number of receiving antennas are not limited to these numbers. The present invention can be widely applied to cases where a plurality of transmitting antennas are provided, a greater number of receiving antennas are provided, and receiving antennas equal to the number of channels are selected from the plurality of receiving antenna signals.

Also, in this embodiment a method has been described whereby channel fluctuation matrix eigenvalue power is taken as a weighting coefficient, and received quadrature baseband signal weighting and combining is performed based on this coefficient, but the present invention is not limited to this.

The method according to the present embodiment can be applied to cases where received signals are applied error correction codes such as convolutional code, turbo code, and low density parity code. The decoding in this case is executed by finding a branch metric and a path metric sequentially based on weighted results.

For example, channel fluctuation matrix eigenvalue power described in this embodiment may also be used as a weighting coefficient for MLD (Maximum Likelihood Detection) shown in "A simple transmit diversity technique for wireless communications" IEEE Journal on Select Areas in Communications, vol. 16, no. 8, October 1998. Use of channel fluctuation matrix eigenvalue power as a weighting coefficient in demodulation and decoding when performing MLD improves reception quality. A weighting method using an eigenvalue for MLD is described in detail in Embodiment 7 onward.

Embodiment 6

In this embodiment, a case is described in which the processing described in Embodiment 5 is applied to OFDM communications. A special feature of this embodiment is that the processing described in Embodiment 5 whereby received signals obtained at each receiving antenna are weighted and combined based on channel fluctuation matrix eigenvalues is performed for each carrier.

FIG. 18 and FIG. 19 used in Embodiment 5 will also be used in describing this embodiment. The reception unit of this embodiment has a configuration in which despreading sections 405, 415, and 1405 in FIG. 18 are replaced by Fourier transform sections (dft's), channel fluctuation estimation sections 407, 409, 417, 419, 1407, and 1409 in FIG. 18 are configured so as to estimate signal channel fluctuation on a carrier-by-carrier basis, and signal processing section 1801 in FIG. 18 is configured so as to weight and combine antenna received signals of each carrier using per-carrier channel fluctuation matrix eigenvalues as weight coefficients.

Actually, the kind of configuration shown in FIG. 19 is provided for each carrier as a signal processing section, and the channel fluctuation matrix eigenvalue based weighting and combining described in Embodiment 5 is performed for each carrier. As a result, the signal error rate characteristics can be improved for all carriers.

As also described in Embodiment 4, with OFDM signals, effective reception power differs greatly from carrier to carrier due to the effects of frequency selective fading, etc. In this embodiment this is taken into consideration, and the weight coefficient used in combining is changed on a carrier-by-carrier basis by performing signal combining with eigenvalue power as a weight coefficient on a carrier-by-carrier basis. By this means, error rate characteristics can be improved across all carriers.

Thus, according to this embodiment, when OFDM signals transmitted from a plurality of antennas are received at a plurality of antennas and demodulated, by performing processing whereby received signals obtained at each receiving antenna are weighted and combined based on channel fluctuation matrix eigenvalues, as described in Embodiment 5, for each carrier, it is possible to implement a receiving apparatus that enables the error rate characteristics of received OFDM signals of a plurality of channels to be improved across all carriers.

In this embodiment a method has been described whereby received quadrature baseband signal weighting and combining is performed on a carrier-by-carrier basis using channel fluctuation matrix eigenvalue power as a weighting coefficient, but the present invention is not limited to this.

For example, channel fluctuation matrix eigenvalue power described in this embodiment may also be used as a weighting coefficient for MLD (Maximum Likelihood Detection) shown in "A simple transmit diversity technique for wireless communications" IEEE Journal on Select Areas in Communications, vol. 16, no. 8, October 1998. Use of per-carrier channel fluctuation matrix eigenvalue power as a per-carrier weighting coefficient in demodulation and decoding improves reception quality. MLD is described in detail in Embodiment 9 and Embodiment 10.

Embodiment 7

In this embodiment, a receiving apparatus is described that receives at a plurality of antennas a plurality of modulated signals transmitted from a plurality of antennas, and performs weighting processing on received signals and demodulates received signals using channel fluctuation matrix eigenvalues and the received field strength of each antenna received signal.

Specifically, a soft decision value of each modulated signal after separation is weighted using a channel fluctuation matrix eigenvalue. By this means, a soft decision value can be given an appropriate likelihood according to the effective reception power of the modulated signal. As a result, the error rate characteristics of a received digital signal obtained by a decoding section is improved.

Figure 20:
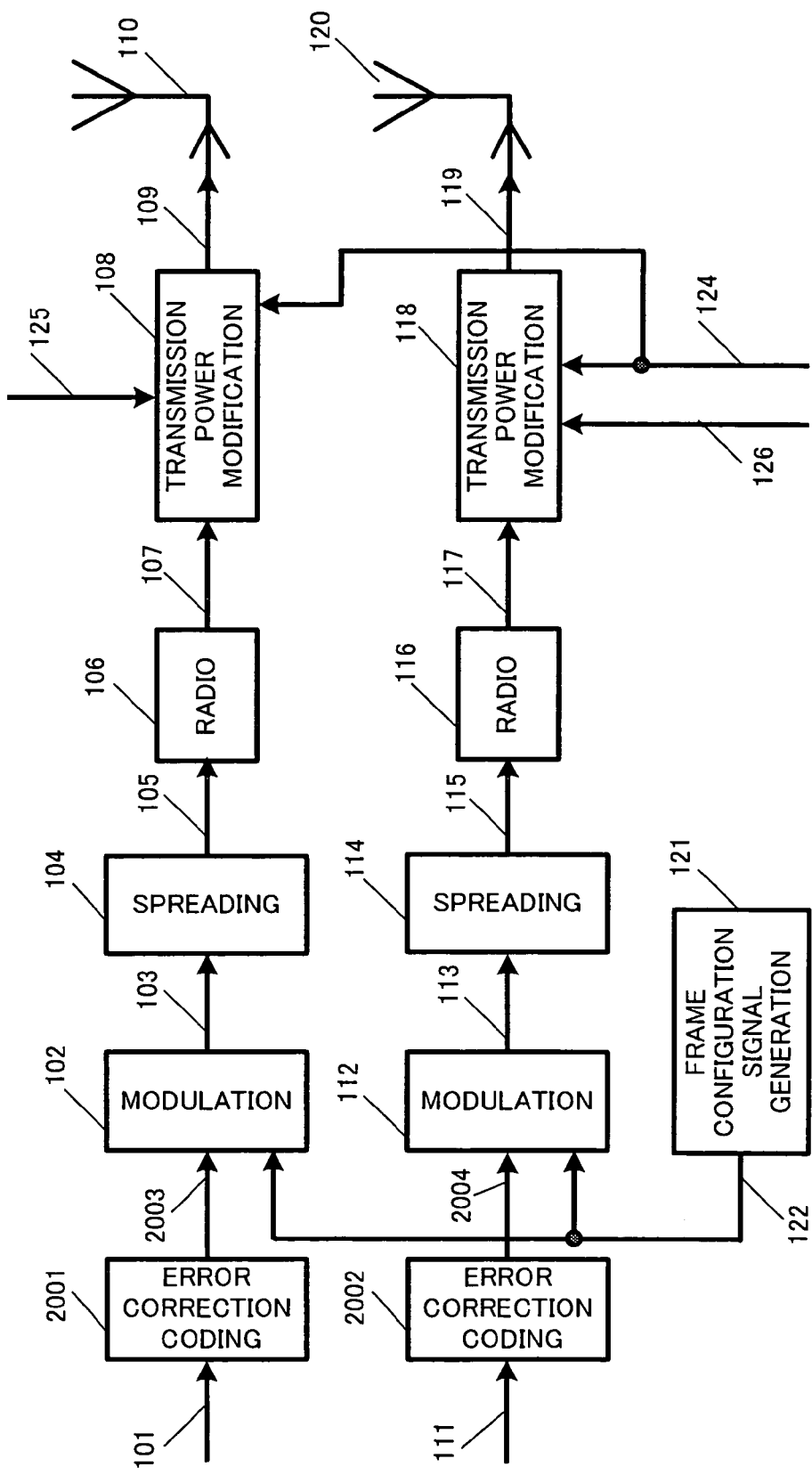
FIG. 20 is a block diagram showing a configuration of a transmission unit of a transmitting apparatus of Embodiment 7.

First, the configuration of a transmitting apparatus will be described. FIG. 20 shows an example of the configuration of the transmission unit of a transmitting apparatus according to this embodiment. The difference between transmission unit 2000 of this embodiment and transmission unit 100 in FIG. 1 is that transmission unit 2000 has error correction coding sections 2001 and 2002. The rest of the configuration is the same as that of transmission unit 100 in FIG. 1, and therefore a description thereof is omitted here.

Error correction coding sections 2001 and 2002 have transmit digital signals 101 and 111 as input respectively, obtain error correction coded signals 2003 and 2004 by executing error correction coding processing on transmit digital signals 101 and 111 using convolutional code, and output these signals 2003 and 2004.

Figure 22:
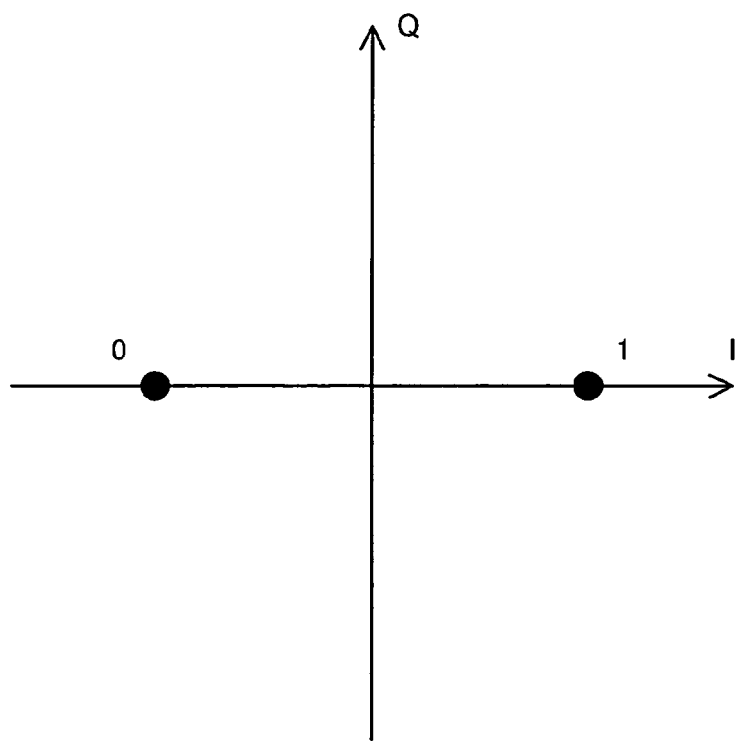
FIG. 22 is a drawing showing the signal point arrangement in the IQ plane of a BPSK modulated signal.

Modulation sections 102 and 112 have error correction coded signals 2003 and 2004 as input respectively, and executed modulation processing on error correction coded signals 2003 and 2004. In this embodiment, a case is described in which modulation sections 102 and 112 execute BPSK modulation as shown in FIG. 22, but other modulation processing such as QPSK or 16QAM may also be executed.

Transmission unit 2000 is provided in a base station, for example, which has a reception unit 200 as shown in FIG. 2. Transmission unit 2000 transmits signals with the frame configurations shown in FIG. 3.

Figure 21:
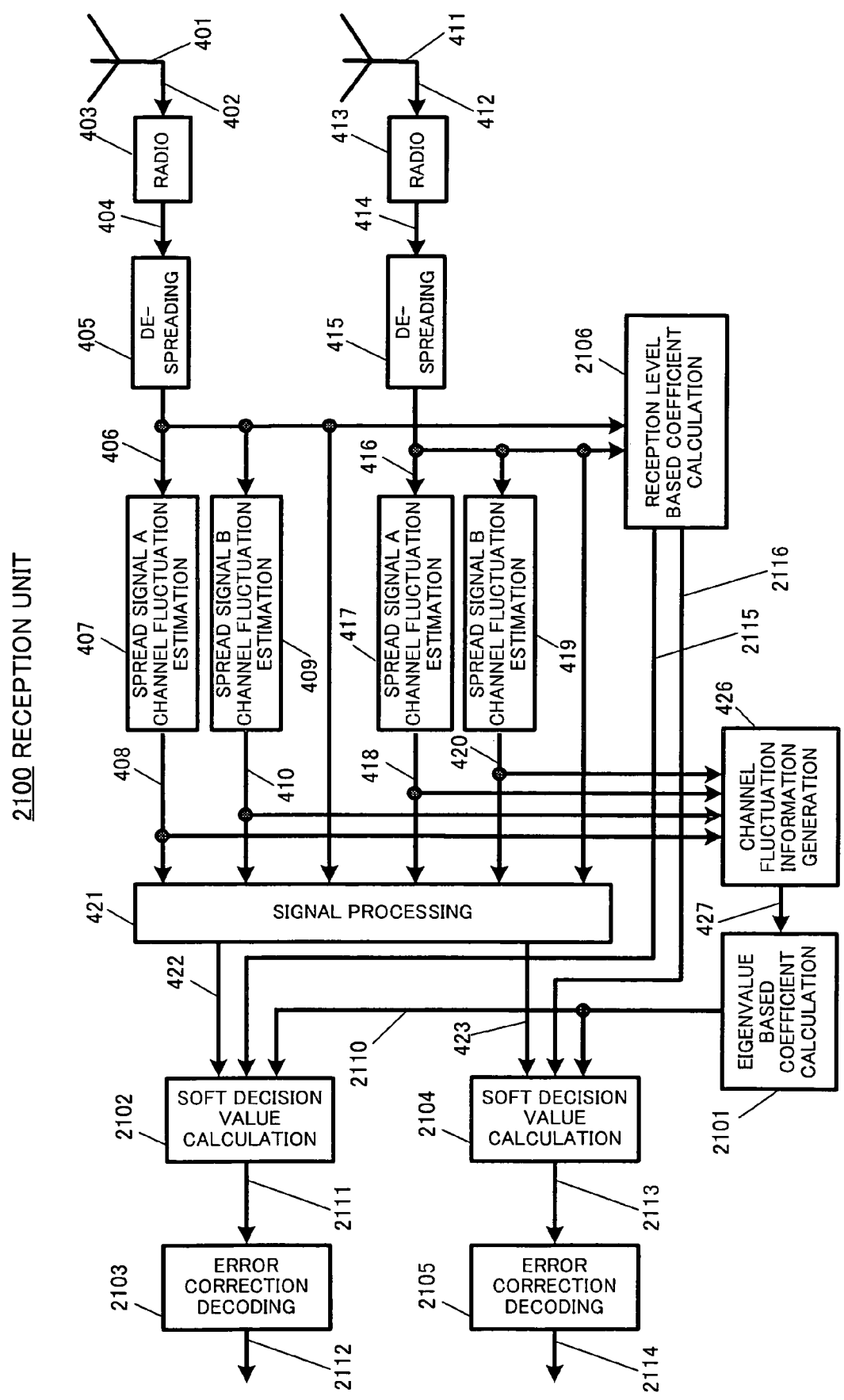
FIG. 21 is a block diagram showing a configuration of a reception unit of a receiving apparatus of Embodiment 7.

Next, the configuration of a receiving apparatus will be described. FIG. 21 shows the configuration of a reception unit of this embodiment that receives signals transmitted from transmission unit 2000. Reception unit 2100 is provided in a communication terminal, for example. The difference between reception unit 2100 of this embodiment and reception unit 400 in FIG. 4 is that reception unit 2100 has an eigenvalue based coefficient calculation section 2101, soft decision value calculation sections 2102 and 2104, error correction decoding sections 2103 and 2105, and reception level based coefficient calculation section 2106. The rest of the configuration is the same as that of reception unit 400 in FIG. 4, and therefore a description thereof is omitted here.

Eigenvalue based coefficient calculation section 2101 has channel fluctuation estimation information 427 as input, and outputs a coefficient 2110 found from an eigenvalue. Specifically, as also described in Embodiment 1, channel fluctuation h11($t$), h12($t$), h21($t$), and h22($t$) estimates are input as channel fluctuation estimation information 427, Equation (3) channel fluctuation matrix eigenvalue calculation is performed with these estimates as elements, and coefficient 2110 is found based on the value with the smallest power among the eigenvalue powers. That is to say, coefficient 2110 is found by performing the same calculation as performed by eigenvalue based coefficient calculation section 214 (FIG. 2) described in Embodiment 1, and this coefficient 2110 is sent to soft decision value calculation sections 2102 and 2104.

Reception level based coefficient calculation section 2106 has received quadrature baseband signals 406 and 416 as input, calculates coefficients 2115 and 2116 based on received quadrature baseband signals 406 and 416, and sends these coefficients 2115 and 2116 to soft decision value calculation sections 2102 and 2104 respectively. Specifically, spread signal A reception level based coefficient 2115 is found based on the reception level of the despread signal (received quadrature baseband signal) for spread signal A obtained by despreading section 405 and 415 respectively, and this coefficient 2115 is sent to soft decision value calculation section 2102. Similarly, spread signal B reception level based coefficient 2116 is found based on the reception level of the despread signal (received quadrature baseband signal) for spread signal B obtained by despreading section 405 and 415 respectively, and this coefficient 2116 is sent to soft decision value calculation section 2104.

Soft decision value calculation section 2102 has spread signal A received quadrature baseband signal 422, coefficient 2115 found from the reception levels, and coefficient 2110 found from the eigenvalues as input, obtains a soft decision value by multiplying spread signal A received quadrature baseband signal 422 by coefficients 2115 and 2110, and outputs this soft decision value as soft decision value signal 2111. Error correction decoding section 2103 has soft decision value signal 2111 as input, and obtains and outputs received digital signal 2112 that has been error correction decoded by executing error correction decoding processing on soft decision value signal 2111.

Soft decision value calculation section 2104 has spread signal B received quadrature baseband signal 423, coefficient 2116 found from the reception levels, and coefficient 2110 found from the eigenvalues as input, obtains a soft decision value by multiplying spread signal B received quadrature baseband signal 423 by coefficients 2116 and 2110, and outputs this soft decision value as soft decision value signal 2113. Error correction decoding section 2105 has soft decision value signal 2113 as input, and obtains and outputs received digital signal 2114 that has been error correction decoded by executing error correction decoding processing on soft decision value signal 2113.

It is assumed that a receiving apparatus (communication terminal) according to this embodiment has a transmission unit 500 as shown in FIG. 5 in addition to reception unit 2100 shown in FIG. 21, and transmits signals with the frame configuration shown in FIG. 6 from transmission unit 500.

The operation of a transmitting apparatus and receiving apparatus according to this embodiment will now be described in detail. In this embodiment the receiving apparatus has special features, and therefore the operation of the receiving apparatus will be described in particular detail. The description will focus on operations differing from those in Embodiment 1, omitting operations that are the same as those in Embodiment 1.

Reception unit 2100 executes radio signal processing, despreading processing, channel fluctuation estimation processing for each spread signal, and so forth, on signals received at antennas 401 and 402, then performs Equation (3) inverse matrix computation in signal processing section 421, and obtains spread signal A received quadrature baseband signal 422 and spread signal B received quadrature baseband signal 423.

Figure 23:
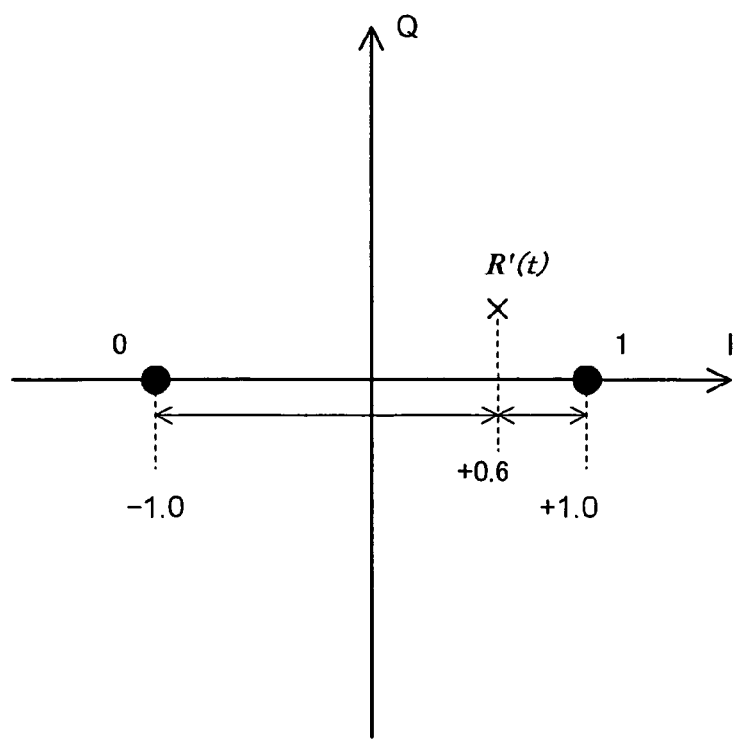
FIG. 23 is a drawing provided for explanation of a BPSK modulated signal soft decision value.

It is here assumed that reception unit 2100 receives a BPSK modulated signal with a signal point arrangement as shown in FIG. 22. When coordinates of two points in the IQ plane are normalized by (+1.0,0.0) and (−1.0,0.0) in BPSK modulation, the soft decision value of received quadrature baseband signal R'(t) in the example shown in FIG. 22 is +0.6 as shown in FIG. 23.

Important points concerning operation in this embodiment are that weighting is performed in soft decision value calculation sections 2102 and 2104 on a soft decision value obtained from a received quadrature baseband signal as described above, and more particularly that weighting is performed using coefficients found from eigenvalues.

To be specific, firstly, matrix eigenvalues shown in Equation (3) are found by eigenvalue based coefficient calculation section 2101 using channel fluctuation estimation information 427—that is, estimated $h11(t)$, $h12(t)$, $h21(t)$, and $h22(t)$—generated by channel fluctuation information generation section 426, and coefficient D(t) 2110 is calculated from the value with the smallest power among the eigenvalues.

On the other hand, in reception level based coefficient calculation section 2106, reception level based coefficients Ca(t) 2115 and Cb(t) 2116 are obtained from the $R1(t)$ and $R2(t)$ reception levels (in this embodiment, $R1(t)$ and $R2(t)$ are despread signals).

Using coefficients D(t) and Ca(t) obtained as described above and received quadrature baseband signal R'a(t) 422, received signal soft decision value Sa(t) 2111 is calculated by soft decision value calculation section 2102 using the following equation.

[Equation 5]

$$S_a(t) = C_a(t) \times D(t) \times R'_a(t) \tag{5}$$

Similarly, using coefficients D(t) and Cb(t) obtained as described above and received quadrature baseband signal R'b(t) 423, received signal soft decision value Sb(t) 2113 is calculated by soft decision value calculation section 2104 using the following equation.

[Equation 6]

$$S_b(t) = C_b(t) \times D(t) \times R'_b(t) \tag{6}$$

In error correction decoding section 2103, error correction decoding processing is performed using soft decision value Sa(t) 2111 obtained as described above. Similarly, in error correction decoding section 2105, error correction decoding processing is performed using soft decision value Sb(t) 2113 obtained as described above.

Here, coefficients Ca(t)×D(t) and Cb(t)×D(t) for weighting used by soft decision value calculation sections 2102 and 2104 indicate the effective received field strength obtained by multiplying the received field strength actually received by an efficiency coefficient. Performing multiplication by this coefficient enables reception characteristics to be improved.

In this embodiment, convolutional coding is executed as error correction coding, and therefore maximum likelihood decoding such as Viterbi decoding is used. As regards the way in which a soft decision value is used in maximum likelihood decoding, methods previously disclosed in various documents include, for example, a method whereby the Euclidian distance between a soft decision value and each signal point is calculated and used, and a method whereby a metric value is calculated based on probability density distribution characteristics. In this embodiment, it is assumed, as an example, that the square Euclidian distance is calculated. That is to say, in the example shown in FIG. 23, likelihood metric values M0 and M1 from each signal point are calculated as shown in following Equation (7) and Equation (8) respectively. By this means, received digital signals 2112 and 2113 decoded by Viterbi coding are obtained.

[Equation 7]

$$M_0(t)=(+0.6-(-1.0))^2=2.56 \quad (7)$$

[Equation 8]

$$M_1(t)=(+0.6-(+1.0))^2=0.16 \quad (8)$$

Thus, according to this embodiment, in a receiving apparatus that receives at a plurality of antennas a plurality of modulated signals transmitted from a plurality of antennas, by weighting a soft decision value using a coefficient D(t) based on the minimum value of eigenvalues calculated from channel fluctuation estimation results when performing error correction decoding using a received baseband signal obtained by separation, it is possible to give a soft decision value an appropriate likelihood based on effective reception power, enabling receive data error rate characteristics to be improved.

In this embodiment, in calculating reception level based coefficients, reception level based coefficient calculation section 2106 (FIG. 21) finds spread signal A reception level based coefficient 2115 and spread signal B reception level based coefficient 2116 based on the output from despreading sections 405 and 415, but coefficients 2115 and 2116 may also be found using channel estimation information h11(t), h12(t), h21(t), and h22(t) obtained by channel fluctuation estimation sections 407, 409, 417, and 419, in the same way as with reception power based coefficient calculation section 211 in FIG. 2 described in Embodiment 1, or may be found from the RSSI (Received Signal Strength Indicator) of the received signal received from each antenna. This also applies to other embodiments in which processing is performed that uses reception level based coefficients.

Also, in this embodiment a case has been described in which soft decision value weighting is performed using reception level based coefficients 2115 and 2116 in addition to eigenvalue based coefficient 2110, but soft decision value weighting may also be performed using only an eigenvalue based coefficient.

Moreover, the configuration of the transmission unit of a base station is not limited to that shown in FIG. 20. For example, transmission power modification sections 108 and 118 are not essential, and a configuration may be used whereby modulated signals 107 and 117 are supplied directly to antennas 110 and 120.

Furthermore, a function that performs error detection coding, an interleaving function that switches around the signal order, a puncturing function that reduces redundancy by eliminating some signals, or the like, may be provided before or after error correction coding sections 2001 and 2002, as necessary, without affecting the present invention. This also applies to other embodiments that have error correction coding sections.

Also, in this embodiment a case has been described in which error correction coding sections 2001 and 2002 perform error correction coding processing using convolutional code, but the error correction code used in error correction coding processing is not limited to convolutional code, and other code may be used as long as it is error correction code that allows decoding processing using a soft decision value during decoding. In this case, error correction decoding sections 2103 and 2105 of reception unit 2100 should perform decoding processing corresponding to the relevant coding. Moreover, a configuration may be used in which error correction coding sections 2001 and 2002 are combined into a single error correction coding section, and a coded signal is separated into two signals that are supplied to modulation section 102 and modulation section 112 respectively. In this case, error correction decoding sections 2103 and 2105 of reception unit 2100 can also be combined into a single decoding processing section. These comments also apply to other embodiments that have error correction coding processing sections.

Figure 24:
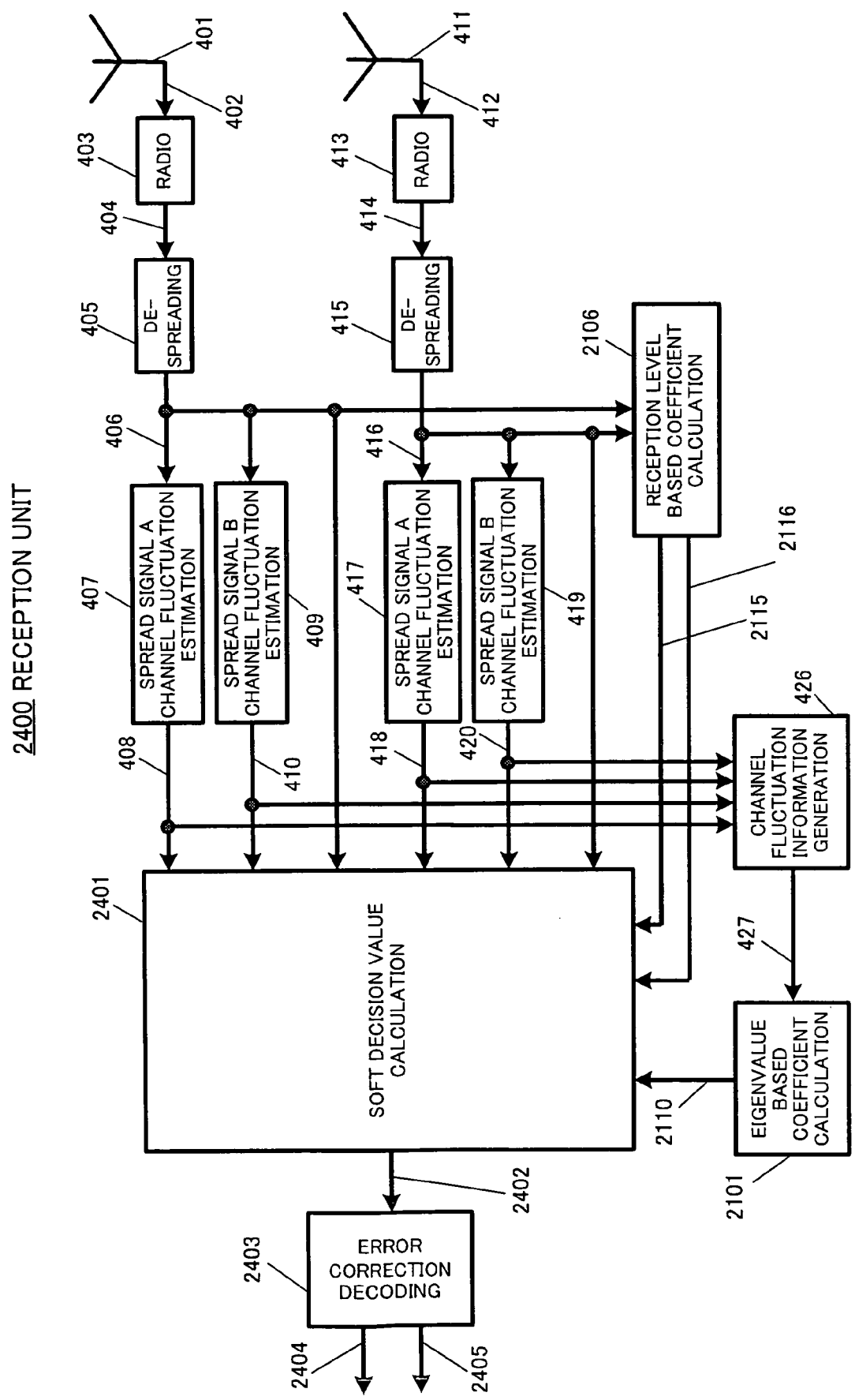
FIG. 24 is a block diagram showing another sample configuration of a reception unit of a receiving apparatus of Embodiment 7.

Furthermore, in this embodiment a reception unit 2100 with the configuration shown in FIG. 21 has been described as an example, but it is essential only that soft decision value weighting be performed using a coefficient based on the smallest value of eigenvalues calculated from channel fluctuation estimation results, and the reception unit configuration is not limited to that shown in FIG. 21, but may also be as shown in FIG. 24, for example.

The difference between reception unit 2400 in FIG. 24 and reception unit 2100 in FIG. 21 is that, whereas reception unit 2100 in FIG. 21 performs signal separation processing by means of an inverse matrix computation by signal processing section 421, reception unit 2400 in FIG. 24 performs MLD (Maximum Likelihood Detection) by means of soft decision value calculation section 2401, and then in error correction decoding section 2403 separates soft decision value signal 2402 into spread signal A received digital signal 2404 and spread signal B received digital signal 2405. In performing this MLD, use of eigenvalue based coefficient 2110 enables receive data error rate characteristics to be improved in the same way as in the above-described embodiment.

By way of example, a case will here be described in which signals that have undergone QPSK modulation by modulation sections 102 and 112 of transmission unit 2000 shown in FIG. 20 are demodulated by performing MLD in reception unit 2400 in FIG. 24.

Soft decision value calculation section 2401, having received quadrature baseband signals 406 and 416, channel fluctuation estimation information 408, 410, 418, and 420, reception level based coefficients 2115 and 2116, and eigenvalue based coefficient 2110 as input, first calculates received quadrature baseband signal 406 and 416 candidate signal point positions (the present example assumes QPSK, with four candidate signal points provided per channel, so there are total 4×4=16 candidate signal point positions) using channel fluctuation estimation information 408, 410, 418, and 420, thereafter finds the signal point distance between these candidate points and reception point, and outputs that signal point distance weighted by reception level based coefficients 2115 and 2116 and eigenvalue based coefficient 2110 as soft decision value signal 2402.

The process will now be described in detail. FIG. 25(a) shows signal point position 2501 of received quadrature baseband signal 406 (the signal received by antenna 401 (antenna 1)) and candidate signal point positions, and FIG. 25(b) shows signal point position 2502 of received quadrature baseband signal 416 (the signal received by antenna 411 (antenna 2)) and candidate signal point positions.

Figure 25:
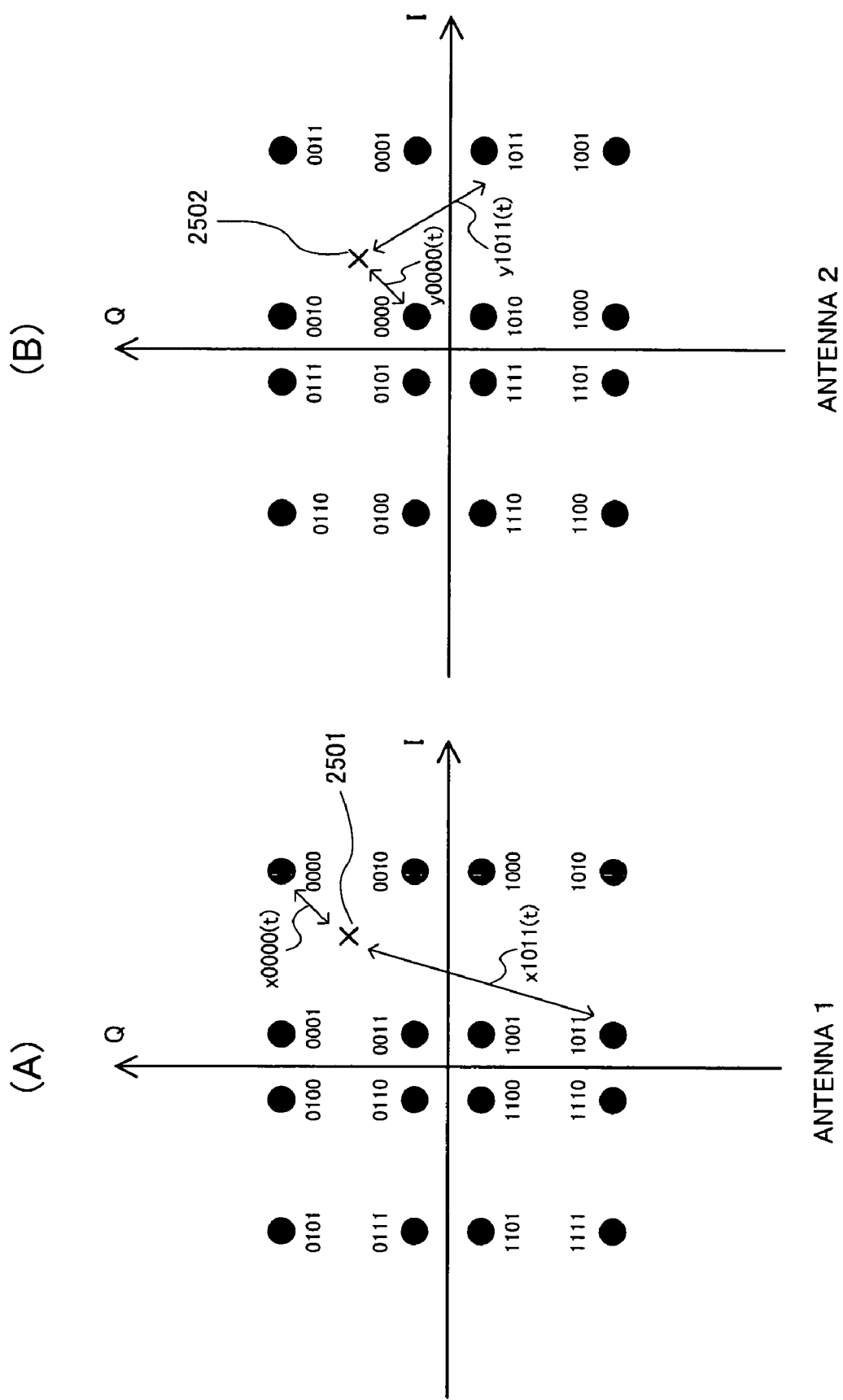
FIGS. 25A and 25B are drawings provided for explanation of calculation of the distance between a reception point and a candidate point.

Soft decision value calculation section 2401 establishes candidate signal points of 4 transmit bits (0000), (0001), ..., (1111) from spread signal A channel fluctuation estimation signal 408 and spread signal B channel fluctuation estimation signal 410 as shown in FIG. 25(*a*). Then the distance between signal point 2501 of received quadrature baseband signal 406 and each candidate signal point is found. In fact, the square (power value) of the signal point distance is found. Here, the squares of the signal point distances between 4 transmit bits (0000), (0001), ..., (1111) and reception point 2501 are denoted by x0000(t), x0001(t), x0010(t) and x1111(t) respectively.

Similarly, soft decision value calculation section 2401 establishes candidate signal points of 4 transmit bits (0000), (0001), ..., (1111) from spread signal A channel fluctuation estimation signal 418 and spread signal B channel fluctuation estimation signal 420 as shown in FIG. 25(*b*). Then the distance between signal point 2502 of received quadrature baseband signal 416 and each candidate signal point is found. In fact, the square (power value) of the signal point distance is found. Here, the squares of the signal point distances between 4 transmit bits (0000), (0001), ..., (1111) and reception point 2502 are denoted by y0000(t), y0001(t), y0010(t), and y1111(t) respectively.

Soft decision value calculation section 2401 then performs soft decision value weighting using eigenvalue based coefficient 2110 and reception level based coefficients 2115 and 2116. To be specific, calculation is performed as follows: weighted soft decision value z0000(t)=Ca(t)D(t){x0000(t)+y0000(t)}. z0001(t), z0010(t), ..., z1111(t) are found in the same way. Ca(t) may be replaced by Cb(t). Soft decision value calculation section 2401 outputs z0001(t), z0010(t), ..., z1111(t) weighted in this way as soft decision value signal 2402.

By performing error correction decoding of soft decision value signal 2402 that has undergone MLD processing and eigenvalue based weighting processing in this way, error correction coding section 2403 obtains spread signal A received digital signal 2404 and spread signal B received digital signal 2405, and outputs these signals.

Embodiment 8

In this embodiment, a case is described in which the processing described in Embodiment 7 is applied to OFDM communications. A special feature of this embodiment is that the processing whereby soft decision values are weighted using eigenvalue based coefficients calculated from channel fluctuation estimation results is performed for each subcarrier.

Figure 26:
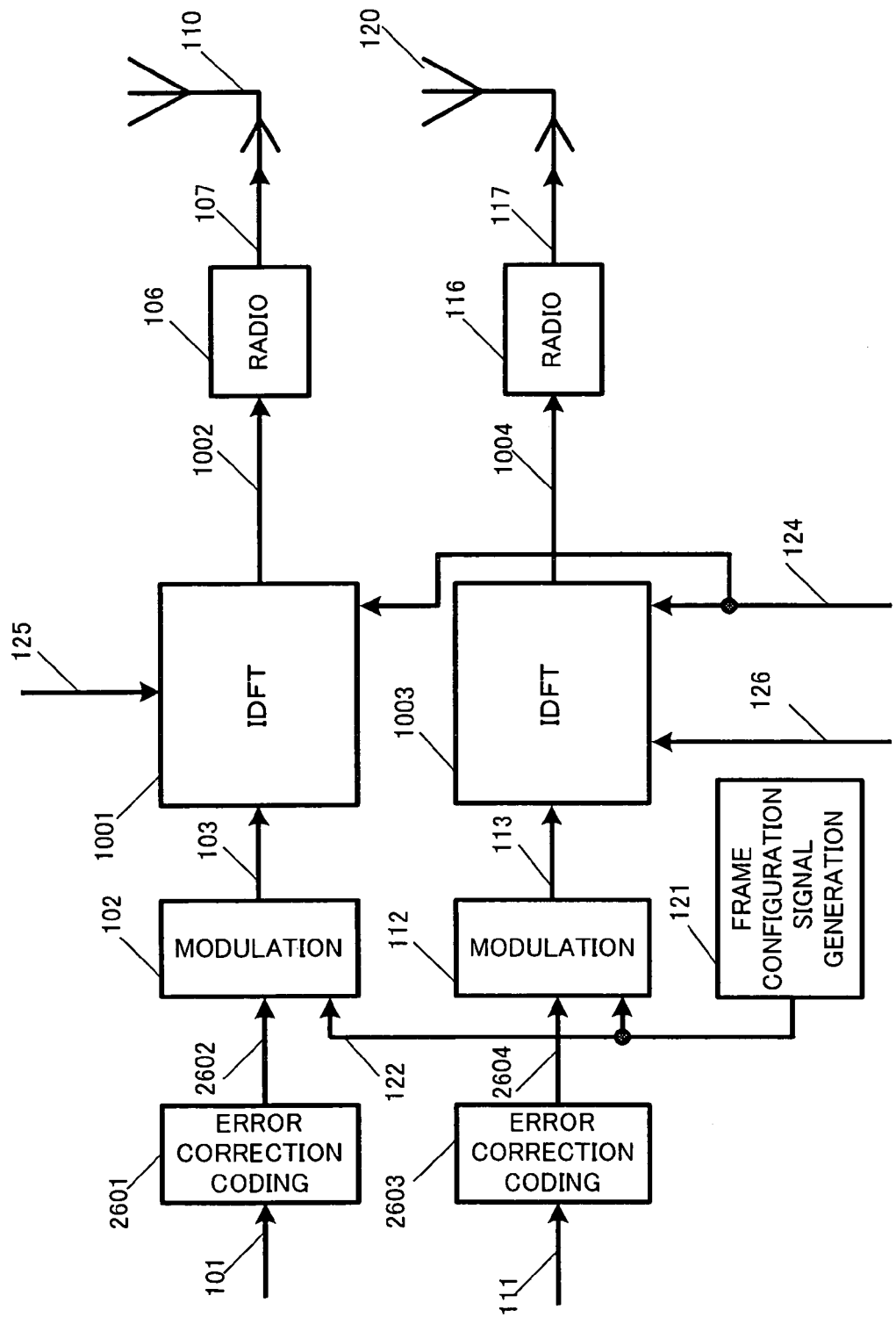
FIG. 26 is a block diagram showing a configuration of a transmission unit of a transmitting apparatus of Embodiment 8.

FIG. 26 shows a sample configuration of the transmission unit of a transmitting apparatus according to this embodiment. Parts in FIG. 26 corresponding to parts in FIG. 10 are assigned the same codes as in FIG. 10, and descriptions of parts previously described using FIG. 10 are omitted.

The difference between transmission unit 2600 in FIG. 26 and transmission unit 1000 in FIG. 10 is that transmission unit 2600 has error correction coding sections 2601 and 2603, which execute error correction coding processing on transmit digital signals 101 and 111 using convolutional code, and send error correction coded signals 2602 and 2604 to modulation sections 102 and 112. By this means, transmission unit 2600 performs OFDM processing of error correction coded data, enabling transmit data to be coded in the frequency axis direction.

Transmission unit 2600 is provided in a base station, for example, which has a reception unit 200 as shown in FIG. 2. Transmission unit 2600 transmits signals with the frame configurations shown in FIG. 11.

Figure 27:
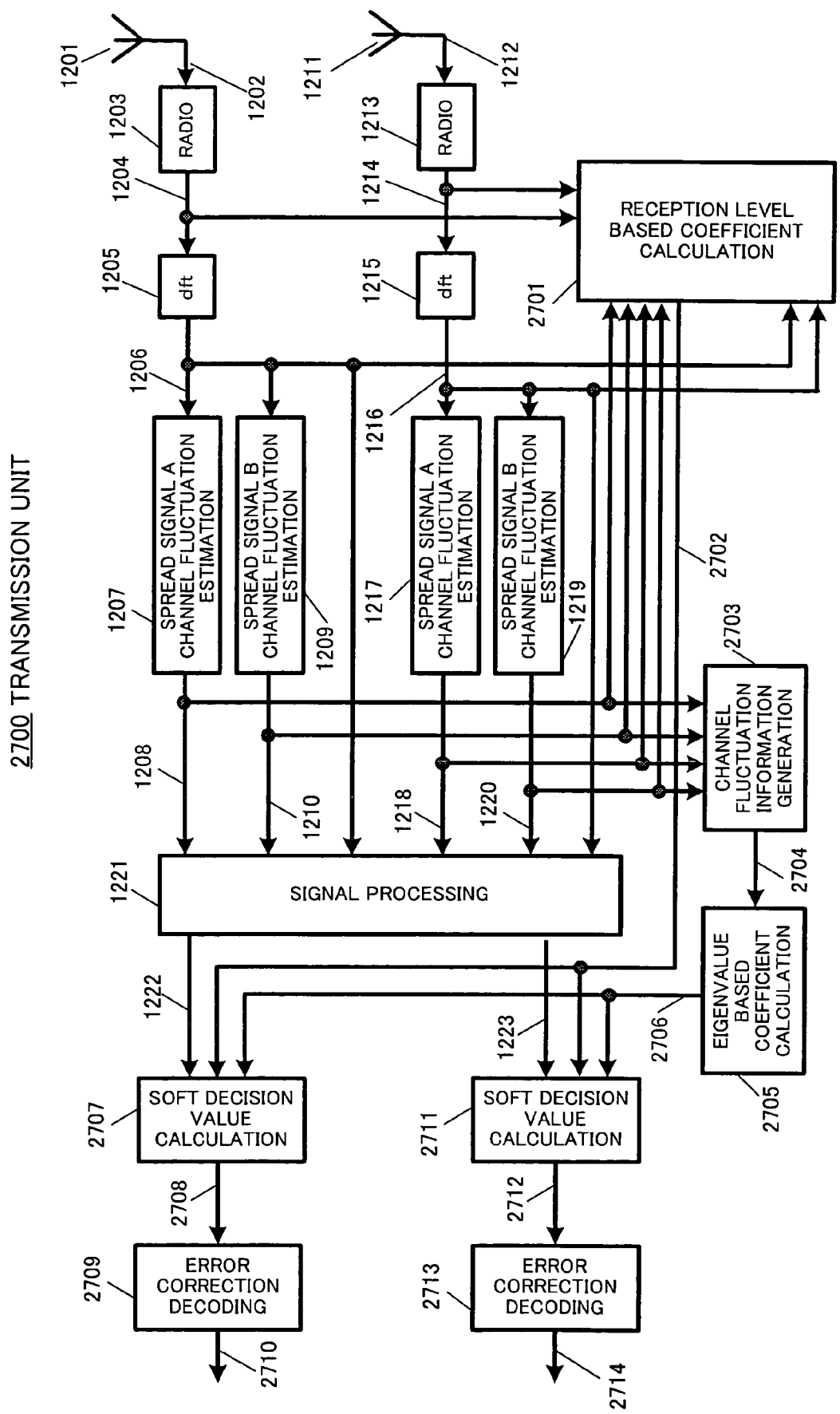
FIG. 27 is a block diagram showing a configuration of a reception unit of a receiving apparatus of Embodiment 8.

FIG. 27 shows the configuration of a reception unit of this embodiment that receives signals transmitted from transmission unit 2600. Reception unit 2700 is broadly configured as a combination of reception unit 1200 shown in FIG. 12 and reception unit 2100 shown in FIG. 21, and therefore descriptions of previously described parts in FIG. 12 and FIG. 21 are omitted here, and only parts specific to this embodiment are described. Parts in FIG. 27 corresponding to parts in FIG. 12 are assigned the same codes as in FIG. 12.

Channel fluctuation estimation sections 1207, 1209, 1217, and 1219 estimate channel fluctuation on a subcarrier-by-subcarrier basis based on estimation symbols arranged in each subcarrier. Channel fluctuation information generation section 2703 and eigenvalue based coefficient calculation section 2705 find eigenvalue based coefficient 2706 for each subcarrier by performing the same processing as in channel fluctuation information generation section 426 and eigenvalue based coefficient calculation section 2101 in FIG. 21 on a subcarrier-by-subcarrier basis, and send eigenvalue based coefficient 2706 to soft decision value calculation sections 2707 and 2711.

Reception level based coefficient calculation section 2701 has output signals 1204 and 1214 from radio sections 1203 and 1213, output signals 1206 and 1216 from discrete Fourier transform sections (dft's) 1205 and 1215, and output signals 1208, 1210, 1218, and 1220 from channel fluctuation estimation sections 1207, 1209, 1217, and 1219 as input, and using some or all of these, finds reception level based coefficient 2702 for each subcarrier, and sends this coefficient 2702 to soft decision value calculation sections 2707 and 2711.

Soft decision value calculation sections 2707 and 2711 weight input channel A received quadrature baseband signal group 1222 and channel B received quadrature baseband signal group 1223 by means of eigenvalue based coefficient 2706 and reception level based coefficient 2702, and output soft decision value signals 2708 and 2712. Here, soft decision value calculation sections 2707 and 2711 perform the same kind of weighting processing as described for soft decision value calculation sections 2102 and 2104 in FIG. 21 for each subcarrier. That is to say, different weighting processing is performed for each subcarrier using the same subcarrier received quadrature baseband signal, eigenvalue based coefficient, and reception level based coefficient.

In this way, soft decision value signals 2708 and. 2712 weighted on a subcarrier-by-subcarrier basis are obtained, these soft decision value signals 2708 and 2712 undergo error correction decoding processing by error correction decoding sections 2709 and 2713, and received digital signals 2710 and 2714 are obtained.

Thus, according to this embodiment, in a receiving apparatus that receives at a plurality of antennas a plurality of OFDM modulated signals transmitted from a plurality of antennas, by performing processing whereby soft decision values are weighted using a coefficient based on an eigenvalue calculated from channel fluctuation estimation results on a subcarrier-by-subcarrier basis, it is possible to give a soft decision value an appropriate likelihood based on per-subcarrier effective reception power, enabling receive data error rate characteristics to be improved, even when per-subcarrier effective reception power varies due to frequency selective fading, etc.

Figure 28:
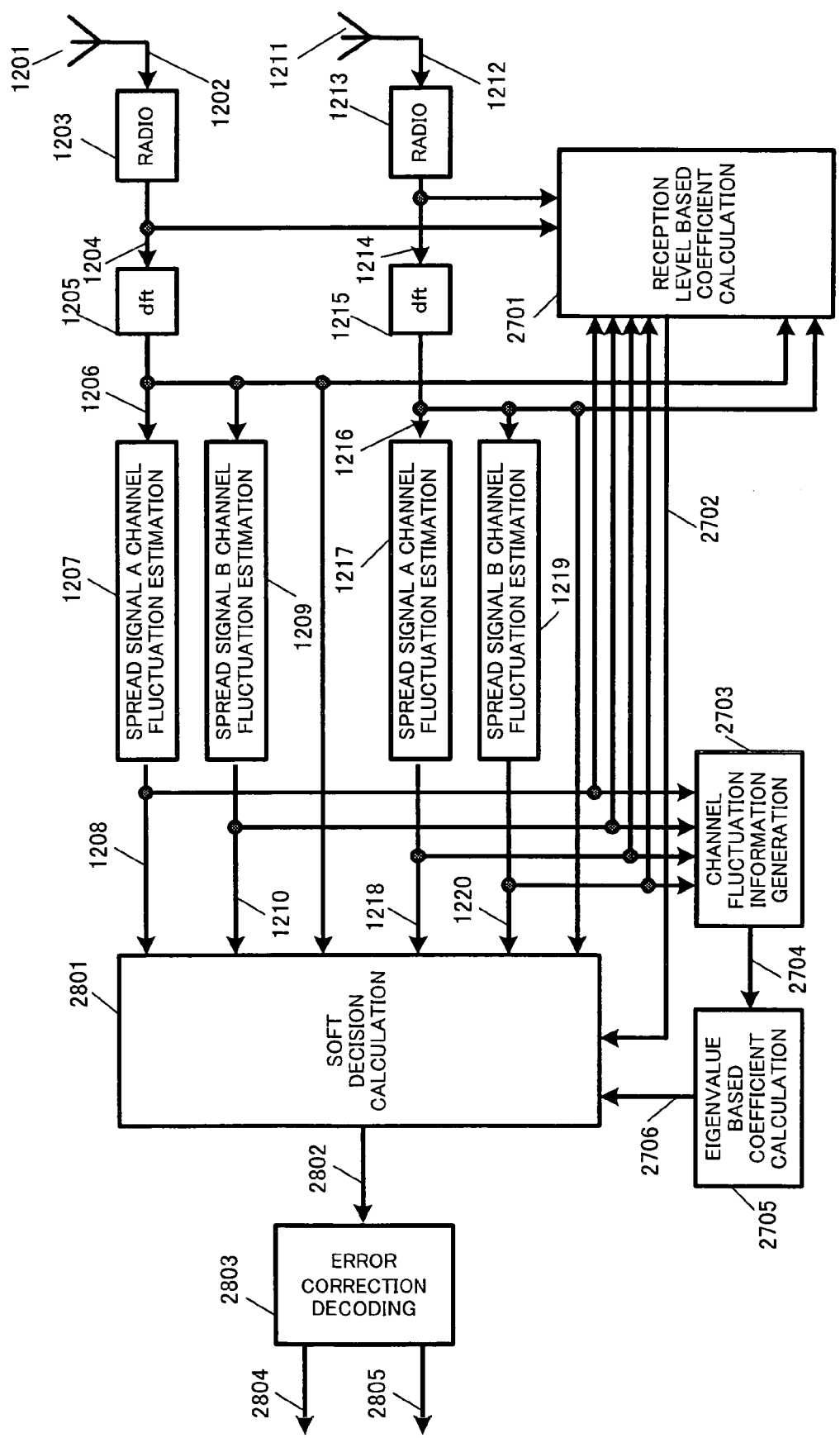
FIG. 28 is a block diagram showing another sample configuration of a reception unit of a receiving apparatus of Embodiment 8.

In this embodiment a reception unit 2700 with the configuration shown in FIG. 27 has been described as an example, but it is essential only that per-subcarrier soft decision value weighting be performed using a coefficient based on the smallest value of per-subcarrier eigenvalues calculated from per-subcarrier channel fluctuation estimation results, and the reception unit configuration is not limited to that shown in FIG. 27, but may also be as shown in FIG. 28, for example.

The difference between reception unit 2800 in FIG. 28 and reception unit 2700 in FIG. 27 is that, whereas reception unit 2700 in FIG. 27 performs signal separation processing by means of an inverse matrix computation by signal processing section 1221, reception unit 2800 in FIG. 28 performs MLD (Maximum Likelihood Detection) by means of soft decision value calculation section 2801, and then in error correction decoding section 2803 separates soft decision value signal 2802 into received digital signal 2804 and received digital signal 2805.

As MLD processing has been described in Embodiment 7 using FIG. 24, a description thereof is omitted here. However, the difference between above-described soft decision value calculation section 2401 in FIG. 24 and soft decision value calculation section 2801 of this embodiment in FIG. 28 is that soft decision value calculation section 2801 performs the same kind of processing as soft decision value calculation section 2401 on a subcarrier-by-subcarrier basis. That is to say, soft decision value calculation section 2801 performs processing on a subcarrier-by-subcarrier basis to calculate all of candidate signal point positions on received quadrature baseband signal group 1206 and 1216 using channel fluctuation estimation information 1208, 1210, 1218, and 1220, then finds the signal point distance between the candidate points and reception point on a subcarrier-by-subcarrier basis, and outputs that signal point distance weighted by reception level based coefficient 2702 and eigenvalue based coefficient 2760 as soft decision value signal 2802 on a subcarrier-by-subcarrier basis. In other words, per-subcarrier soft decision values are output as soft decision value signal 2802.

Embodiment 9

A special feature of this embodiment is that, in contrast to Embodiment 7, error correction coding processing is not performed individually on data transmitted from each antenna, but instead, data is supplied to each antenna after undergoing error correction coding processing by a single error correction coding section. As a result, when MLD (Maximum Likelihood Detection) processing and error correction decoding processing are performed on the receiving side, single-system error correction code is input to the MLD processing section and error correction decoding section, enabling data with improved error rate characteristics to be obtained.

Figure 29:
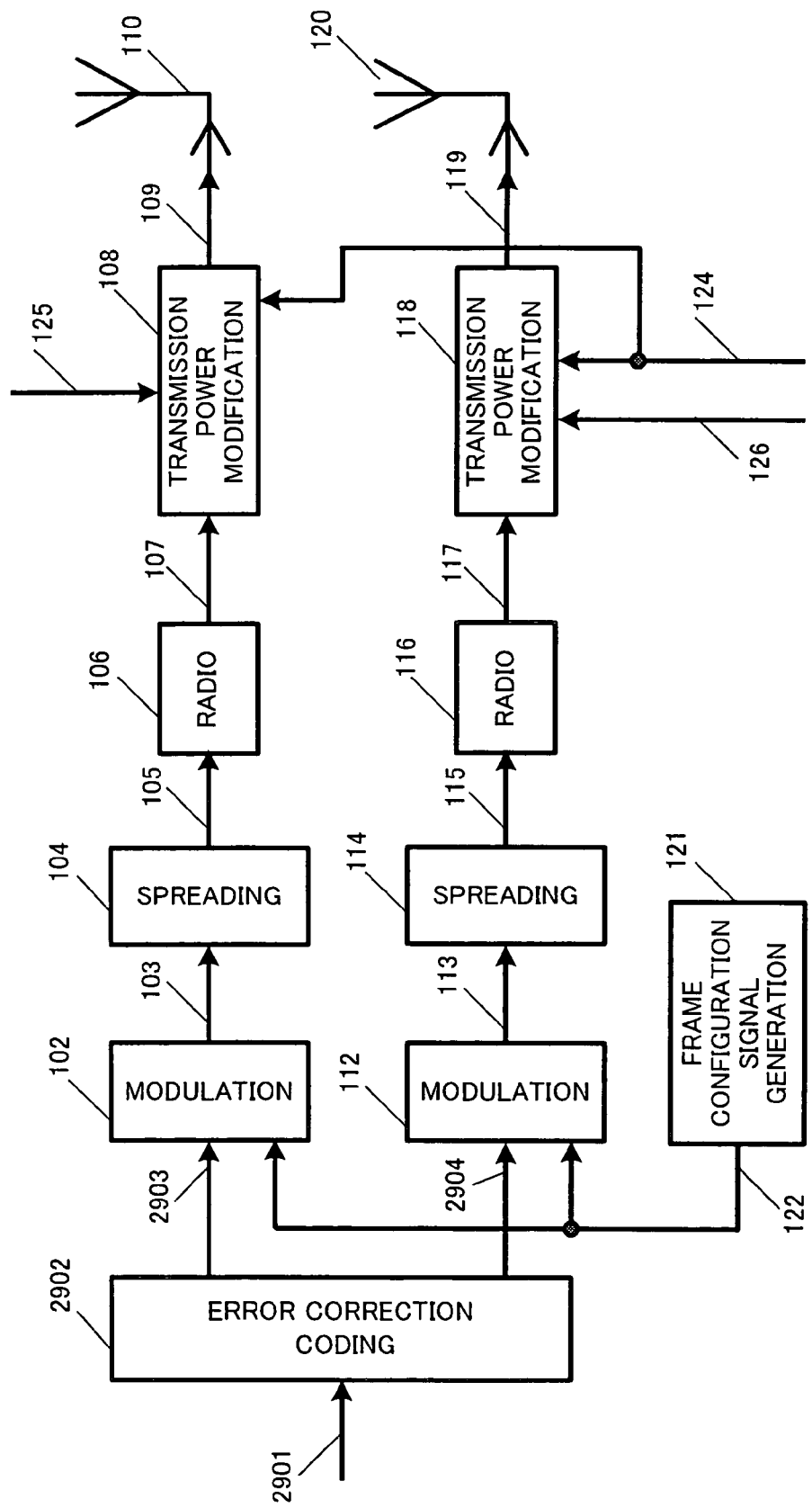
FIG. 29 is a block diagram showing a configuration of a transmission unit of a transmitting apparatus of Embodiment 9.

FIG. 29, in which parts corresponding to parts in FIG. 20 are assigned the same codes as in FIG. 20, shows the configuration of a transmission unit 2900 of this embodiment. The difference between transmission unit 2900 of this embodiment and transmission unit 2000 in FIG. 20 is that, whereas transmission unit 2000 has error correction coding sections 2001 and 2002 for antennas 110 and 120 respectively and performs error correction coding processing of transmit digital signals 101 and 111 individually for antennas 110 and 120, in transmission unit 2900 error correction coding section 2902 first performs error correction processing on transmit digital signal 2901 and then splits the data into error correction coded data 2903 and 2904, and supplies error correction coded data 2903 and 2904 to modulation sections 102 and 112 respectively.

Figure 30:
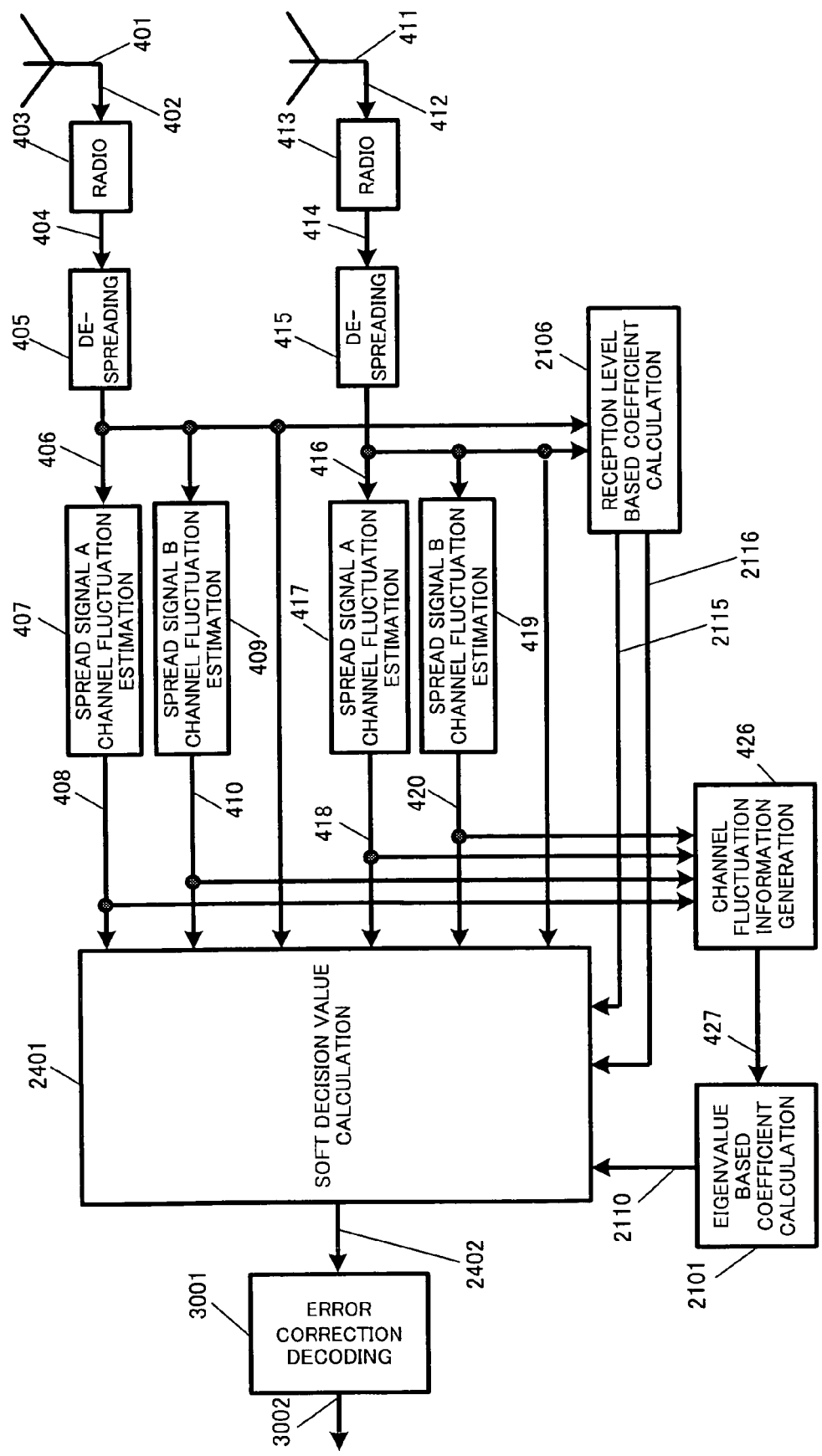
FIG. 30 is a block diagram showing a configuration of a reception unit of a receiving apparatus of Embodiment 9.

FIG. 30, in which parts corresponding to parts in FIG. 24 are assigned the same codes as in FIG. 24, shows the configuration of a reception unit 3000 of this embodiment. Reception unit 3000 receives signals transmitted from transmission unit 2900. That is to say, reception unit 3000 receives signals that have undergone error correction coding by the single error correction coding section 2902. As a result, soft decision value calculation section 24.01 and error correction decoding section 3001 perform error correction decoding processing by calculating a single-system error correction coded signal soft decision value, and thus error correction capability is improved compared with a case where error correction decoding processing is performed by calculating soft decision values separately for multi-system error correction coded signals (for example, compared with reception unit 2400 in FIG. 24). By this means, a received digital signal 3002 with improved error rate characteristics can be obtained.

Thus, according to this embodiment, when transmit data undergoes error correction coding processing and is transmitted from a plurality of antennas, transmit data is error correction coded by a single error correction coding section 2902, in contrast to the configuration in Embodiment 7, making it possible to improve error correction capability when MLD processing and error correction decoding processing are performed on the receiving side, and enabling receive data with greatly improved error rate characteristics to be obtained.

Embodiment 10

In this embodiment, a case is described in which the special feature of Embodiment 9 is applied to OFDM communications.

Figure 31:
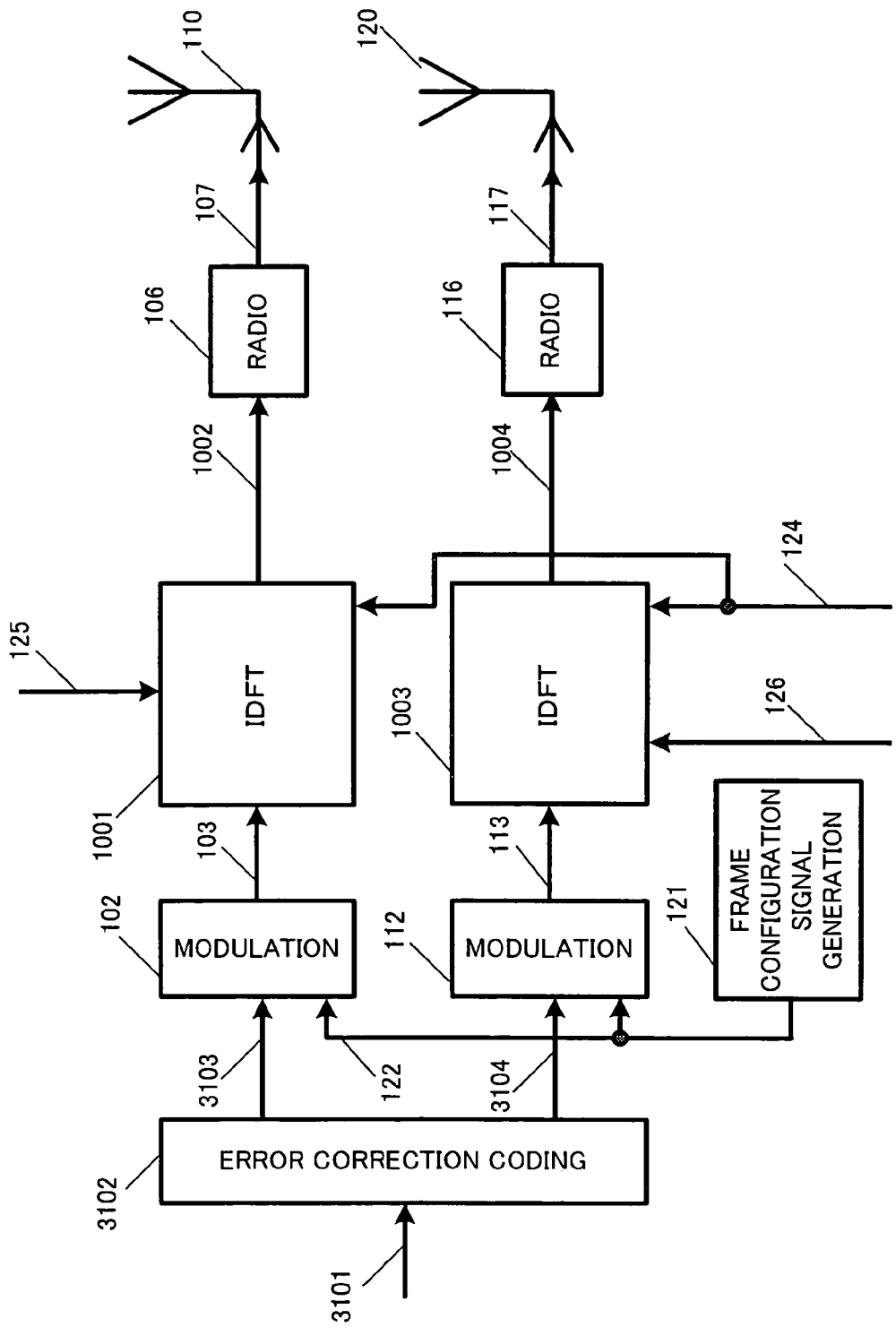
FIG. 31 is a block diagram showing a configuration of a transmission unit of a transmitting apparatus of Embodiment 10.

FIG. 31 shows a sample configuration of the transmission unit of a transmitting apparatus according to this embodiment. Parts in FIG. 31 corresponding to parts in FIG. 26 are assigned the same codes as in FIG. 26. The difference between transmission unit 3100 of this embodiment and transmission unit 2600 in FIG. 26 is that, whereas transmission unit 2600 has error correction coding sections 2601 and 2602 for antennas 110 and 120 respectively and performs error correction coding processing of transmit digital signals 101 and 111 individually for antennas 110 and 120, in transmission unit 3100 error correction coding section 3102 first performs error correction processing on transmit digital signal 3101 and then splits the data into error correction coded data 3103 and 3104, and supplies error correction coded data 3103 and 3104 to modulation sections 102 and 112 respectively.

Figure 32:
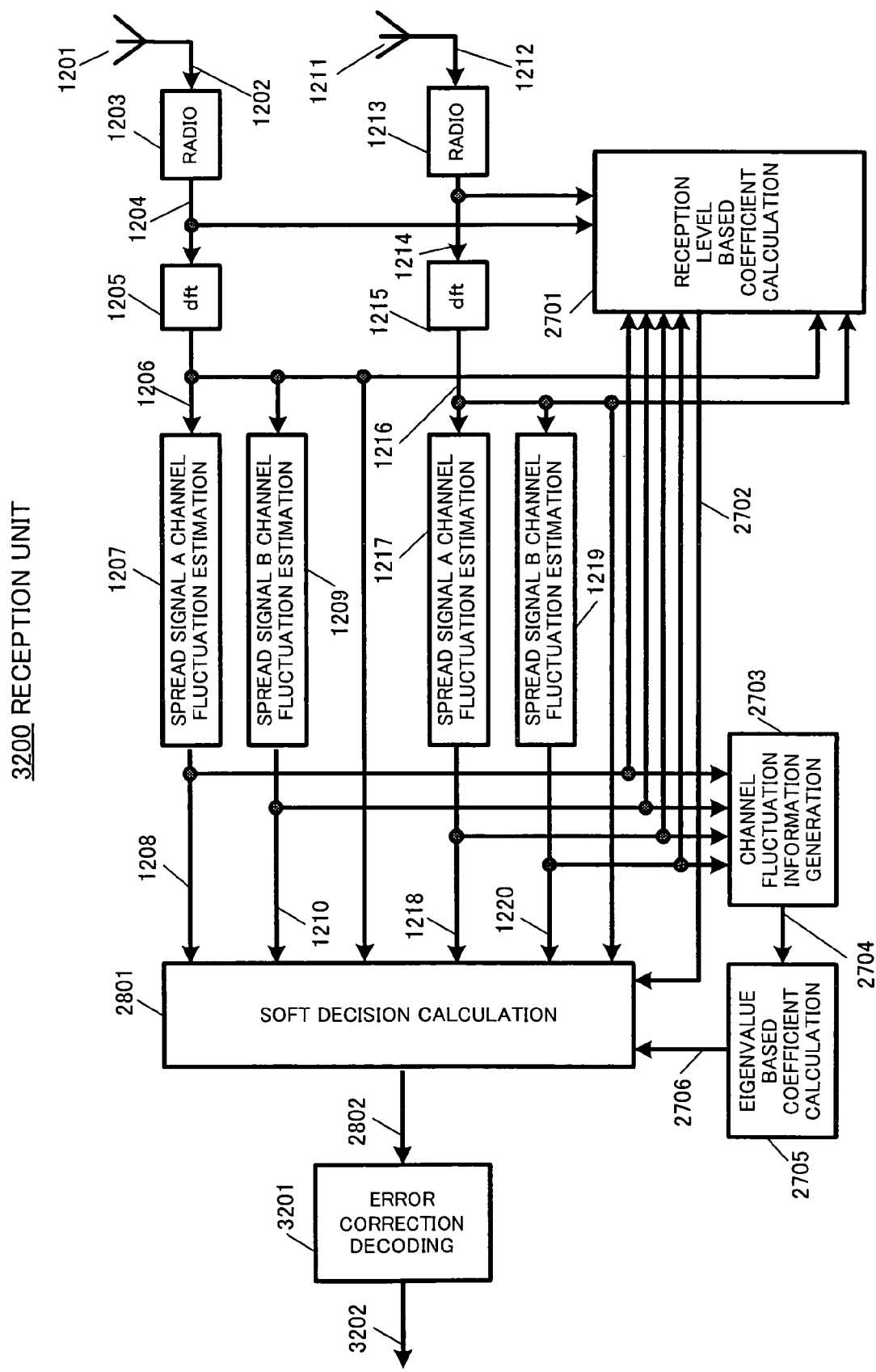
FIG. 32 is a block diagram showing a configuration of a reception unit of a receiving apparatus of Embodiment 10.

FIG. 32, in which parts corresponding to parts in FIG. 28 are assigned the same codes as in FIG. 28, shows the configuration of a reception unit 3200 of this embodiment. Reception unit 3200 receives signals transmitted from transmission unit 3100. That is to say, reception unit 3200 receives signals that have undergone error correction coding by the single error correction coding section 3102. As a result, soft decision value calculation section 2801 and error correction decoding section 3201 perform error correction decoding processing by calculating a single-system error correction coded signal soft decision value, and thus error correction capability is improved compared with a case where error correction decoding processing is performed by calculating soft decision values separately for multi-system error correction coded signals (for example, compared with reception unit 2800 in FIG. 28). By this means, a received digital signal 3202 with improved error rate characteristics can be obtained.

Thus, according to this embodiment, when transmit data undergoes error correction coding processing and is transmitted from a plurality of antennas, transmit data is error correction coded by a single error correction coding section 3102, in contrast to the configuration in Embodiment 8, making it possible to improve error correction capability when MLD processing and error correction decoding processing are performed on the receiving side, and enabling receive data with greatly improved error rate characteristics to be obtained.

Embodiment 11

A special feature of this embodiment is that, in a receiving apparatus that performs demodulation processing using channel fluctuation matrix eigenvalues, a reception level control section is provided that detects the signal level of each antenna received signal and makes the signal levels of the antenna received signals equal.

Figure 33:
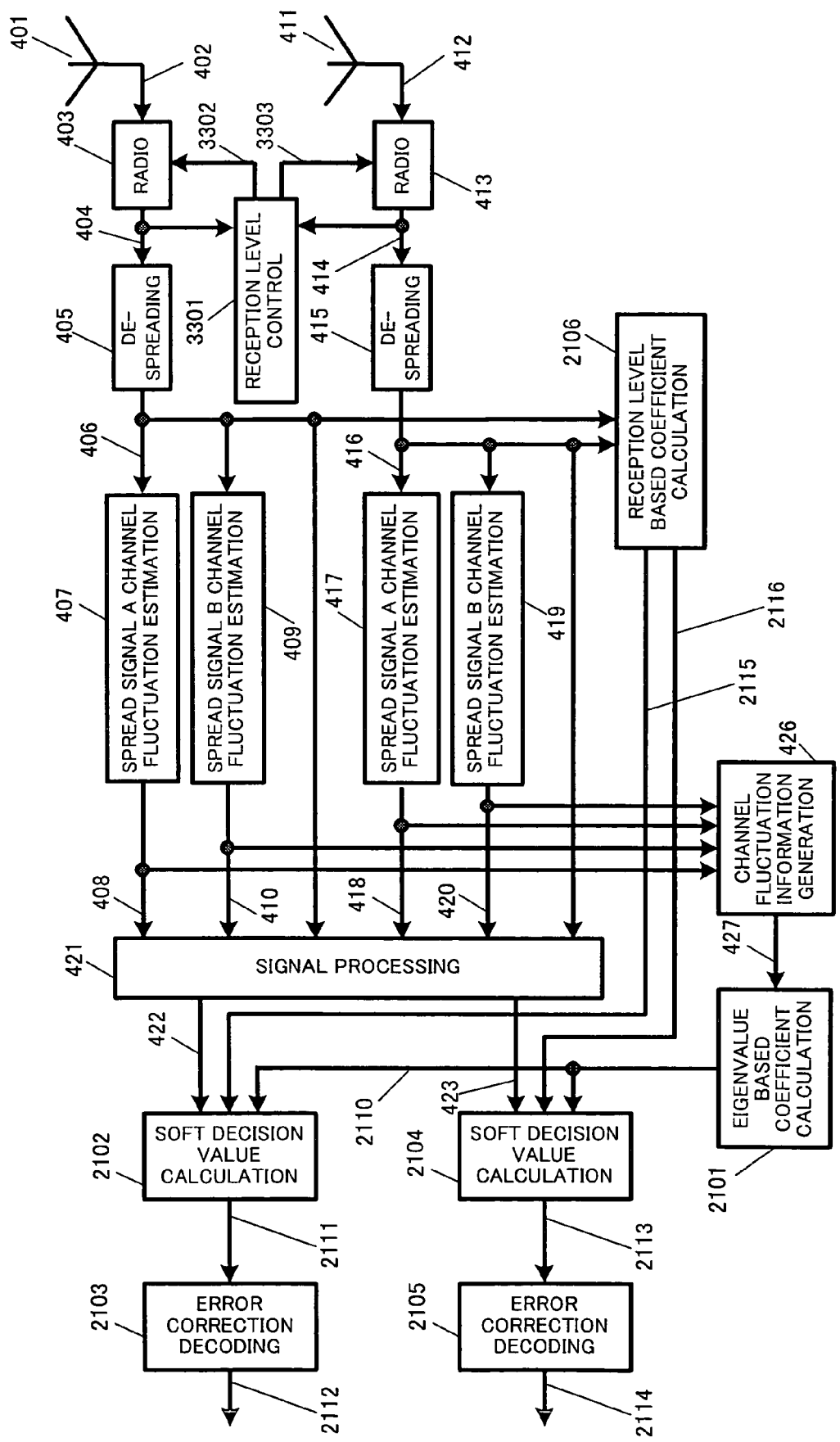
FIG. 33 is a block diagram showing a configuration of a reception unit of a receiving apparatus of Embodiment 11.

FIG. 33, in which parts corresponding to parts in FIG. 21 are assigned the same codes as in FIG. 21, shows the configuration of a reception unit 3300 of this embodiment. Except for the provision of a reception level control section 3301, reception unit 3300 has the same configuration as reception unit 2100 in FIG. 21.

Reception level control section 3301 has received quadrature baseband signals 404 and 414 as input, detects the signal levels of these received quadrature baseband signals 404 and 414, and sends gain control signals 3302 and 3303 for equalizing the signal levels of received quadrature baseband signals 404 and 414 to radio sections 403 and 413. Radio sections 403 and 413 change the amplifier gain based on gain control signals 3302 and 3303.

The operation of reception unit 3300 of this embodiment will now be described. Reception unit 3300 performs control by means of reception level control section 3301 so that the levels of the received signals received by antennas 401 and 411 become equal—that is to say, so that the output levels of received quadrature baseband signals 404 and 414 output from radio sections 403 and 413 respectively become equal.

For example, if a −40 dBm signal is received by antennas 401 and 411, control is performed so that the voltages of received quadrature baseband signals 404 and 414 are 2 V. On the other hand, if a −40 dBm signal is received by antenna 401 and a −46 dBm signal is received by antenna 411, control is not performed so that the voltages of received quadrature baseband signals 404 and 414 are both 2 V, but instead, control is performed so that the voltage of received quadrature baseband signal 404 is 2 V and the voltage of received quadrature baseband signal 414 is 1 V. In this way, the signal levels of received quadrature baseband signals 404 and 414 are made equal.

Making the signal levels from the antennas equal in this way greatly improves demodulation precision when performing demodulation using channel fluctuation matrix eigenvalues, because the closer the received signal levels of the antennas, the greater is the significance of a channel fluctuation matrix eigenvalue. When the signal level of each antenna received signal is controlled separately and control is performed so that received quadrature baseband signals 404 and 414 have the same voltage, the significance of an eigenvalue as an effective reception power index decreases.

In those of the above-described embodiments in which reception level based coefficients are used together with eigenvalue based coefficients, and demodulation is performed with these coefficients as effective reception power indices, even if the signal levels of antenna received signals are different, the same effect can be obtained as by equalizing reception levels, as in this embodiment, if eigenvalues are corrected by reflecting this difference of signal levels in a reception level coefficient.

Thus, according to this embodiment, in a receiving apparatus that performs demodulation processing using channel fluctuation matrix eigenvalues, by detecting the signal level of each antenna received signal and equalizing the signal levels of the antenna received signals, the value of an eigenvalue can be made a much more appropriate value for use as an effective reception power index, and receive data with greatly improved error rate characteristics can be obtained.

Control of the signal level of each antenna received signal is not limited to application to reception unit 3300 with the configuration shown in FIG. 33, but can be widely applied to cases where demodulation processing is performed using eigenvalues.

Embodiment 12

In this embodiment, a case is described in which the special feature of Embodiment 11 is applied to OFDM communications.

Figure 34:
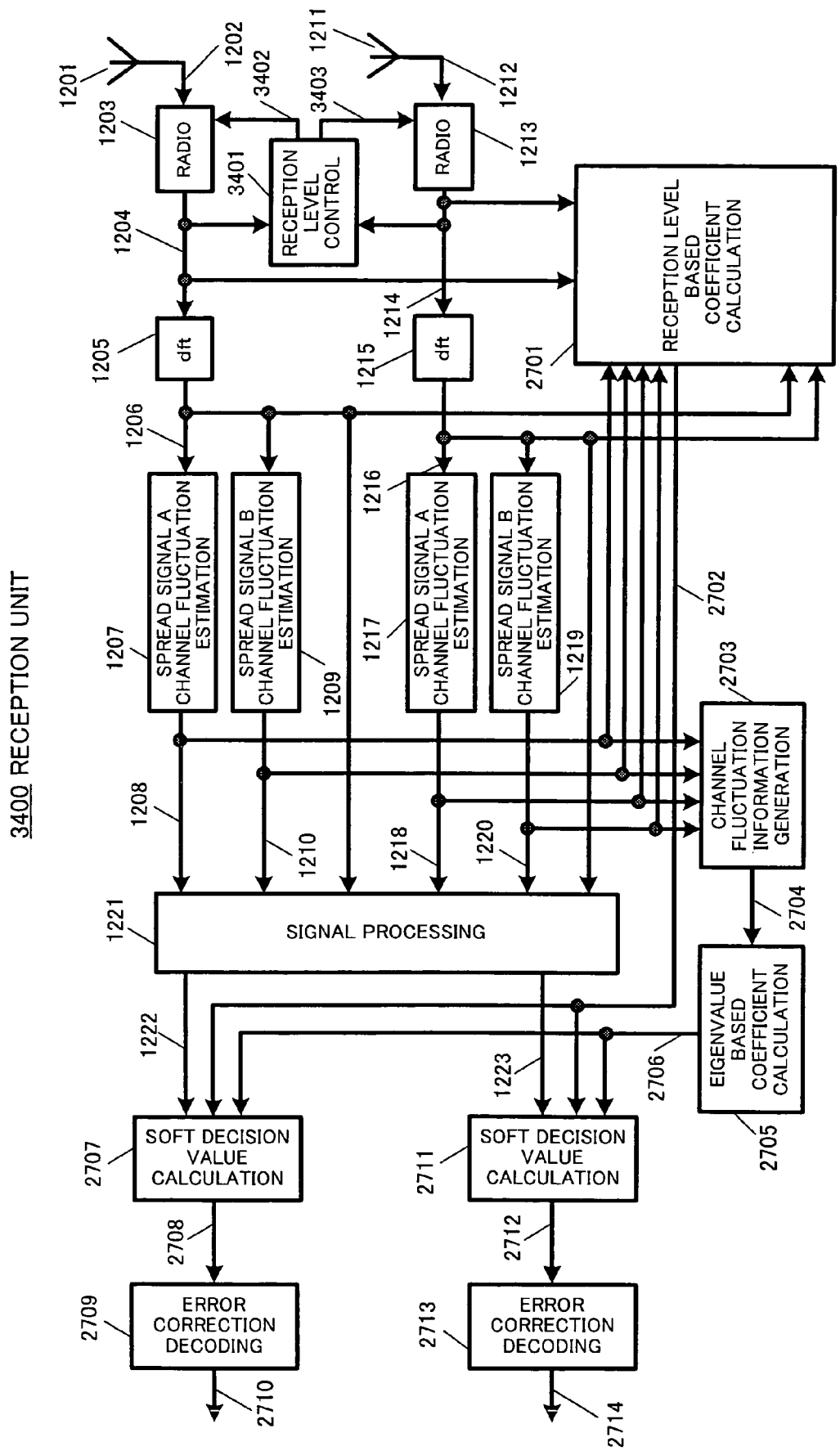
FIG. 34 is a block diagram showing a configuration of a reception unit of a receiving apparatus of Embodiment 12.

FIG. 34, in which parts corresponding to parts in FIG. 27 are assigned the same codes as in FIG. 27, shows the configuration of a reception unit 3400 of this embodiment. Except for the provision of a reception level control section 3401, reception unit 3400 has a similar configuration to reception unit 2700 in FIG. 27.

Reception level control section 3401 has received quadrature baseband signals 1204 and 1214 as input, detects the signal levels of these received quadrature baseband signals 1204 and 1214, and sends gain control signals 3402 and 3403 for equalizing the signal levels of received quadrature baseband signals 1204 and 1214 to radio sections 1203 and 1213. Radio sections 1203 and 1213 change the amplifier gain based on gain control signals 3402 and 3403.

By thus performing control in such a way that makes the signal levels of antenna received signals equal, the signal levels between the subcarriers corresponding to post-Fourier-transform signals 1206 and 1216 can also be made virtually equal. By this means, when modulation is performed using channel fluctuation matrix eigenvalues on a subcarrier-by-subcarrier basis, eigenvalues for each subcarrier can be made to reflect accurately per-subcarrier effective reception power.

Thus, according to this embodiment, in a receiving apparatus that performs demodulation processing using channel fluctuation matrix eigenvalues on a subcarrier-by-subcarrier basis, by detecting the signal level of each antenna received signal and equalizing the signal levels of the antenna received signals, the value of a per-subcarrier eigenvalue can be made a much more appropriate value for use as an effective reception power index, and OFDM receive data with greatly improved error rate characteristics can be obtained.

Embodiment 13

In this embodiment, it is proposed that space-time coded modulated signals be transmitted from a plurality of antennas, and received signals be demodulated on the receiving side using channel fluctuation matrix eigenvalues. In this embodiment, in particular, a receiving antenna is selected using channel fluctuation matrix eigenvalues, and received signal demodulation is performed using only the space-time coded signal received by the selected receiving antenna.

Space-time coding is a known technology, and is described, for example, in "Space-Time Block Codes from Orthogonal Design" IEEE Transactions on Information Theory, pp. 1456-1467, vol. 45, no. 5, July 1999.

Figure 35:
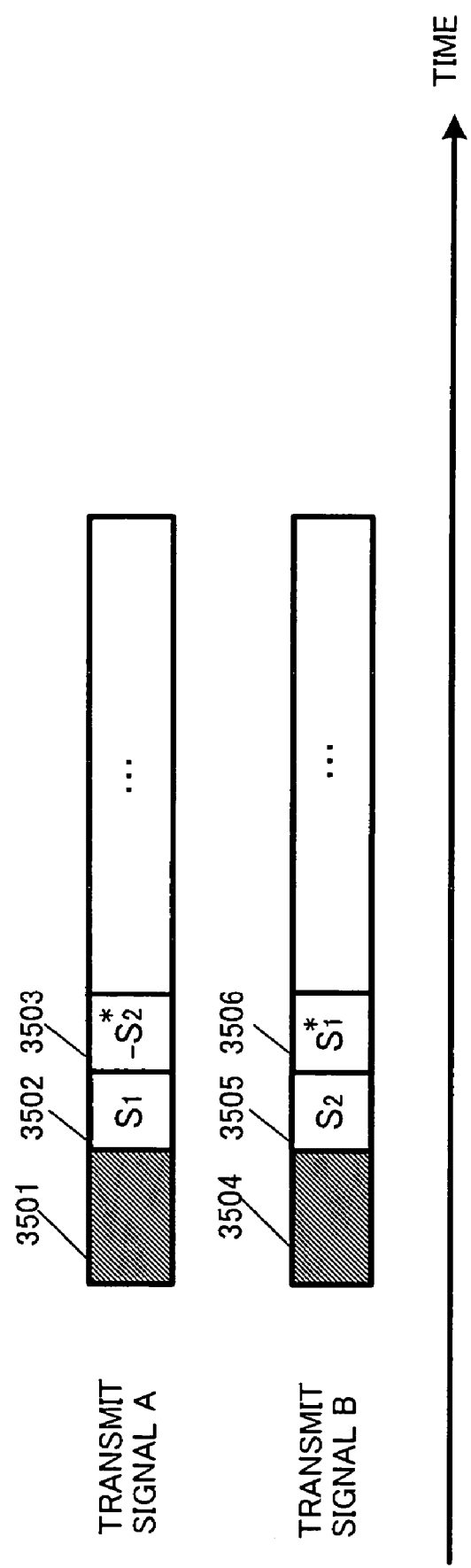
FIG. 35 is a drawing showing space-time code frame configurations.
Figure 36:
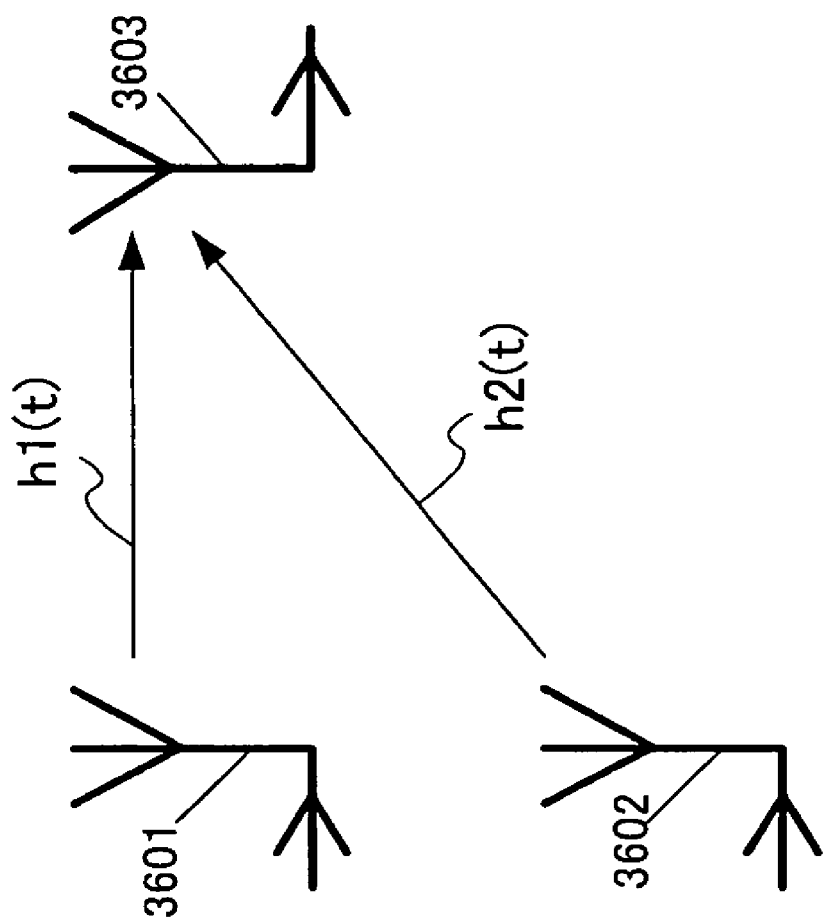
FIG. 36 is a drawing showing the relationship between transmitting antennas and a receiving antenna when using space-time-coding.

An overview of space-time coding will be given using FIG. 35 and FIG. 36. In a communication system that uses space-time coding, transmit signal A shown in FIG. 35 is transmitted from a transmitting antenna 3601, and at the same time, transmit signal B shown in FIG. 35 is transmitted from a transmitting antenna 3602. When this is done, transmit signal A and transmit signal B transmitted from transmitting antennas 3601 and 3602 are subjected to channel fluctuations h1(t) and h2(t) respectively, and are received by a receiving antenna 3603.

In FIG. 35, reference numerals 3501 and 3504 indicate radio wave propagation environment symbols, and reference numerals 3502, 3503, 3505, and 3506 indicate coded symbol groups. Also, S1 and S2 are assumed to be different signals, and signal S1 is sent in symbol group 3502, signal −S2*, which is the negative complex conjugate of signal S2, is sent in symbol group 3503, signal S2 is sent in symbol group 3505, and signal S1*, which is the complex conjugate of signal S1, is sent in symbol group 3506. An asterisk (*) here indicates a complex conjugate.

The relationship between signals S1 and S2 transmitted from transmitting antennas 3601 and 3602, and signals R1 and R2 received by receiving antenna 3603 can then be expressed by the following equation.

[Equation 9]

$$\begin{pmatrix} R1 \\ -R2^* \end{pmatrix} = \begin{pmatrix} h1 & h2 \\ -h2^* & h1^* \end{pmatrix} \begin{pmatrix} S1 \\ S2 \end{pmatrix} \quad (9)$$

In Equation (9), R1 is the received signal when symbol group 3502 and symbol group 3505 in FIG. 35 are received, and R2 is the received signal when symbol group 3503 and symbol group 3506 in FIG. 35 are received.

As can be seen from Equation (9), if this kind of space-time coding technology is used, transmit signals S1 and S2 to be found can be obtained by received signal maximal-ratio combining, and therefore a transmit signal can be estimated with good precision from a received signal. This concludes the overview of space-time coding technology.

Figure 37:
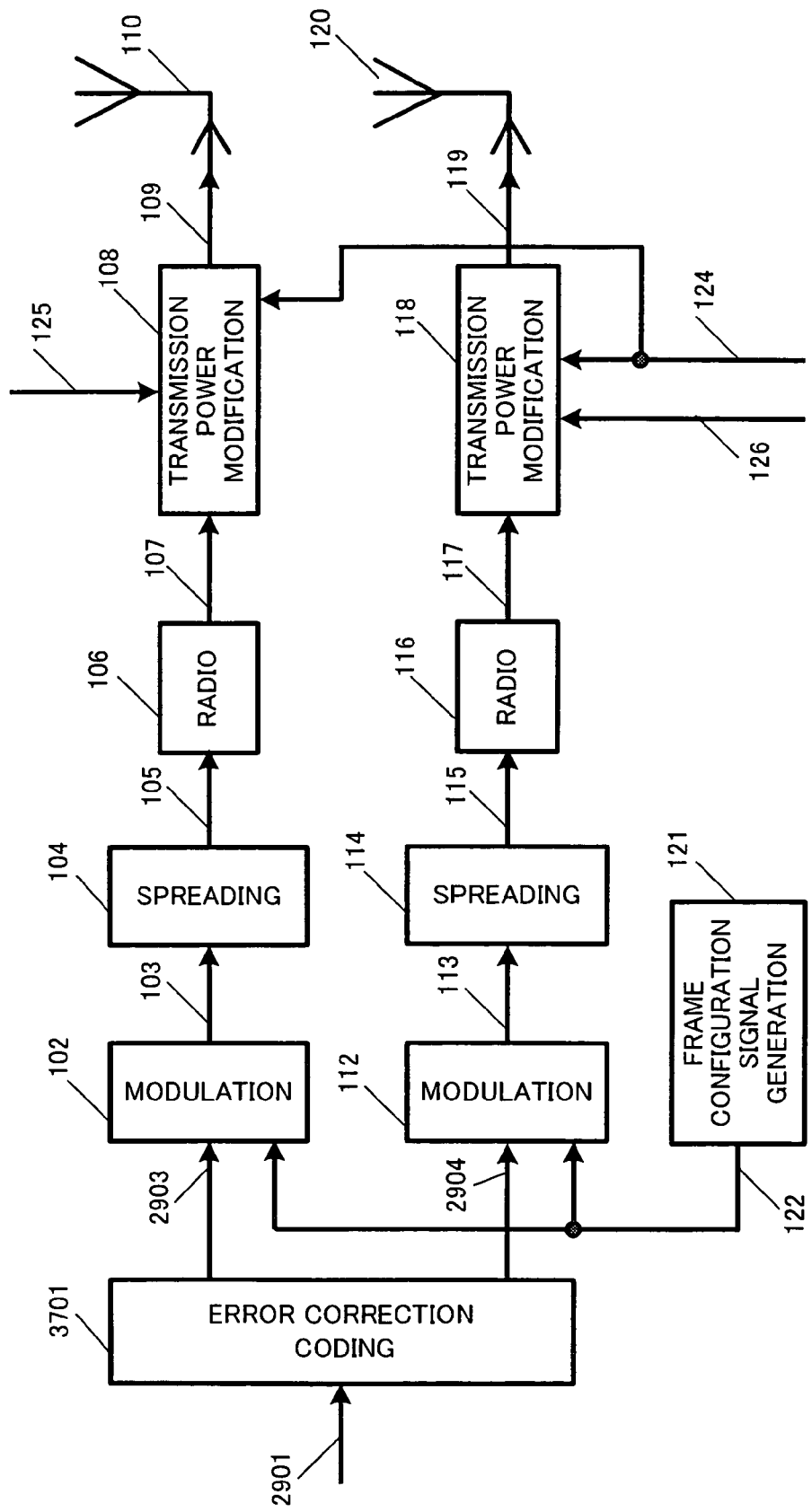
FIG. 37 is a block diagram showing a configuration of a transmission unit of a transmitting apparatus of Embodiment 13.

The configuration of this embodiment will now be described. FIG. 37, in which parts corresponding to parts in FIG. 29 described in Embodiment 9 are assigned the same codes as in FIG. 29, shows the configuration of a transmission unit 3700 of a transmitting apparatus according to this embodiment. The difference between transmission unit 2900 in FIG. 29 and transmission unit 3700 of this embodiment is that error correction coding section 3701 of transmission unit 3700 performs space-time coding processing on transmit digital signal 2901 and outputs the resulting signals. That is to say, error correction coding section 3701 performs coding processing so that the relationship between error correction coded signal 2903 and error correction coded signal 2904 is of the same kind as between transmit signal A and transmit signal B in FIG. 35. By this means, space-time coded signals are transmitted from antennas 110 and 120 of transmission unit 3700.

Figure 38:
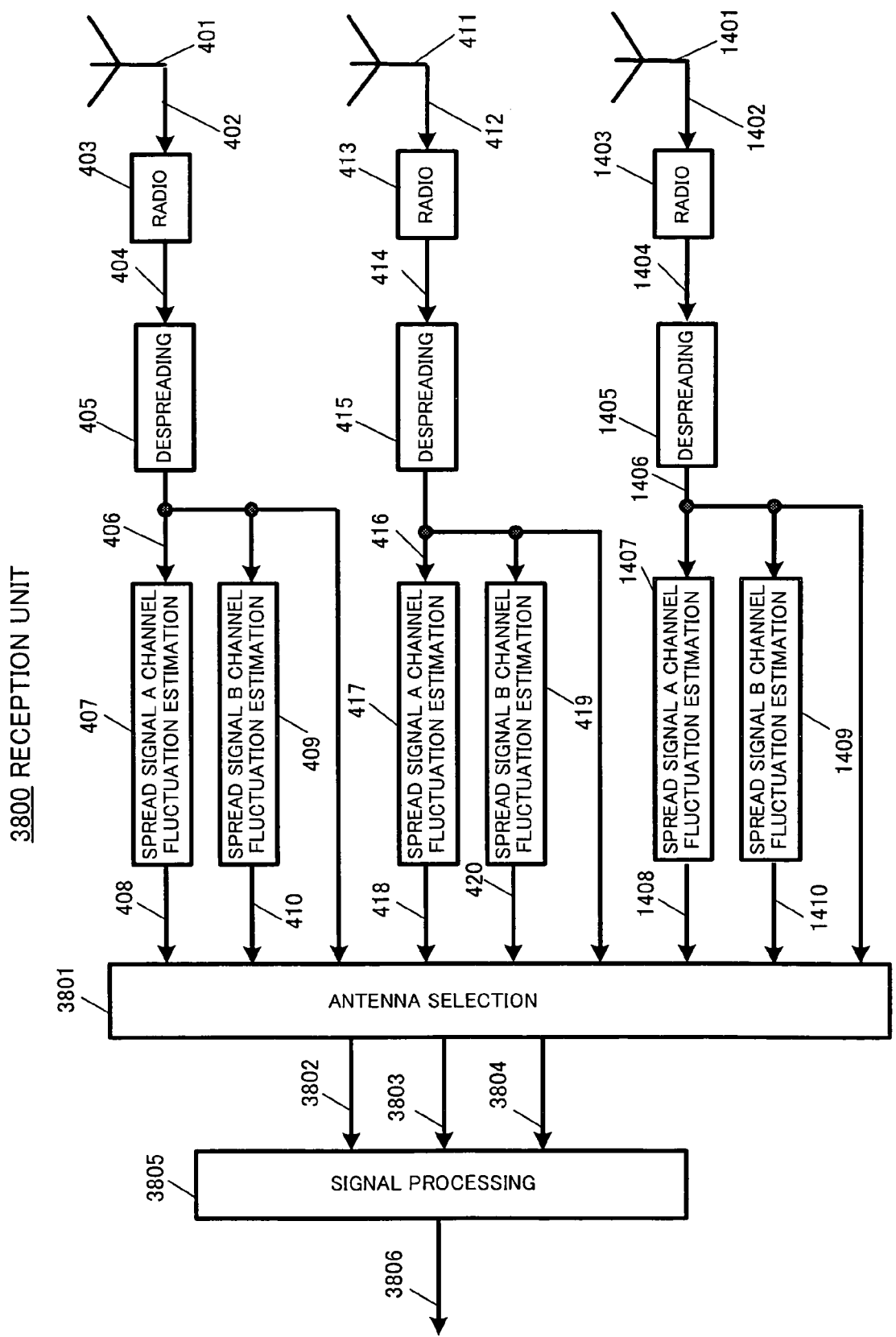
FIG. 38 is a block diagram showing a configuration of a reception unit of a receiving apparatus of Embodiment 13.

FIG. 38 shows a configuration of a reception unit 3800 that receives space-time coded signals transmitted from transmission unit 3700. Parts in FIG. 38 corresponding to those in FIG. 14 described in Embodiment 3 are assigned the same codes as in FIG. 14. The differences between reception unit 1400 in FIG. 14 and reception unit 3800 of this embodiment will be described here.

Antenna selection section 1411 of reception unit 1400 of Embodiment 3 creates two antenna received signal combinations from three antennas' received-signals 408, 410, 406, 418, 420, 416, 1408, 1410, and 1406 containing channel estimates, finds an eigenvalue for each combination, and selects two antennas' received signals of the combination for which the eigenvalue minimum power is greatest, and outputs these as selected signals 1412, 1413, 1414, 1415, 1416, and 1417.

In contrast to this, antenna selection section 3801 of reception unit 3800 of this embodiment finds an eigenvalue for each antenna received signal (that is, finds the Equation (9) eigenvalue for each antenna received signal) from three antennas' received signals 408, 410, 406, 418, 420, 416, 1408, 1410, and 1406 containing channel estimates, selects one antennas' received signals for which the eigenvalue minimum power is greatest, and outputs these as selected signals 3802, 3803, and 3804. The reason why it is possible to find an eigenvalue for the received signals of each antenna in this way is that a signal received at each antenna is a space-time coded signal and a channel estimation matrix as shown in Equation (9) is obtained only for one antenna's received signals.

Also, signal processing section 421 of reception unit 1400 of Embodiment 3 obtains two received quadrature baseband signals 422 and 423 by separating input two antennas' received signals 1412, 1413, 1414, 1415, 1416, and 1417 by means of the inverse matrix computation of Equation (3).

In contrast to this, signal processing section 3805 of reception unit 3800 of this embodiment obtains S1 and S2 received digital signal 3806 by performing maximal-ratio combining of input one antennas' received signals based on Equation (9).

Figure 39:
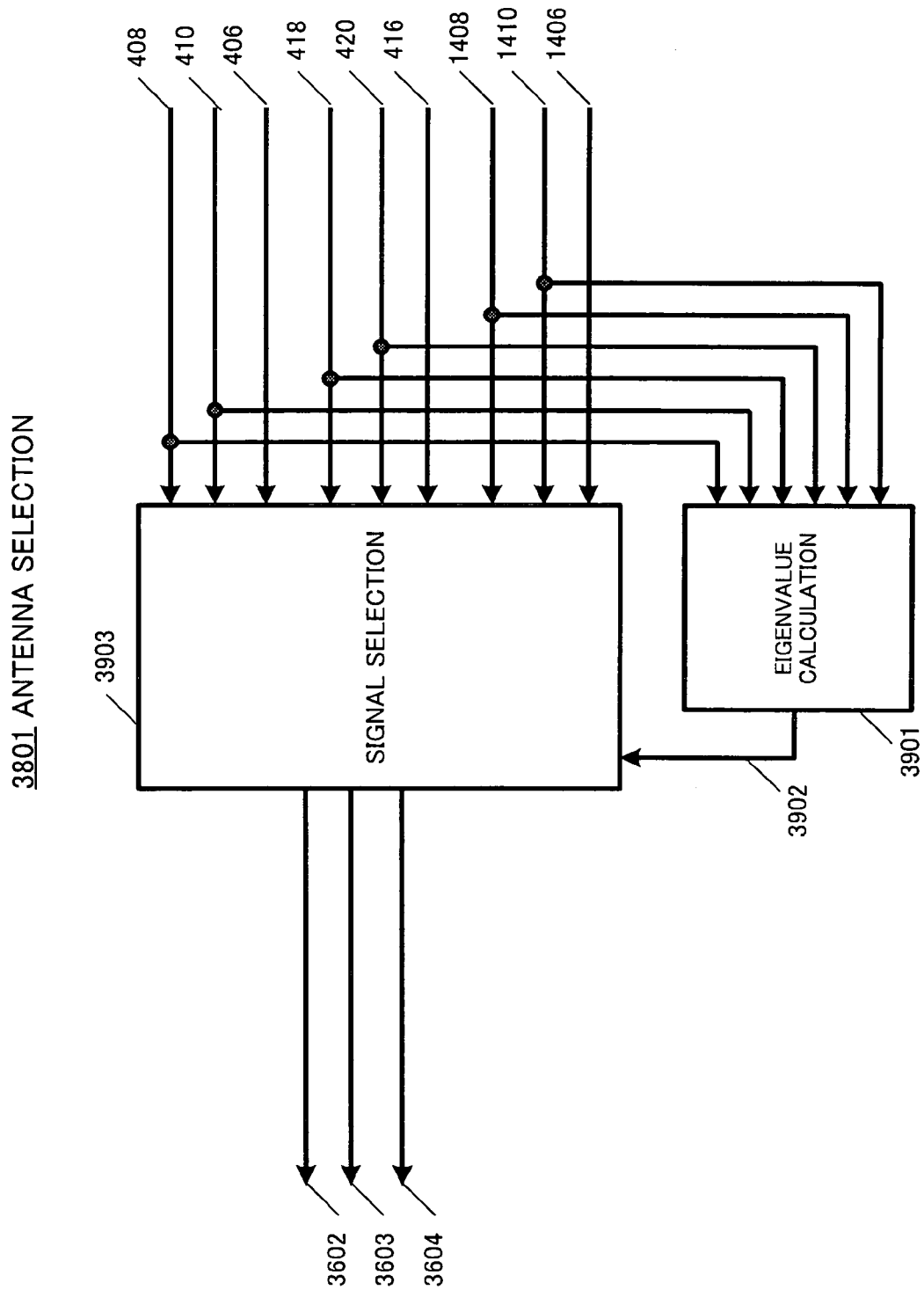
FIG. 39 is a block diagram showing a configuration of the antenna selection section in FIG. 38.

FIG. 39 shows the configuration of antenna selection section 3801. Antenna selection section 3801 has an eigenvalue calculation section 3901 and a signal selection section 3903. Eigenvalue calculation section 3901 has channel fluctuations 408 and 410, 418 and 420, and 1408 and 1410, obtained from the received signals of each antenna, as input. Eigenvalue calculation section 3901 finds an Equation (9) eigenvalue using channel fluctuations 408 and 410. Similarly, eigenvalue calculation section 3901 finds an Equation (9) eigenvalue using channel fluctuations 418 and 420, and finds an Equation (9) eigenvalue using channel fluctuations 1408 and 1410. The eigenvalue minimum powers are then compared, the antenna for which the eigenvalue minimum power is greatest is detected, and a control signal 3902 indicating that antenna is sent to signal selection section 3903.

Signal selection section 3903 outputs signals corresponding to the antenna indicate by control signal 3902 from among signals 408, 410, and 406 obtained from the antenna 401 received signal, signals 418, 420, and 416 obtained from the antenna 411 received signal, and signals 1408, 1410, and 1406 obtained from the antenna 1401 received signal, as selected signals 3602, 3603, and 3604.

The operation of reception unit 3800 of this embodiment will now be described. Reception unit 3800 receives space-time coded signals, transmitted from receiving antennas 110 and 120 (FIG. 37), by means of receiving antennas 401, 411, and 1401. Reception unit 3800 estimates channel fluctuation values h1(t) and h2(t) for each receiving antenna.

Reception unit 3800 then calculates the channel fluctuation matrix eigenvalue shown in Equation (9) for each receiving antenna from the channel fluctuation values of each receiving antenna by means of antenna selection section 3801. Antenna selection section 3801 selects the antenna received signals for which the eigenvalue minimum power is greatest. By this means, the antenna received signals for which the effective reception power is greatest are selected. Reception unit 3800 then obtains receive data by demodulating the selected antenna received signals.

Thus, according to this embodiment, in a receiving apparatus that receives at a plurality of antennas space-time coded signals transmitted from a plurality of antennas, by calculating channel fluctuation matrix eigenvalues of the space-time coded signals received by each antenna, selecting the antenna received signal for which the eigenvalue minimum power is greatest, and performing demodulation processing thereupon, it is possible to select the antenna received signal with the greatest effective reception power, enabling receive data with good error rate characteristics to be obtained.

In this embodiment, a case has been described in which the number of transmitting antennas is two, and the kind of space-time code shown in FIG. 35 is used, but the number of transmitting antennas is not limited to two, and the space-time code is not limited to that shown in FIG. 35.

Embodiment 14

In this embodiment, a case is described in which, as in Embodiment 13, when space-time coded modulated signals are transmitted from a plurality of antennas, channel fluctuation matrix eigenvalues are found for each antenna's received signals on the receiving side, and the antenna received signals for which the eigenvalue minimum power is greatest are selected and undergo demodulation. However, in this embodiment, a case is described in which the special feature of Embodiment 13 is applied to OFDM communications.

Figure 40:
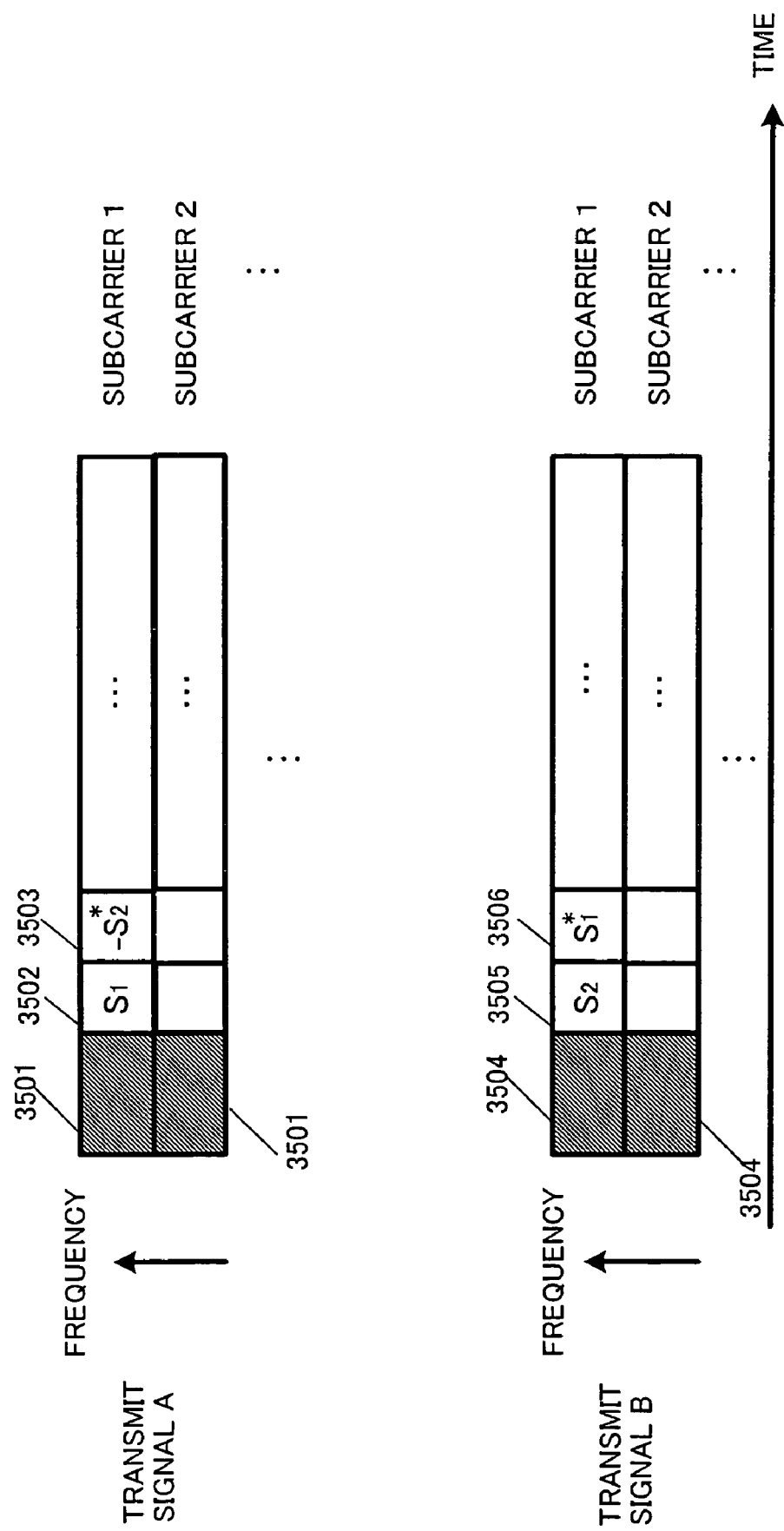
FIG. 40 is a drawing showing frame configurations when space-time code is OFDM modulated and transmitted.

FIG. 40 shows frame configurations when space-time code is OFDM modulated and transmitted. As can be seen by comparing FIG. 40 with FIG. 35, space-time code is arranged in carrier 1 of the same frequency band. Mutually corresponding codes are also similarly arranged in other carriers. Such transmit signals A and B can be formed by replacing spreading sections 104 and 114 in FIG. 37 with inverse discrete Fourier transform sections (idft's).

In a reception unit that receives signals with the kind of frames shown in FIG. 40, despreading sections 405, 415, and 1405 in FIG. 38 can be replaced by discrete Fourier transform sections (dft's), spread signal A channel fluctuation estimation sections 407, 417, and 1407 can be replaced by channel A channel fluctuation estimation sections, and spread signal B channel fluctuation estimation sections 409, 419, and 1409 can be replaced by channel B channel fluctuation estimation sections. It is assumed that the channel A channel fluctuation estimation sections estimate per-subcarrier channel fluctuation, and the channel B channel fluctuation estimation sections similarly estimate per-subcarrier channel fluctuation.

Antenna selection section 3801 can then calculate channel fluctuation matrix eigenvalues of space-time coded signals received at each antenna on a subcarrier-by-subcarrier basis, and select antenna received signals for which the eigenvalue minimum power is greatest on a subcarrier-by-subcarrier basis.

In this way, the antenna for which effective reception power is greatest can be selected on a subcarrier-by-subcarrier basis, enabling the optimal antenna to be selected for each subcarrier. As a result, error rate characteristics can be improved for all subcarriers.

Thus, according to this embodiment, in a receiving apparatus that receives at a plurality of antennas space-time coded OFDM modulated signals transmitted from a plurality of antennas, by calculating on a subcarrier-by-subcarrier basis channel fluctuation matrix eigenvalues of the space-time coded signals received by each antenna, selecting on a subcarrier-by-subcarrier basis the antenna received signal for which the eigenvalue minimum power is greatest, and performing demodulation processing thereupon, it is possible to select on a subcarrier-by-subcarrier basis the antenna received signal with the greatest effective reception power, enabling receive data with good error rate characteristics to be obtained across all subcarriers.

Figure 41:
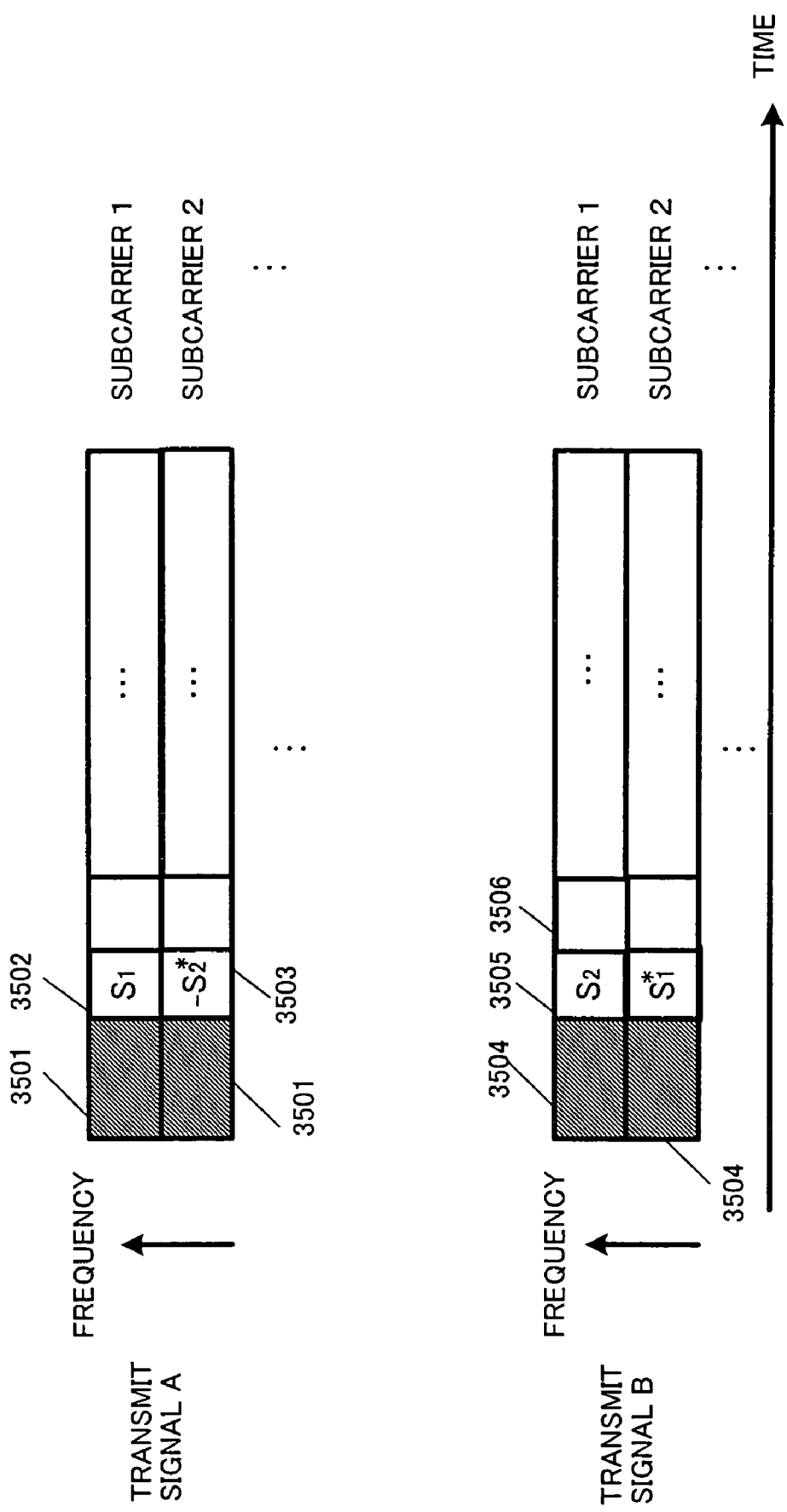
FIG. 41 is a drawing showing time-frequency coding frame configurations.

In this embodiment, the kind of frame configuration shown in FIG. 40 has been taken by way of example as the frame configuration used when space-time code is OFDM modulated and transmitted, but in a case where signals with the kind of frame configuration shown in FIG. 41 are received by a plurality of antennas, also, as long as an antenna is selected based on channel fluctuation matrix eigenvalues for each receiving antenna, antenna received signals for which the effective reception power is greatest can be selected in the same way as in the above embodiment, enabling the error rate characteristics of receive data to be improved. The coding shown in FIG. 41 is generally referred to as frequency-time coding as opposed to space-time coding.

That is to say, the eigenvalue-based receiving antenna selection method according to this embodiment is not limited to space-time coding, and the same kind of effect as in the above-described embodiment can also be obtained if the present invention is applied to space-frequency coding, or space-frequency-time coding in which space-time coding and space-frequency coding are performed simultaneously.

Embodiment 15

In above-described Embodiment 13, it was proposed that, when space-time coded received signals are received by a plurality of antennas, a receiving antenna be selected based on channel fluctuation matrix eigenvalues of each antenna's received signals (that is, only one receiving antenna be selected), and receive data be obtained by demodulating the signals obtained by the selected receiving antenna.

In contrast to this, in this embodiment a method and apparatus are proposed whereby, when space-time coded signals are received by a plurality of antennas, each antenna's received signals are weighted and combined based on channel fluctuation matrix eigenvalues of each antenna's received signals, and receive data is obtained by demodulating the weighted and combined received signals.

The eigenvalue-based antenna received signal weighting and combining method of this embodiment is similar to the combining method of above-described Embodiment 5. However, the combining method of this embodiment and the combining method of Embodiment 5 differ in the following respect.

In the combining method of Embodiment 5, a plurality of antenna received signal combinations are first created, a channel fluctuation matrix is created for each combination, and channel fluctuation matrix eigenvalues are calculated for each combination. Then, modulated signals are separated using the antenna received signals of each combination and the channel fluctuation matrix corresponding to that combination, and modulated signals separated in each combination are weighted and combined using the channel fluctuation estimation matrix eigenvalues used at the time of separation.

In contrast to this, in the combining method of this embodiment, a channel fluctuation matrix as shown in Equation (9) is created for each antenna's received signals, and an eigenvalue of the channel fluctuation matrix of each antenna's received signals is calculated. Each antenna's received signals are then weighted and combined based on these eigenvalues. In this kind of embodiment, antenna received signal combinations are not found as in Embodiment 5, but a channel fluctuation matrix is created individually for each antenna's received signals, and an eigenvalue is found individually for each antenna's received signals. This is possible because the received signals are space-time coded signals.

Figure 42:
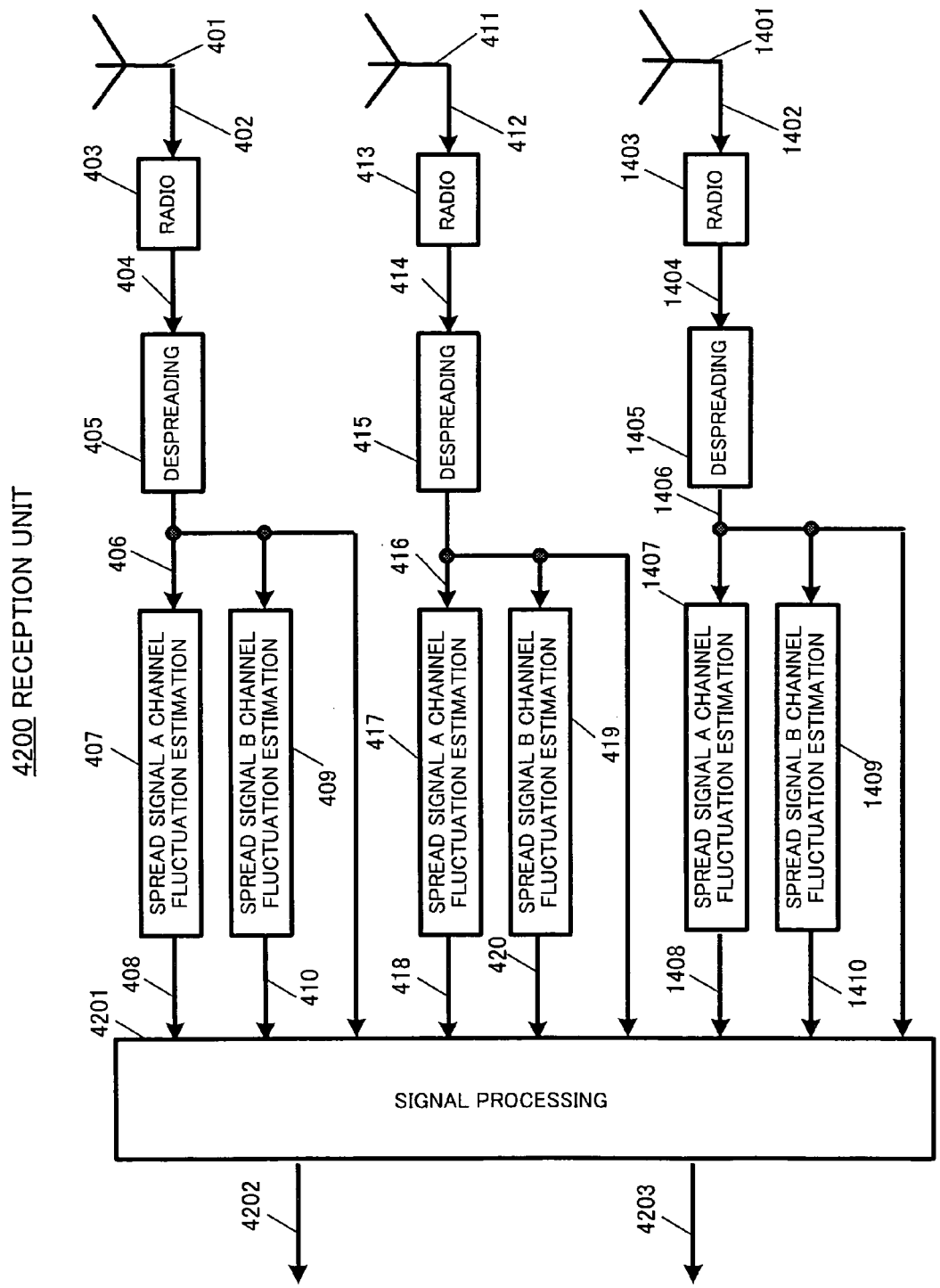
FIG. 42 is a block diagram showing a configuration of a reception unit of a receiving apparatus of Embodiment 15.

FIG. 42, in which parts corresponding to parts in FIG. 18 described in Embodiment 5 are assigned the same codes as in FIG. 18, shows the configuration of a reception unit 4200 according to this embodiment. The difference between reception unit 1800 in FIG. 18 and reception unit 4200 of this embodiment lies in the configuration of signal processing section 4201. Reception unit 4200 receives space-time coded signals as shown in FIG. 35 transmitted from transmission unit 3700 shown in FIG. 37.

Figure 43:
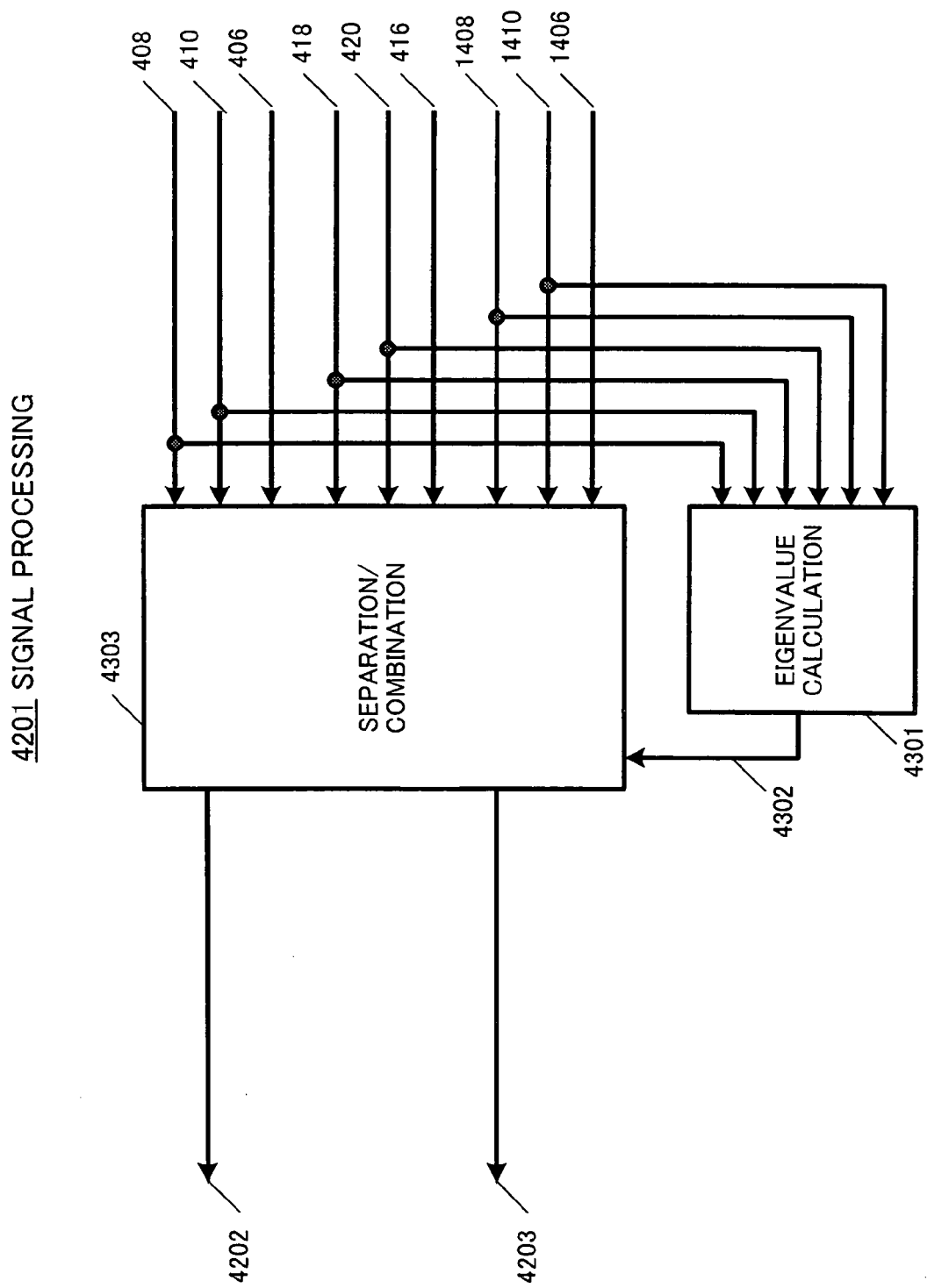
FIG. 43 is a drawing showing a configuration of the signal processing section in FIG. 42.

FIG. 43 shows the configuration of signal processing section 4201. Signal processing section 4201 has an eigenvalue calculation section 4301 and a combining section 4303. Eigenvalue calculation section 4301 has channel fluctuations 408 and 410, 418 and 420, and 1408 and 1410, obtained from the received signals of each antenna, as input. Eigenvalue calculation section 4301 finds an Equation (9) eigenvalue using channel fluctuations 408 and 410. Similarly, eigenvalue calculation section 4301 finds an Equation (9) eigenvalue using channel fluctuations 418 and 420, and finds an Equation (9) eigenvalue using channel fluctuations 1408 and 1410. Eigenvalue calculation section 4301 then finds for each antenna the value with the minimum eigenvalue power from among the eigenvalues found for each antenna, and outputs the results as eigenvalue powers P1, P2, and P3 of each antenna's received signals. That is to say, eigenvalue calculation section 4301 outputs eigenvalue powers P1, P2, and P3 for each of antennas 1401, 411, and 1401 as an eigenvalue estimation signal 4302.

Combining section 4303 applies input signals 408, 410, and 406 to Equation (9), and by performing Equation (9) inverse matrix computation, finds spread signal A received quadrature baseband signal Ra1 and spread signal B received quadrature baseband signal Rb1. Similarly, combining section 4303 applies input signals 418, 420, and 416 to Equation (9), and by performing Equation (9) inverse matrix computation, finds spread signal A received quadrature baseband signal Ra2 and spread signal B received quadrature baseband signal Rb2. Similarly, combining section 4303 applies input signals 1408, 1410, and 1406 to Equation (9), and by performing Equation (9) inverse matrix computation, finds spread signal A received quadrature baseband signal Ra3 and spread signal B received quadrature baseband signal Rb3.

Next, combining section 4303 weights and combines these spread signal A received quadrature baseband signals Ra1, Ra2, and Ra3, and spread signal B received quadrature baseband signals Rb1, Rb2, and Rb3, using eigenvalue powers P1, P2, and P3 of each antenna. Specifically, if spread signal A received quadrature baseband signal after weighting and combining 4202 is designated Ra and spread signal B received quadrature baseband signal after weighting and combining 4203 is designated Rb, then Ra and Rb are given by the following equations.

[Equations 10]

$$Ra = \frac{1}{3(P1+P2+P3)}(P1 \times Ra1 + P2 \times Ra2 + P3 \times Ra3) \quad (10)$$

$$Rb = \frac{1}{3(P1+P2+P3)}(P1 \times Rb1 + P2 \times Rb2 + P3 \times Rb3)$$

By weighting and combining each antenna's received signals according to eigenvalue power on an antenna-by-antenna basis in this way, accurate spread signal A and B received quadrature baseband signals can be obtained. This is because the channel fluctuation matrix eigenvalue power of each antenna's received signals is a value corresponding to the effective reception power of each antenna's received signals.

Spread signal A received quadrature baseband signal 4202 and spread signal B received quadrature baseband signal 4203 obtained by signal processing section 4201 are demodulated and decoded by demodulation units (not shown), to become received digital signals.

By this means, data can be demodulated using spread signal A and B received quadrature baseband signals 4202 and 4203 with large effective reception power, enabling received digital signals with improved error rate characteristics to be obtained.

Thus, according to this embodiment, in a receiving apparatus that receives at a plurality of antennas space-time coded signals transmitted from a plurality of antennas, by calculating channel fluctuation matrix eigenvalues of the space-time coded signals received by each antenna, and weighting and combining each antenna's received signals using per-antenna eigenvalue power, it is possible to obtain received signals with large effective reception power, enabling receive data with good error rate characteristics to be obtained.

In this embodiment a method has been described whereby channel fluctuation matrix eigenvalue power is used as a weighting coefficient, and received quadrature baseband signals are weighted and combined using this coefficient, but the present invention is not limited to this.

For example, channel fluctuation matrix eigenvalue power described in this embodiment may also be used as a weighting coefficient for MLD (Maximum Likelihood Detection) shown in "A simple transmit diversity technique for wireless communications" IEEE Journal on Select Areas in Communications, vol. 16, no. 8, October 1998. Use of channel fluctuation matrix eigenvalue power as a weighting coefficient in demodulation and decoding when performing MLD improves reception quality. This also applies to Embodiment 16 described below.

Embodiment 16

In this embodiment, a case is described in which, as in Embodiment 15, when space-time coded modulated signals are transmitted, channel fluctuation matrix eigenvalues are found for each antenna's received signals on the receiving side, and the antenna received signals for which the eigenvalue minimum power is greatest are selected and undergo demodulation. However, in this embodiment, a case is described in which the special feature of Embodiment 15 is applied to OFDM communications.

That is to say, a receiving apparatus of this embodiment receives signals with the frame configurations shown in FIG. 40. In the reception unit of a receiving apparatus of this embodiment, despreading sections 405, 415, and 1405 in FIG. 42 can be replaced by discrete Fourier transform sections (dft's), spread signal A channel fluctuation estimation sections 407, 417, and 1407 can be replaced by channel A channel fluctuation estimation sections, and spread signal B channel fluctuation estimation sections 409, 419, and 1409 can be replaced by channel B channel fluctuation estimation sections. It is assumed that the channel A channel fluctuation estimation sections estimate per-subcarrier channel fluctuation, and the channel B channel fluctuation estimation sections similarly estimate per-subcarrier channel fluctuation.

Signal processing section 4201 then calculates channel fluctuation matrix eigenvalues of space-time coded signals received at each antenna on a subcarrier-by-subcarrier basis, and performs weighting and combining using eigenvalue power described in Embodiment 15 as a weight coefficient on a subcarrier-by-subcarrier basis.

In this way, by performing combining of each antenna's received signals with eigenvalue power as a weight coefficient on a carrier-by-carrier basis, error rate characteristics can be improved across all carriers even when effective reception power differs greatly from carrier to carrier due to the effects of frequency selective fading, etc.

Thus, according to this embodiment, when space-time coded OFDM signals are received at a plurality of antennas, by performing processing whereby received signals obtained at each receiving antenna are weighted and combined based on channel fluctuation matrix eigenvalues, as described in Embodiment 15, for each carrier, it is possible to implement a receiving apparatus that enables the error rate characteristics of received space-time coded OFDM signals to be improved across all carriers.

Embodiment 17

In this embodiment, receiving-side demodulation processing is described for a case where convolutional coded signals further undergo space-time block coding and are transmitted from a plurality of antennas.

Figure 44:
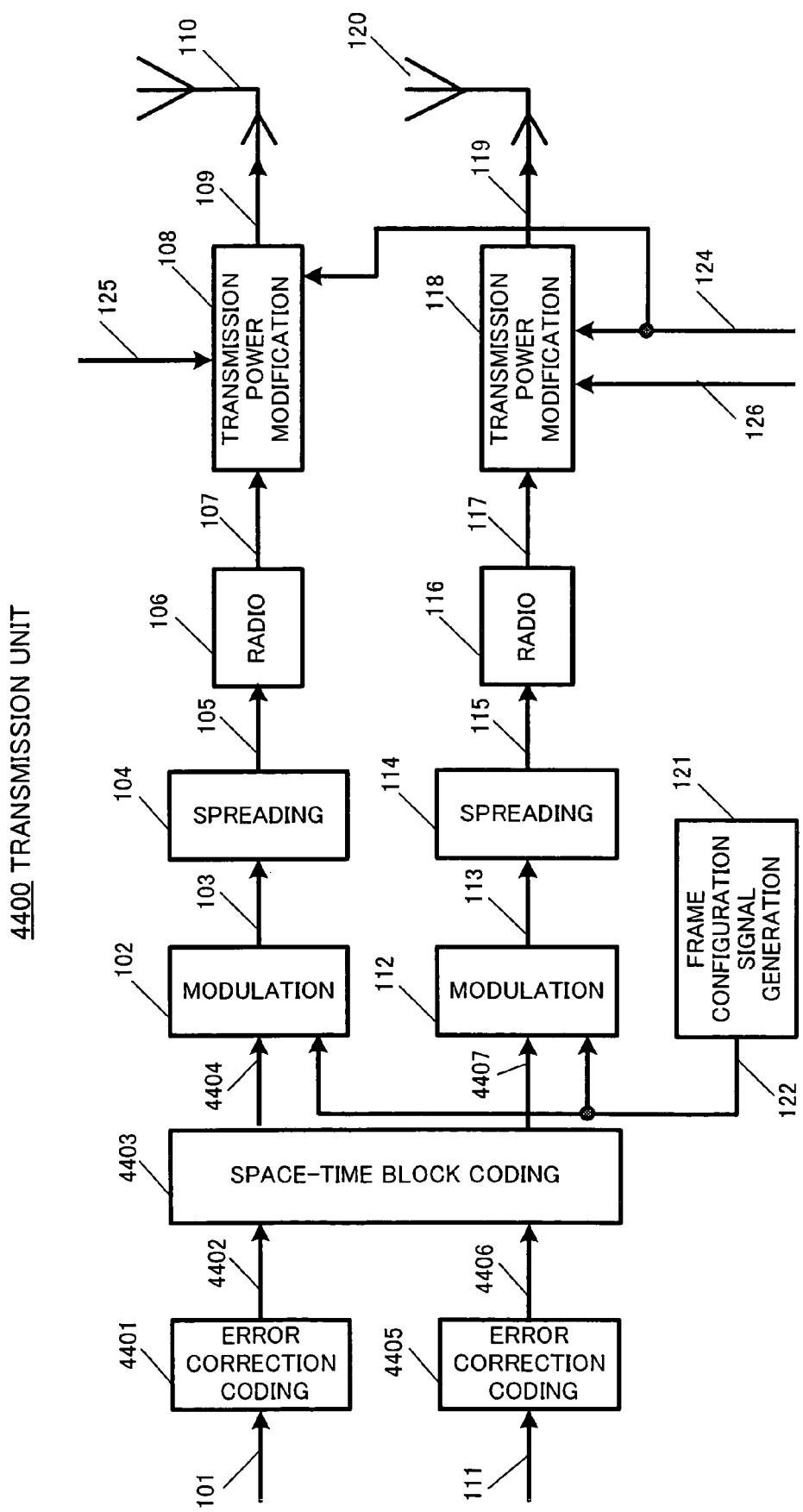
FIG. 44 is a block diagram showing a configuration of a transmission unit of a transmitting apparatus of Embodiment 17.

FIG. 44, in which parts corresponding to parts in FIG. 1 described in Embodiment 1 are assigned the same codes as in FIG. 1, shows the configuration of a transmission unit 4400 of a transmitting apparatus of this embodiment. Error correction coding sections 4401 and 4405 of transmission unit 4400 have digital signals 101 and 111 as input respectively, execute convolutional coding, for example, and send coded digital signals 4402 and 4406 to a space-time block coding section 4403.

Space-time block coding section 4403 has coded digital signals 4402 and 4406 as input, and by executing space-time block coding as shown in Equation (9) on these coded digital signals 4402 and 4406, outputs modulated signal A transmit digital signal 4404 (corresponding to transmit signal A in FIG. 35) and modulated signal B transmit digital signal 4407 (corresponding to transmit signal B in FIG. 35) with the frame configurations shown in FIG. 35.

The kind of space-time block coding method in Equation (9) is shown in "A Simple Transmit Diversity Technique for Wireless Communications" IEEE Journal on Select Areas in Communications, vol. 16, no. 8, October 1998. Here, a case in which the number of transmitting antennas is two and the number of transmitted modulated signals is two is described by way of example, but the present invention is not limited to this case, and a space-time block coding method in which the number of transmitting antennas is increased is also shown in "Space-Time Block Codes from Orthogonal Design" IEEE Transactions on Information theory, pp. 1456-1467, vol. 45, no. 5, July 1999, etc. Error correction coding such as convolutional coding is executed on each modulated signal.

Figure 45:
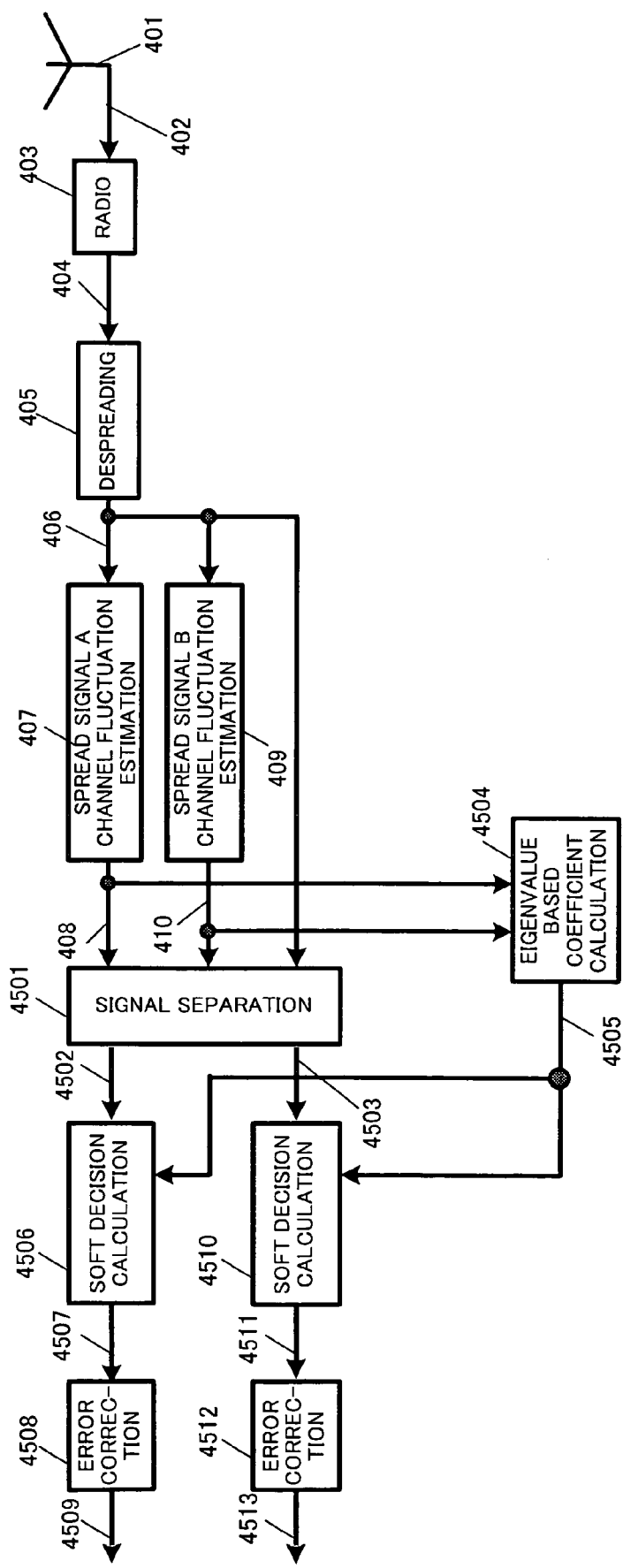
FIG. 45 is a block diagram showing a configuration of a reception unit of a receiving apparatus of Embodiment 17.

FIG. 45, in which parts corresponding to parts in FIG. 4 are assigned the same codes as in FIG. 4, shows the configuration of the reception unit 4500 of a receiving apparatus of this embodiment. Signal separation section 4501 of reception unit 4500 has spread signal A channel fluctuation estimation signal 408 (corresponding to h1 of Equation (9)), spread signal B channel fluctuation estimation signal 410 (corresponding to h2 of Equation (9)), and despread received quadrature baseband signal 406 (corresponding to R1, R2 of Equation (9)), as input, and by performing Equation (9) inverse matrix computation, finds baseband signal 4502 (baseband estimation signal corresponding to S1 in Equation (9)) and baseband signal 4503 (baseband estimation signal corresponding to S2 in Equation (9)), which it outputs.

An eigenvalue calculation section 4504 has spread signal A channel fluctuation estimation signal 408 and spread signal B channel fluctuation estimation signal 410 as input, creates an Equation (9) matrix using these, calculates an eigenvalue of that matrix, and outputs eigenvalue signal 4505.

Soft decision calculation section 4506 has baseband signal 4502 and eigenvalue signal 4505 as input, and finds a soft decision value as shown in Equation (5) in the same way as in Embodiment 7. At this time, a soft decision value 4507 is found using a coefficient found from eigenvalue signal 4505—for example, eigenvalue minimum power—for weighting coefficient Ca(t)×D(t) in Equation (5), and this soft decision value 4507 is output. Error correction section 4508 has soft decision value 4507 as input, executes error correction decoding processing on soft decision value 4507, and outputs received digital signal 4509 obtained by this means.

Similarly, soft decision calculation section 4510 has baseband signal 4503 and eigenvalue signal 4505 as input, and finds a soft decision value as shown in Equation (6) in the same way as in Embodiment 7. At this time, a soft decision value 4511 is found using a coefficient found from eigenvalue signal 4505—for example, eigenvalue minimum power—for weighting coefficient Cb(t)×D(t) in Equation (6), and this soft decision value 4511 is output. Error correction section 4512 has soft decision value 4511 as input, executes error correction decoding processing on soft decision value 4511, and outputs received digital signal 4513 obtained by this means.

Thus, according to this embodiment, in a receiving apparatus that receives transmit signals combining convolutional code and space-time code, by weighting received signal soft decision values using space-time code channel fluctuation matrix eigenvalues, it is possible to give a soft decision value an appropriate likelihood based on effective reception power, enabling the error rate characteristics of decoded receive data to be improved.

That is to say, according to this embodiment, it has been shown that receive data error rate characteristics can also be improved in a case where convolutional coding and space-time block coding are combined, if soft decision values are weighted using eigenvalues in the same way as in Embodiment 7.

The method whereby soft decision values are weighted using channel fluctuation matrix eigenvalues according to the present invention is not limited to Embodiment 7 or this embodiment, but can be widely applied to cases where processing is performed that separates multiplexed modulated signals by means of computation using channel fluctuation matrices, convolutional coding or the like is further executed, and soft decision decoding is carried out.

Embodiment 18

In above-described Embodiment 5, it was proposed that a plurality of antenna received signal combinations be created, a channel fluctuation matrix be created for each combination, channel fluctuation matrix eigenvalues be calculated for each combination, and modulated signals be separated using the antenna received signals of each combination and the channel fluctuation matrix corresponding to that combination, and also that modulated signals separated in each combination be weighted and combined using the channel fluctuation estimation matrix eigenvalues used at the time of separation.

In contrast to this, while this embodiment is the same as Embodiment 5 in that a plurality of antenna received signal combinations are created, a channel fluctuation matrix is created for each combination, channel fluctuation matrix eigenvalues are calculated for each combination, and modulated signals are separated using the antenna received signals of each combination and the channel fluctuation matrix corresponding to that combination, this embodiment differs from Embodiment 5 in that the Euclidian distances (branch metric) between reception points of modulated signals separated in each combination and candidate points are weighted and combined using the channel fluctuation matrix eigenvalues used at the time of separation, and soft decision values after weighting and combining are determined.

In this embodiment, a case is described in which signals with the frame configurations shown in FIG. 3, transmitted from transmission unit 100 with the configuration shown in FIG. 1, are received.

The reception unit of this embodiment has the same configuration as reception unit 1800 in FIG. 18 described in Embodiment 5, except for the configuration of signal processing section 1801 of reception unit 1800. In this embodiment, therefore, only the configuration of the signal processing section will be described.

Figure 46:
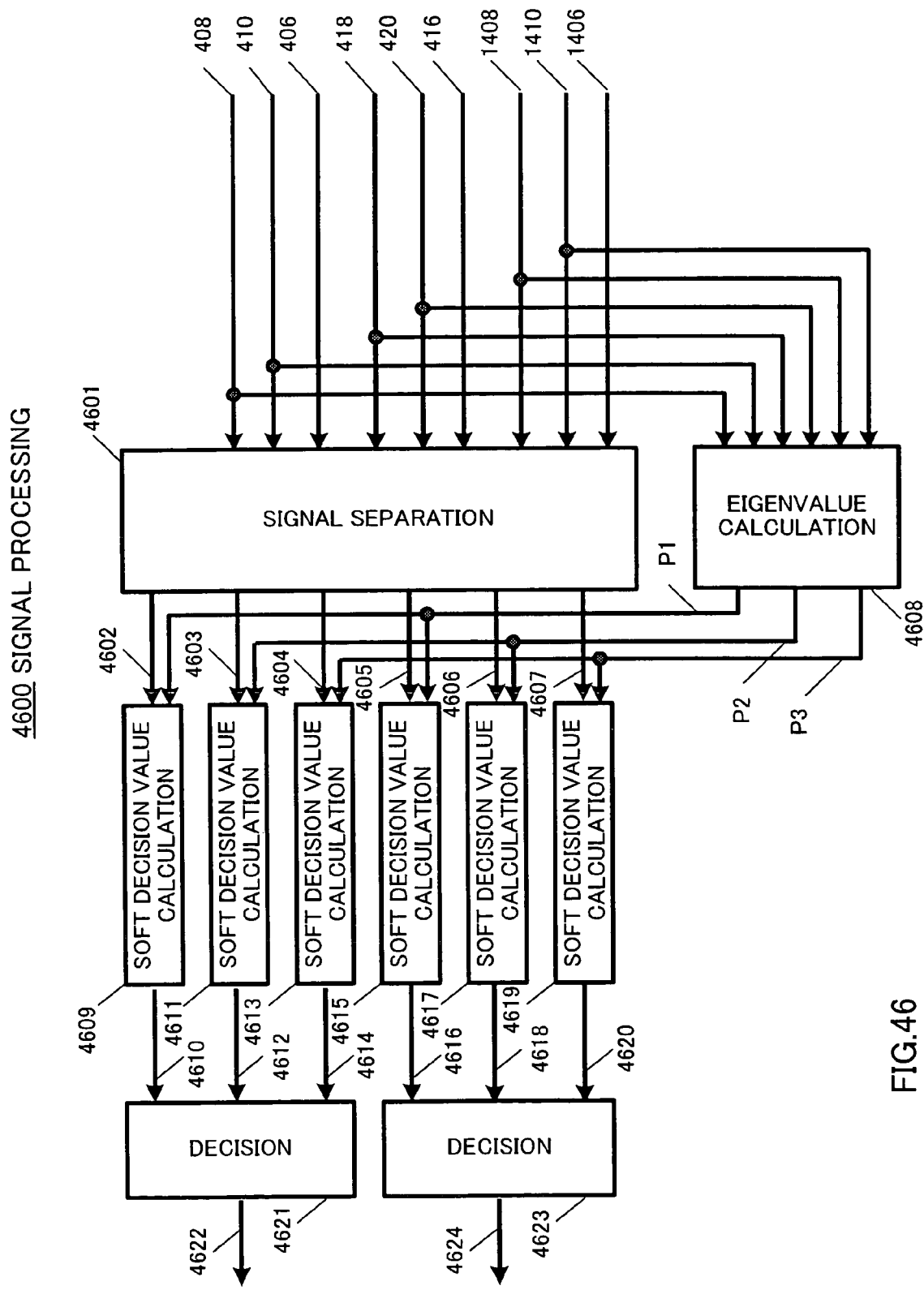
FIG. 46 is a block diagram showing a configuration of a signal processing section of Embodiment 18.

FIG. 46 shows the configuration of a signal processing section 4600 according to this embodiment. In the reception unit of this embodiment, signal processing section 1801 of reception unit 1800 in FIG. 18 is replaced by signal processing section 4600 in FIG. 46.

Eigenvalue calculation section 4608 of signal processing section 4600 applies channel fluctuation estimation signals 408, 410, 418, and 420 as a first group to an Equation (3) matrix, finds value P1 with the smallest matrix eigenvalue power, and outputs this eigenvalue power P1. Similarly, eigenvalue calculation section 4608 applies channel fluctuation estimation signals 408, 410, 1408, and 1410 as a second group to an Equation (3) matrix, finds value P2 with the smallest matrix eigenvalue power, and outputs this eigenvalue power P2. Similarly, eigenvalue calculation section 4608 applies channel fluctuation estimation signals 418, 420, 1408, and 1410 as a third group to an Equation (3) matrix, finds value P3 with the smallest matrix eigenvalue power, and outputs this eigenvalue power P3.

A signal separation section 4601 applies signals 408, 410, 406, 418, 420, and 416 to Equation (3) as a first group, and by performing this inverse matrix computation, finds spread signal A received quadrature baseband signal 4602 (Ra1) and spread signal B received quadrature baseband signal 4605 (Rb1), and outputs these signals 4602 and 4605. Similarly, signal separation section 4601 applies signals 408, 410, 406, 1408, 1410, and 1406 to Equation (3) as a second group, and by performing this inverse matrix computation, finds spread signal A received quadrature baseband signal 4603 (Ra2) and spread signal B received quadrature baseband signal 4606 (Rb2), and outputs these signals 4603 and 4606. Similarly, signal separation section 4601 applies signals 418, 420, 416, 1408, 1410, and 1406 to Equation (3) as a third group, and by performing this inverse matrix computation, finds spread signal A received quadrature baseband signal 4604 (Ra3) and spread signal B received quadrature baseband signal 4607 (Rb3), and outputs these signals 4604 and 4607.

Soft decision value calculation section 4609 has spread signal A received quadrature baseband signal 4602 (Ra1) and eigenvalue power signal (P1) as input, finds soft decision value 4610 by weighting received quadrature baseband signal 4602 (Ra1) with eigenvalue power signal (P1), and outputs this soft decision value 4610. The operation at this time will be described using FIG. 47.

Figure 47:
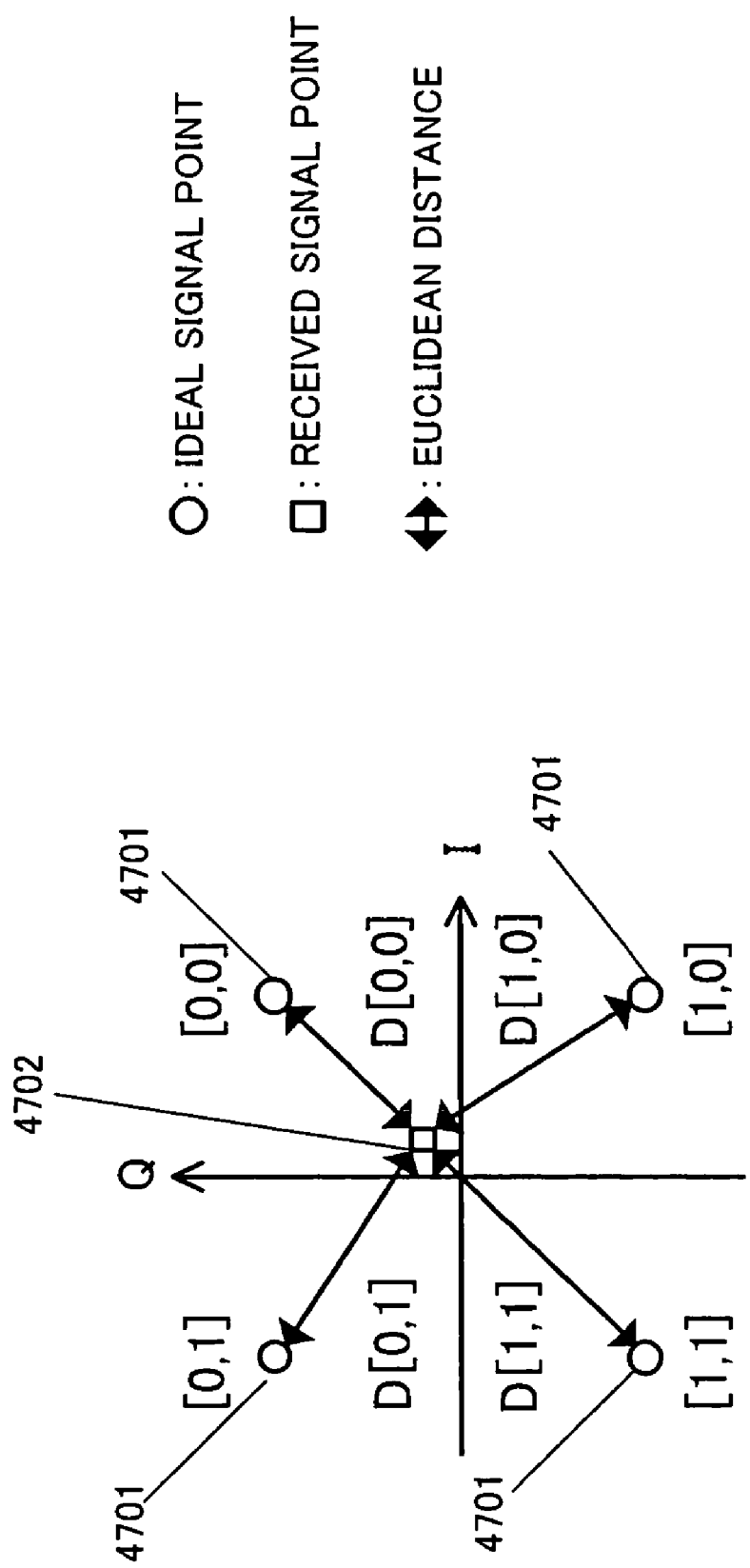
FIG. 47 is a drawing provided for explanation of calculation of Euclidian distance between a reception point and candidate point.

FIG. 47 is a drawing showing the QPSK signal point arrangement in the in-phase I-orthogonal Q plane, in which reference numeral 4701 indicates QPSK signal points, and [0,0], [0,1], [1,0], and [1,1] indicate transmit bits. Reference numeral 4702 indicates the position of a received quadrature baseband signal, and here shows the position of spread signal A received quadrature baseband signal 4602 (Ra1). The Euclidian distances between QPSK signal points 4701 and received quadrature baseband signal 4602 (Ra1) are designated D1[0,0], D1[0,1], D1[1,0], and D1[1,1]. Soft decision value calculation section 4609 finds $P1 \times D1^2[0,0]$, $P1 \times D1^2[0,1]$, $P1 \times D1^2[1,0]$, and $P1 \times D1^2[1,1]$, and outputs these as soft decision value signal 4610.

Similarly, soft decision value calculation section 4611 has spread signal A received quadrature baseband signal 4603 (Ra2) and eigenvalue power signal (P2) as input, finds soft decision value 4612 by weighting received quadrature baseband signal 4603 (Ra2) with eigenvalue power signal (P2), and outputs this soft decision value 4612. Actually, if the Euclidian distances between QPSK signal points 4701 and received quadrature baseband signal 4603 (Ra2) in FIG. 47 are designated D2[0,0], D2[0,1], D2[1,0], and D2[1,1], soft decision value calculation section 4611 finds $P2 \times D2^2[0,0]$, $P2 \times D2^2[0,1]$, $P2 \times D2^2[1,0]$, and $P2 \times D2^2[1,1]$, and outputs these as soft decision value signal 4612.

Similarly, soft decision value calculation section 4613 has spread signal A received quadrature baseband signal 4604 (Ra3) and eigenvalue power signal (P3) as input, finds soft decision value 4614 by weighting received quadrature baseband signal 4604 (Ra3) with eigenvalue power signal (P3), and outputs this soft decision value 4614. Actually, if the Euclidian distances between QPSK signal points 4701 and received quadrature baseband signal 4604 (Ra3) in FIG. 47 are designated D3[0,0], D3[0,1], D3[1,0], and D3[1,1], soft decision value calculation section 4613 finds $P3 \times D3^2[0,0]$, $P3 \times D3^2[0,1]$, $P3 \times D3^2[1,0]$, and $P3 \times D3^2[1,1]$, and outputs these as soft decision value signal 4614.

Thus, soft decision value calculation sections 4609, 4611, and 4613 perform computations whereby the Euclidian distances between the reception points of modulated signals separated in each combination and candidate points are weighted using the channel fluctuation matrix eigenvalues used at the time of separation.

Decision section 4621 has soft decision value signals 4610, 4612, and 4614 as input, and finds $P1 \times D1^2[0,0]+P2 \times D2^2[0,0]+P3 \times D3^2[0,0]$, $P1 \times D1^2[0,1]+P2 \times D2^2[0,1]+P3 \times D3^2[0,1]$, $P1 \times D1^2[1,0]+P2 \times D2^2[1,0]+P3 \times D3^2[1,0]$, and $P1 \times D1^2[1,1]+P2 \times D2^2[1,1]+P3 \times D3^2[1,1]$. Then decision section 4621 searches for the smallest of the four values obtained, and, if, for example, $P1 \times D1^2[0,0]+P2 \times D2^2[0,0]+P3 \times D3^2[0,0]$ is the smallest value, decides that the transmit bits are [0,0], and outputs this as received digital signal 4622.

The soft decision value calculations and decision operation for spread signal A by soft decision value calculation sections 4609, 4611, and 4613 and decision section 4621 have been described above. For spread signal B, the same kind of soft decision value calculations and decision operation are performed by soft decision value calculation sections 4615, 4617, and 4619, and decision section 4623, and received digital signal 4624 is obtained.

Thus, according to this embodiment, by creating a plurality of antenna received signal combinations, creating a channel fluctuation matrix for each combination, calculating channel fluctuation matrix eigenvalues for each combination, separating modulated signals using the antenna received signals of each combination and the channel fluctuation matrix corresponding to that combination, weighting and combining the Euclidian distances (branch metric) between reception points of modulated signals separated in each combination and candidate points using the channel fluctuation matrix eigenvalues used at the time of separation, and taking the candidate signal point for which the Euclidian distance is smallest as a reception point, bit decision processing can be performed in which likelihood can be made higher the greater the effective reception power of an antenna's received signals, and receive data error rate characteristics can be improved.

Thus, this embodiment coincides with Embodiment 5 in that antenna received signals are separated on a combination-by-combination basis, and separated antenna received signals are weighted and combined using eigenvalues on a combination-by-combination basis, but differs in the method of weighting and combining.

Comparing this embodiment with Embodiment 5, the method of Embodiment 5 has the advantage of having fewer computations to find Euclidian distances than this embodiment, with the result that the circuitry is smaller in scale. From the standpoint of error rate characteristics, on the other hand, this embodiment is superior to Embodiment 5. In any case, both this embodiment and Embodiment 5 enable excellent error rate characteristics to be obtained by using eigenvalues as weighting coefficients.

This embodiment can also be applied to OFDM communications. A case in which this embodiment is applied to OFDM communications can be considered as combining the descriptions of this embodiment and Embodiment 6. That is to say, the method of this embodiment should be performed on a subcarrier-by-subcarrier basis.

The method according to the present embodiment can be applied to cases where received signals are applied error correction codes such as convolutional code, turbo code, and low density parity code. The decoding in this case is executed by finding a branch metric and a path metric sequentially based on weighted results.

Embodiment 19

In this embodiment, a reception method is proposed in which error correction decoding processing is added to the reception method of Embodiment 18. That is to say, the transmitting side transmits signals subjected to error correction coding using convolutional code, etc., as described in Embodiment 7, and the receiving side weights and combines received signals using eigenvalues as described in Embodiment 18, and then performs error correction decoding processing.

A receiving apparatus of this embodiment has error correction coding sections 2001 and 2002 as shown in FIG. 20 and described in Embodiment 7, and receives signals transmitted by transmission unit 2000 that transmits convolutional coded signals.

The reception unit of this embodiment has the same configuration as reception unit 1800 in FIG. 18 described in Embodiment 5, except for the configuration of signal processing section 1801 of reception unit 1800. In this embodiment, therefore, only the configuration of the signal processing section will be described.

Figure 48:
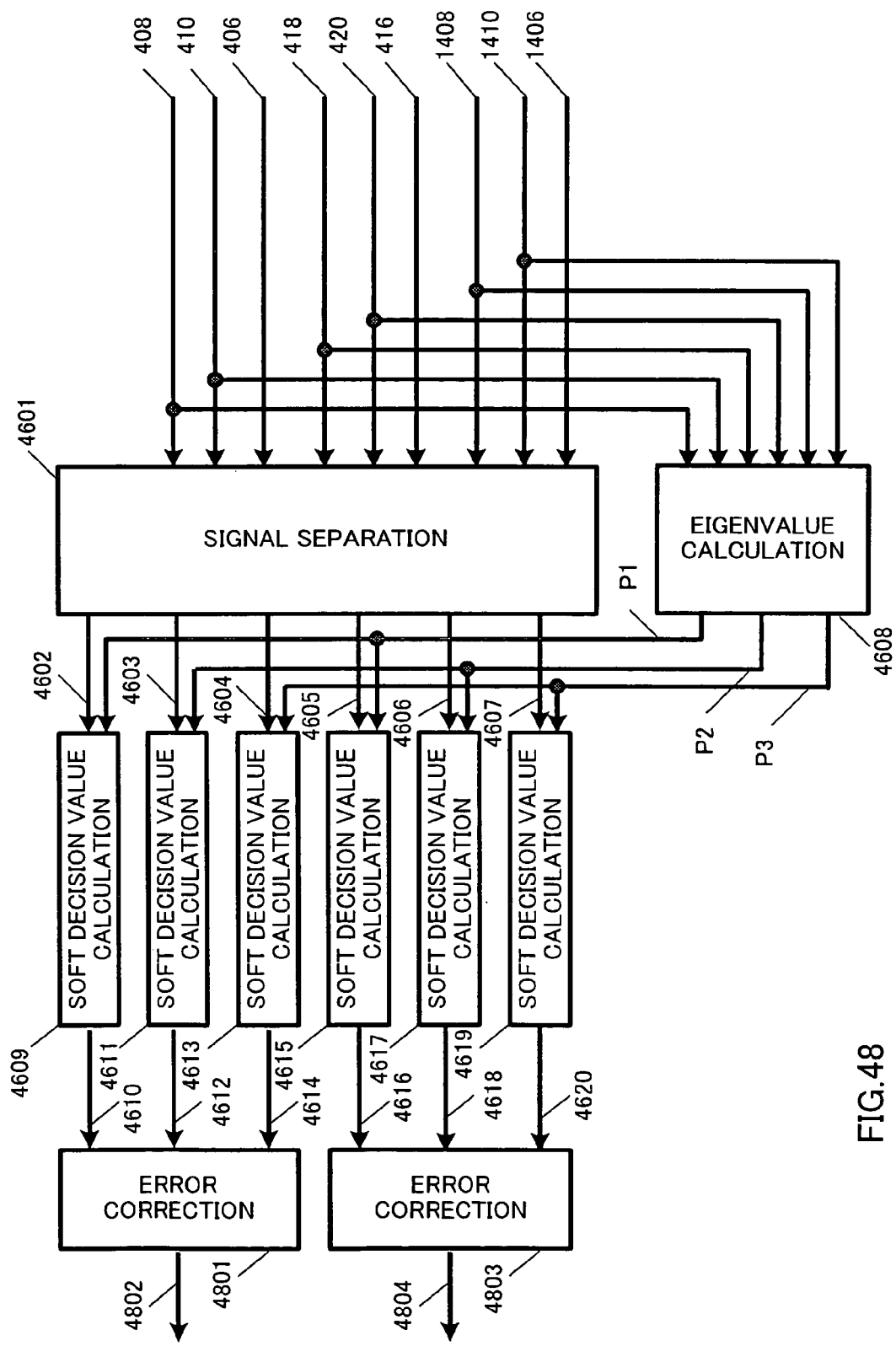
FIG. 48 is a block diagram showing a configuration of a signal processing section of Embodiment 19.

FIG. 48 shows the configuration of a signal processing section 4800 according to this embodiment. In the reception unit of this embodiment, signal processing section 1801 of reception unit 1800 in FIG. 18 is replaced by signal processing section 4800 in FIG. 48.

In signal processing section 4800 of this embodiment, decision sections 4621 and 4623 in FIG. 46 described in Embodiment 18 are simply replaced by error correction sections 4801 and 4803; other parts are assigned the same codes as in FIG. 46 and descriptions thereof are omitted.

Error correction section 4801 has soft decision value signals 4610, 4612, and 4614 as input, finds a metric from $P1 \times D1^2[0,0]+P2 \times D2^2[0,0]+P3 \times D3^2[0,0]$, $P1 \times D1^2[0,1]+P2 \times D2^2[0,1]+P3 \times D3^2[0,1]$, $P1 \times D1^2[1,0]+P2 \times D2^2[1,0]+P3 \times D3^2[1,0]$, and $P1 \times D1^2[1,1]+P2 \times D2^2[1,1]+P3 \times D3^2[1,1]$, obtains a received digital signal 4802 by performing Viterbi decoding, for example, and performing error correction, and outputs this received digital signal 4802.

In the same way as error correction section 4801, error correction section 4803 also finds a metric from the Euclidian distances from candidate signal points weighted and combined by means of eigenvalues, obtains a received digital signal 4804 by performing error correction such as Viterbi decoding, for example, and outputs this received digital signal 4804.

Figure 49:
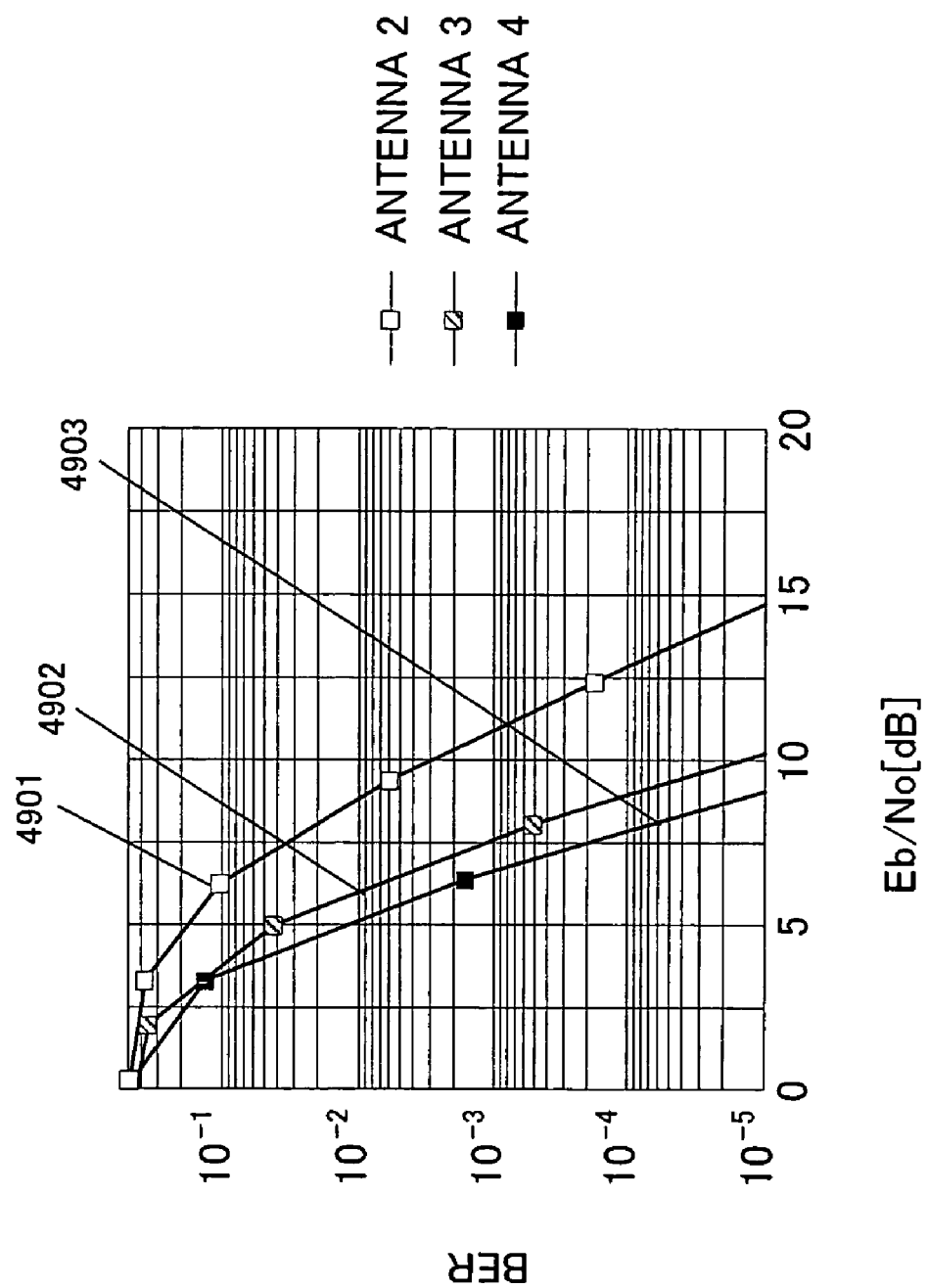
FIG. 49 is a drawing showing simulation results when using the configuration of Embodiment 19.

FIG. 49 shows simulation results for this embodiment. In this simulation, the relationship between Eb/No (bit-to-noise spectral density ratio) and BER (bit error rate) was investigated when using convolutional code and 2, 3, and 4 receiving antennas, as an example. In FIG. 49, reference numeral 4901 indicates the characteristic with two receiving antennas, reference numeral 4902 the characteristic with three receiving antennas, and reference numeral 4903 the characteristic with four receiving antennas. As can be seen from FIG. 49, using the configuration of this embodiment enables extremely good error rate characteristics to be obtained, especially in proportion to the number receiving antennas.

Thus, according to this embodiment, by performing error correction decoding processing in addition to providing the configuration of Embodiment 18, it is possible to obtain extremely good error rate characteristics.

In this embodiment, a method has been described that combines the method of Embodiment 18 with soft decision decoding, but the same kind of effect can also be obtained with a method combining the method of Embodiment 5 and soft decision decoding.

Other Embodiments

In the above-described embodiments, the descriptions have centered on a receiving apparatus that performs demodulation processing that takes effective reception power into consideration by using channel fluctuation matrix eigenvalues. Here, an eigenvalue may be used directly, or may be used after approximation. Approximation methods for finding an eigenvalue include a method whereby approximation is executed on channel fluctuation matrix elements, such as finding an eigenvalue by making the power of each element of a channel fluctuation matrix equal, for example. When approximation by making the power of each element of a channel fluctuation matrix equal is performed, an eigenvalue is found only at the phase of each element of a channel fluctuation matrix. Therefore, control of antenna selection, antenna combining, decoding, and so forth, is performed taking only the phase of each element of the channel fluctuation matrix into consideration. In this case, it is not necessarily essential to perform common control of the signal level of each antenna.

In other words, according to the decoding method using eigenvalues in the present embodiment, there are generally two methods of obtaining an eigenvalue that accurately reflects effective reception power. One method is to correct received signal levels so as to make the received signal levels at respective antennas virtually equal and to correct an eigenvalue in accordance with the received signal levels. The other method is to find an eigenvalue only from the phase of each element in channel fluctuation.

Also, in the above descriptions of a soft decision decoding method using eigenvalues, eigenvalue minimum power is used as a weighting coefficient, but the present invention is not limited to this, and it is also possible, for example, to input an eigenvalue and find a weighting coefficient from that eigenvalue. However, when eigenvalue minimum power is used as a weighting coefficient, receive data with extremely good error rate characteristics is obtained.

Furthermore, in the above-described embodiments, a case has been described in which soft decision decoding is performed with eigenvalue minimum power as a weighting coefficient, but error rate characteristics can also be improved if eigenvalue minimum power is used as a weighting coefficient in hard decision decoding.

The present invention is not limited to the above-described embodiments, and various variations and modifications may be possible without departing from the scope of the present invention.

This application is based on Japanese Patent Applications No. 2002-329453 filed on Nov. 13, 2002, No. 2002-374393 filed on Dec. 25, 2002, No. 2003-018761 filed on Jan. 28, 2003, and No. 2003-366249 filed on Oct. 27, 2003, entire content of which is expressly incorporated by reference herein.

What is claimed is:

1. A transmitting apparatus that has a plurality of antennas and transmits a modulated signal for each independent channel from each antenna of said plurality of antennas, comprising:

a plurality of modulators that form a modulated signal independently for each antenna;

a receiver that receives feedback information generated based on a channel fluctuation value for each channel from a receiving apparatus that receives said modulated signal when said modulated signal is received; and a transmission power controller that controls a transmission power of each transmission channel independently for each channel by controlling outputs of the plurality of modulators independently without combining the outputs, based on said feedback information of a corresponding channel, and modifies, independently for each antenna, the transmission power of the modulated signal transmitted from each antenna.

2. The transmitting apparatus of claim 1, wherein:

said feedback information includes information that indicates a channel fluctuation of each modulated signal between each antenna of said transmitting apparatus and each antenna of said receiving apparatus, and information indicating a received field strength of each antenna of said receiving apparatus; and said transmission power controller controls the transmission power of each transmission channel independently for each channel based on said channel fluctuation and said received field strength.

3. The transmitting apparatus of claim 2, wherein:

said modulator forms an OFDM signal as said modulated signal;

said feedback information includes information generated based on said channel fluctuation and said received field strength of each channel and each carrier; and said transmission power controller controls the transmission power independently for each channel and each subcarrier based on said feedback information and said received field strength of each channel and each carrier.

4. The transmitting apparatus of claim 1, wherein said transmission power controller controls the transmission power of each transmission channel independently for each channel by multiplying the modulated signal of each independent channel by a multiplication coefficient obtained based on the channel fluctuation of a corresponding channel and a multiplication coefficient obtained from an eigenvalue of a channel fluctuation matrix that has a channel fluctuation of each modulated signal between each antenna of said transmitting apparatus and each antenna of said receiving apparatus as an element.

5. The transmitting apparatus of claim 1, wherein:

said modulator forms an OFDM signal as said modulated signal;

said feedback information includes information generated based on a channel fluctuation value of each channel and each carrier; and said transmission power controller controls the transmission power independently for each channel and each subcarrier based on the feedback information of each channel and each carrier.

6. A communication system comprising a transmitting apparatus that has a plurality of antennas and transmits a modulated signal for each independent channel from each antenna and a receiving apparatus that receives modulated signals transmitted from said plurality of antennas and demodulates each modulated signal, wherein said transmitting apparatus comprises:

a modulator that forms a modulated signal transmitted from each antenna;

a receiver that receives, from said receiving apparatus, feedback information generated based on a channel fluctuation value of each channel when said each modulated signal is received; and a transmission power controller that controls a transmission power of each transmission channel independently for each channel based on said feedback information of a corresponding channel, and modifies the transmission power of the modulated signal transmitted from each antenna independently for each antenna, said reception apparatus comprising:
a channel fluctuation estimator that estimates channel fluctuation values of the received plurality of modulated signals;
an effective reception power calculator that calculates an effective reception power value of said modulated signals based on the estimated channel fluctuation values; and
a demodulator that performs received signal demodulation processing using the calculated effective reception power value.

7. The communication system of claim 6, wherein:
said effective reception power calculator calculates an eigenvalue of a channel fluctuation matrix that has said channel fluctuation values as elements and takes the eigenvalue as an index of said effective reception power value; and
said demodulator performs a received signal demodulation processing using said eigenvalue.

8. The communication system of claim 6, wherein said effective reception power calculator finds an effective reception power of said modulated signals using a received field strength at an antenna in addition to the channel fluctuation modulation value.

9. The communication system of claim 6, wherein said receiving apparatus comprises a reception level controller that detects a signal level of each antenna received signal and makes the signal level of each antenna received signal equal.

10. A receiving apparatus used in a communication system having a transmission apparatus that transmits different modulated signals from a plurality of antennas and a receiving apparatus that receives the modulated signals transmitted from said plurality of antennas and demodulates each modulated signal, said receiving apparatus comprising:
a channel fluctuation estimator that estimates channel fluctuation values of the received plurality of modulated signals;
an eigenvalue calculator that calculates an eigenvalue of a channel fluctuation matrix that has said channel fluctuation values as elements; and
a demodulator that performs a received signal demodulation processing using the calculated eigenvalue, wherein said eigenvalue calculator creates combinations of a plurality of antenna received signals, forms a channel fluctuation matrix for each combination, and calculates an eigenvalue of a channel fluctuation matrix of each combination, said demodulator selecting a combination of antenna received signals for which a minimum power of said eigenvalue is greatest and performs demodulation processing thereon.

11. A receiving apparatus used in a communication system having a transmission apparatus that transmits different modulated signals from a plurality of antennas, and a receiving apparatus that receives the modulated signals transmitted from said plurality of antennas at a plurality of antennas and demodulates each modulated signal, said receiving apparatus comprising:
a channel estimator that estimates channel fluctuation values of the received plurality of modulated signals;
an eigenvalue calculator that calculates an eigenvalue of a channel fluctuation matrix that has said channel fluctuation values as elements; and
a demodulator that performs received signal demodulation processing using the calculated eigenvalue, wherein said eigenvalue calculator creates combinations of the plurality of antenna received signals, forms a channel fluctuation matrix for each combination, and calculates an eigenvalue of a channel fluctuation matrix of each combination, said demodulator separating each modulated signal using each combination of antenna received signals and said channel fluctuation matrix corresponding to that combination, and also performs weighting and combining of modulated signals separated in each combination using a channel fluctuation matrix eigenvalue used at the time of separation.

12. A receiving apparatus used in a communication system having a transmitting apparatus that transmits different modulated signals from a plurality of antennas and a receiving apparatus that receives the different modulated signals transmitted from said plurality of antennas and demodulates each modulated signal, said receiving apparatus comprising:
a channel fluctuation estimator that estimates channel fluctuation values of the received plurality of modulated signals;
an eigenvalue calculator that calculates an eigenvalue of a channel fluctuation matrix that has said channel fluctuation values as elements; and
a demodulator that performs received signal demodulation processing using the calculated eigenvalue, wherein said demodulator comprises:
a soft decision value calculator that calculates a weighted soft decision value using said eigenvalue; and
a decoder that obtains a digital signal from the weighted soft decision value.

13. A receiving apparatus used in a communication system having a transmission apparatus that transmits different modulated signals from a plurality of antennas and a receiving apparatus that receives the different modulated signals transmitted from said plurality of antennas at a plurality of antennas and demodulates each modulated signal, said receiving apparatus comprising:
a channel fluctuation estimator that estimates channel fluctuation values of the received plurality of modulated signals;
an eigenvalue calculator that calculates an eigenvalue of a channel fluctuation matrix that has said channel fluctuation values as elements;
a received field strength detector that detects a received field strength of each antenna received signal; and
a demodulator that performs received signal demodulation processing using said eigenvalue corrected in accordance with the received field strength of each antenna received signal.

14. The receiving apparatus of claim 13, wherein said eigenvalue calculator corrects said channel fluctuation matrix based on the received field strength of each antenna received signal so that power of each channel fluctuation value becomes equal, and calculates said eigenvalue using the corrected channel fluctuation matrix.

15. A transmitting method that provides a plurality of antennas and transmits a modulated signal for each independent channel from each antenna of the plurality of antennas, comprising:
forming a modulated signal independently for each antenna;
receiving feedback information from a received transmission signal that is generated based on a channel fluctuation value of each channel when each modulated signal is received; and controlling a transmission power of each transmission channel independently for each channel by controlling the modulated signals independently without combining the signals, based on the received feedback information of a corresponding channel, the transmission power of the modulated signal transmitted from each antenna being modified independently for each antenna.

* * * * *